US007020881B2

(12) United States Patent
Takahashi et al.

(10) Patent No.: US 7,020,881 B2
(45) Date of Patent: Mar. 28, 2006

(54) SYSTEM FOR RECEIVING DESCRIPTION INFORMATION FROM A NETWORK DEVICE AND AUTOMATICALLY GENERATE A CONTROL PANEL AT A CONTROLLER FOR CONTROLLING THE DEVICE

(75) Inventors: Fumiaki Takahashi, Tokyo (JP); Akira Suga, Tokyo (JP); Hideaki Kawamura, Kanagawa-ken (JP); Takashi Aizawa, Kanagawa-ken (JP); Akira Mamiya, Kanagawa-ken (JP); Kenji Hatori, Saitama-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/240,134

(22) Filed: Jan. 29, 1999

(65) Prior Publication Data

US 2002/0035620 A1     Mar. 21, 2002

Related U.S. Application Data

(60) Division of application No. 08/942,729, filed on Oct. 2, 1997, now Pat. No. 5,887,193, which is a continuation of application No. 08/281,355, filed on Jul. 27, 1994, now abandoned.

(30) Foreign Application Priority Data

| Jul. 30, 1993 | (JP) | ............................... 05-189633 |
| Jul. 30, 1993 | (JP) | ............................... 05-189634 |
| Jul. 30, 1993 | (JP) | ............................... 05-189636 |
| Jul. 30, 1993 | (JP) | ............................... 05-189637 |

(51) Int. Cl.
G06F 13/00     (2006.01)

(52) U.S. Cl. ...................... 719/322; 719/321; 719/323; 719/324; 719/327; 709/202

(58) Field of Classification Search .................. 714/46; 370/400; 379/93.14; 345/740, 704; 713/400; 710/8; 709/322, 323, 321, 202; 711/115; 719/322, 321, 323, 324, 327
See application file for complete search history.

(56) References Cited

U.S. PATENT DOCUMENTS

| 4,649,533 A | * | 3/1987 | Chorley et al. ............. 370/400 |
| 4,695,977 A | * | 9/1987 | Hansen et al. ........... 379/93.14 |
| 5,119,489 A | * | 6/1992 | Bond et al. .................... 714/46 |

(Continued)

FOREIGN PATENT DOCUMENTS

EP      0 490 624      6/1992

(Continued)

OTHER PUBLICATIONS

L. Marchisio, et al., "Modeling the User Interface", IEEE Communications Magazine, vol. 31, No. 5, pp. 68-74, May 1993.

(Continued)

*Primary Examiner*—Le Hien Luu
(74) *Attorney, Agent, or Firm*—Cowan, Liebowitz & Latman, P.C.

(57) ABSTRACT

A control device for controlling a network device connected to a network. The control device comprises a communication interface adapted to receive description information of the network device from the network device via the network, and a controller adapted to automatically generate an object for the network device using the description information after the description information is received from the network device. The object is adapted to generate a control panel for controlling the network device.

28 Claims, 72 Drawing Sheets

U.S. PATENT DOCUMENTS

| | | | | |
|---|---|---|---|---|
| 5,319,751 A | * | 6/1994 | Garney | 711/115 |
| 5,333,299 A | * | 7/1994 | Koval et al. | 713/400 |
| 5,428,730 A | * | 6/1995 | Baker et al. | 345/740 |
| 5,537,626 A | * | 7/1996 | Kraslavsky et al. | 710/8 |

FOREIGN PATENT DOCUMENTS

| | | |
|---|---|---|
| EP | 0 549 504 | 6/1993 |
| JP | 63-052253 | 3/1988 |
| JP | 03-148749 | 6/1991 |
| JP | 03-266055 | 11/1991 |
| JP | 04-046496 | 2/1992 |
| JP | 04-125728 | 4/1992 |
| JP | 04-260149 | 9/1992 |
| JP | 05-083253 | 4/1993 |
| JP | 05-181921 | 7/1993 |
| WO | WO 92/17835 | 10/1992 |

OTHER PUBLICATIONS

S. Rabie, et al., "Management of Corporate Communication Networks in the OSI Enfironment", Global Telecommunications Conference, NY, IEEE, U.S., vol. 3, pp. 1426-1433, Dec. 1991.

* cited by examiner

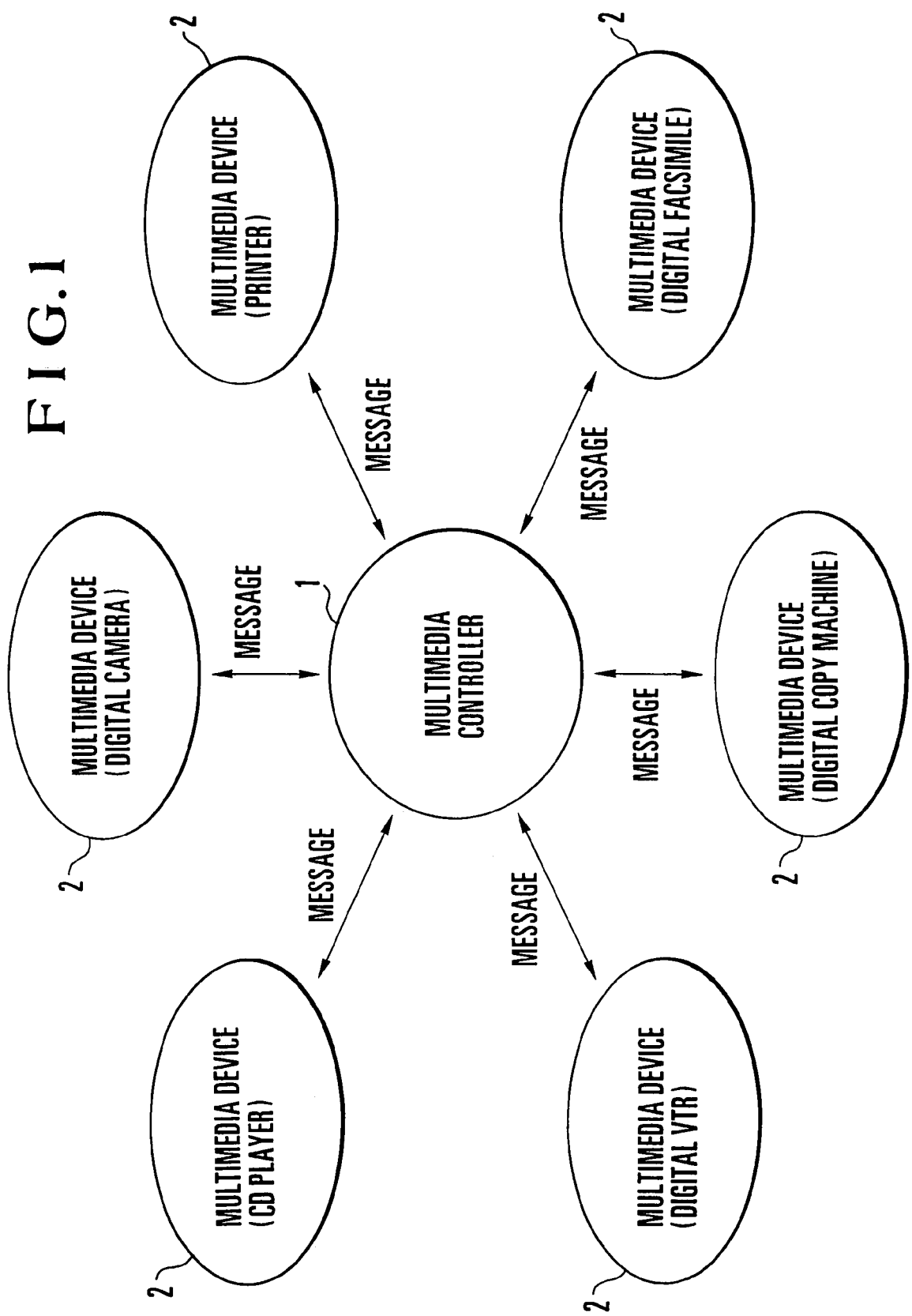

DAISY CHAIN CONNECTION

STAR CONNECTION

SERIES CONNECTION

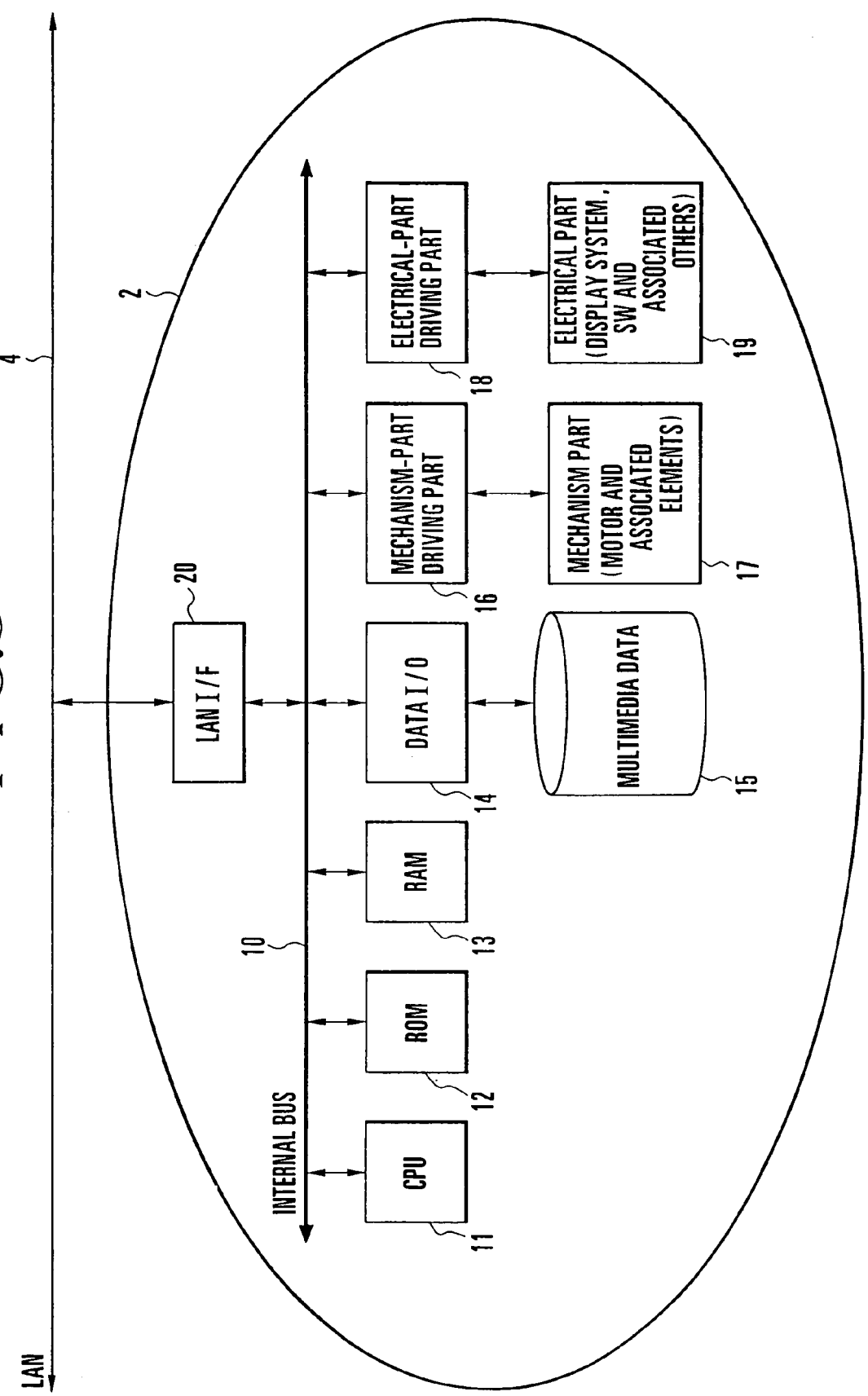

FIG.7
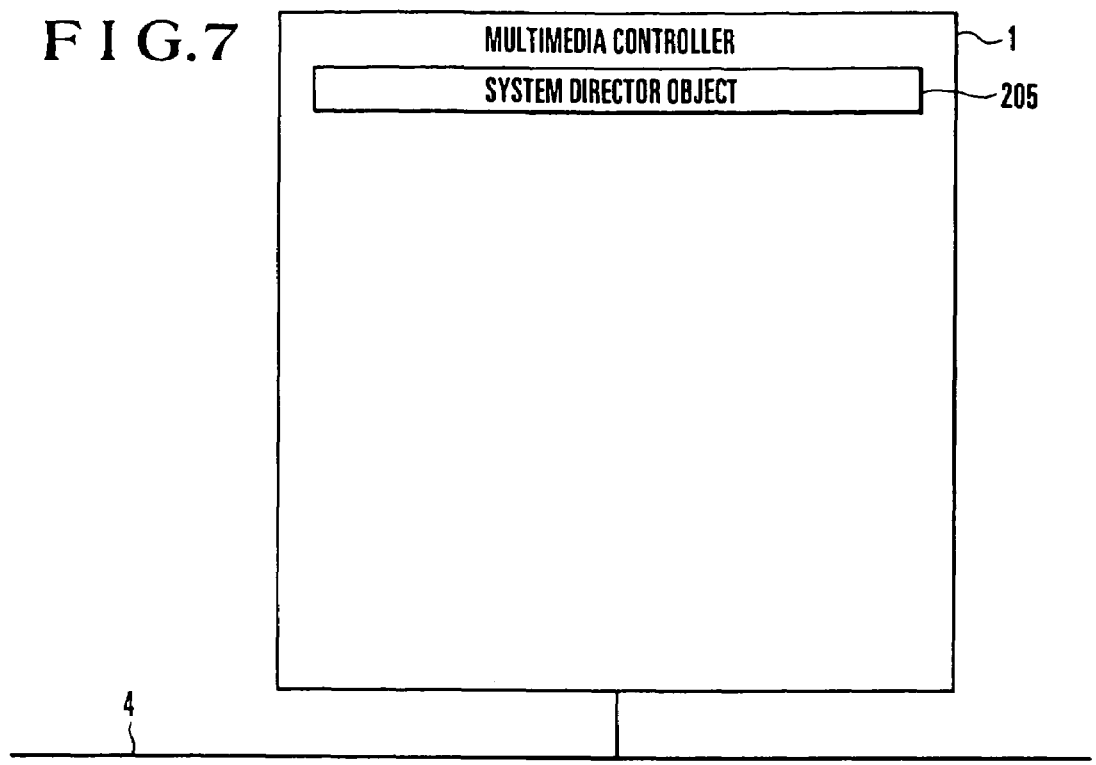
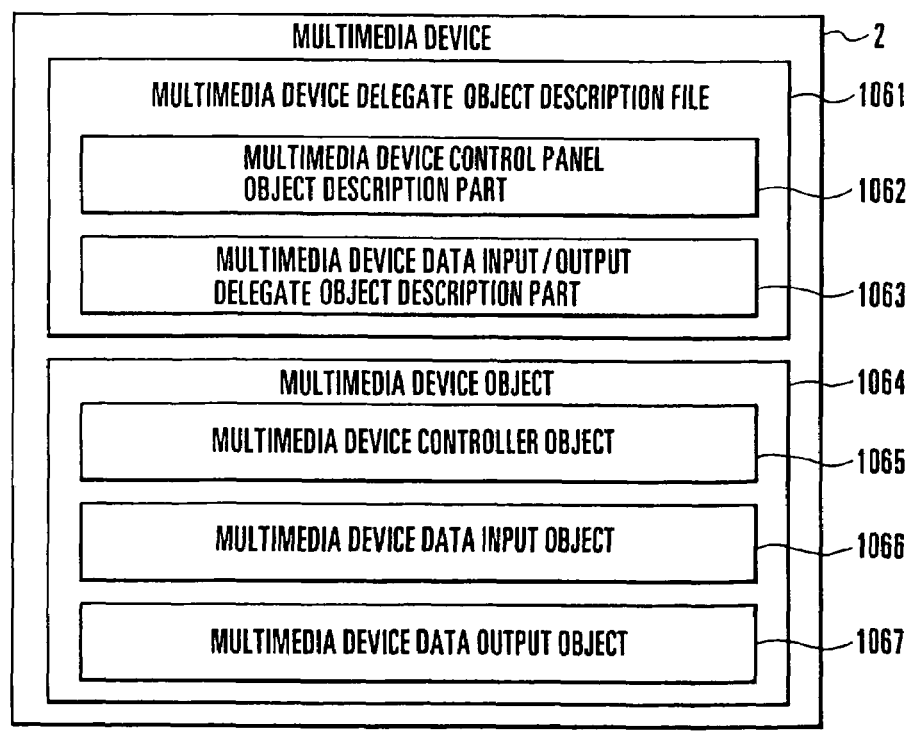

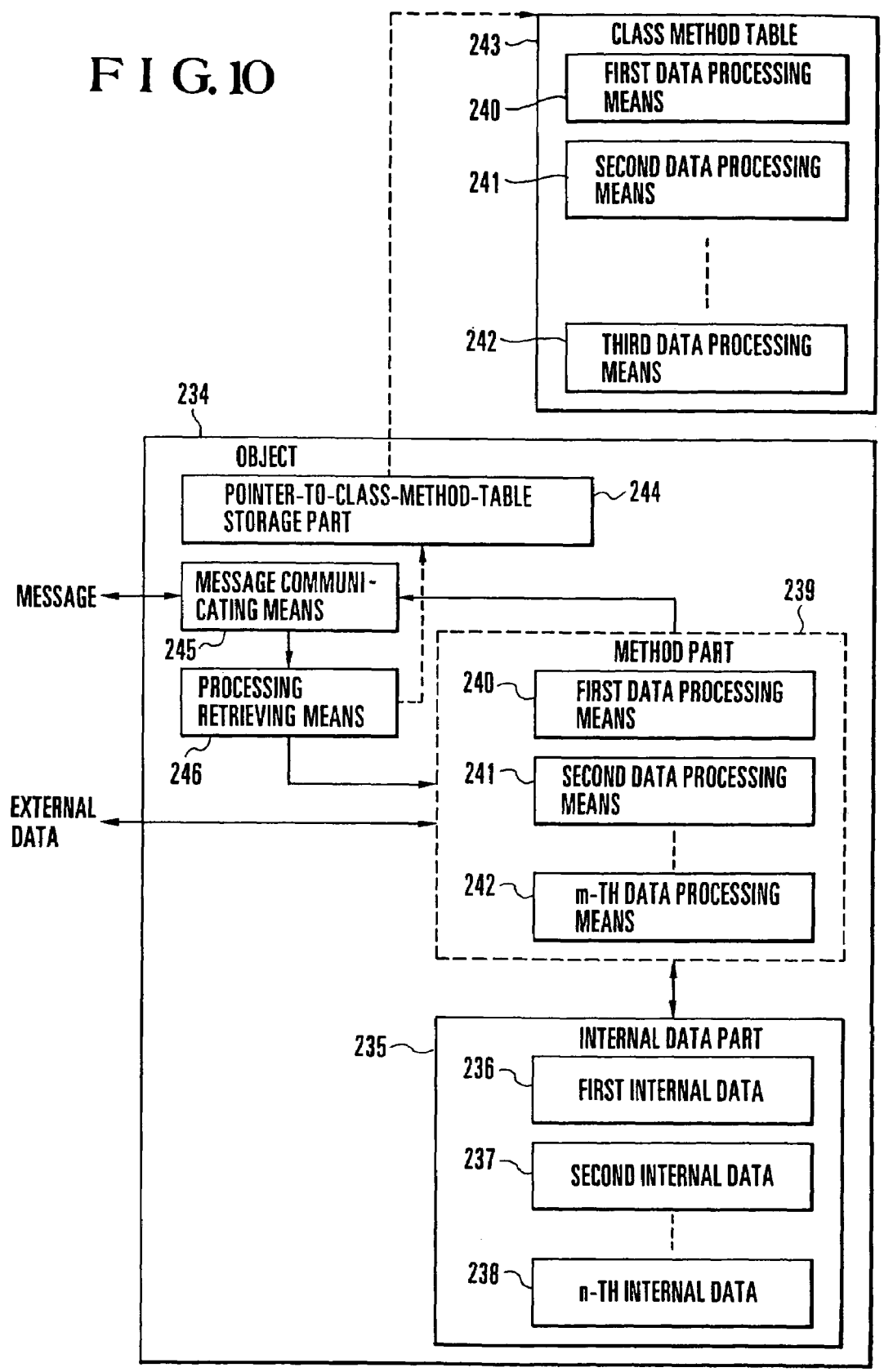
F I G. 10

FIG. 40

WARNING

DUBBING OF AUDIO & MOVIE DATA IS IMPOSSIBLE.

EXECUTE DUBBING OF MOVIE DATA ?

| YES | Cancel |

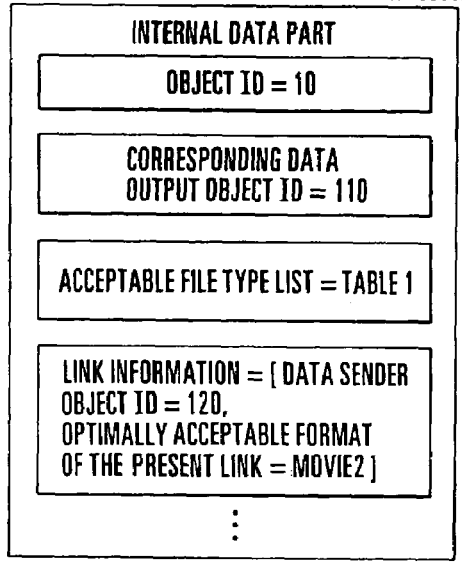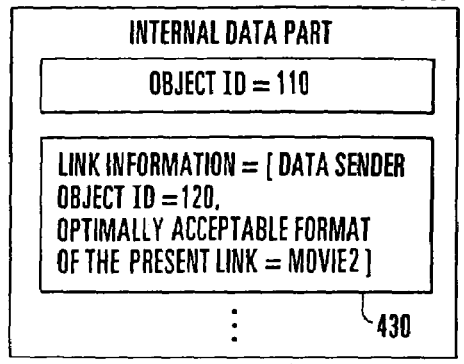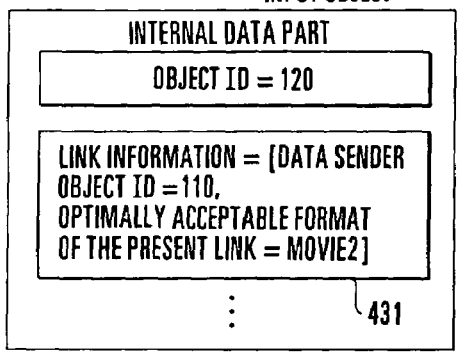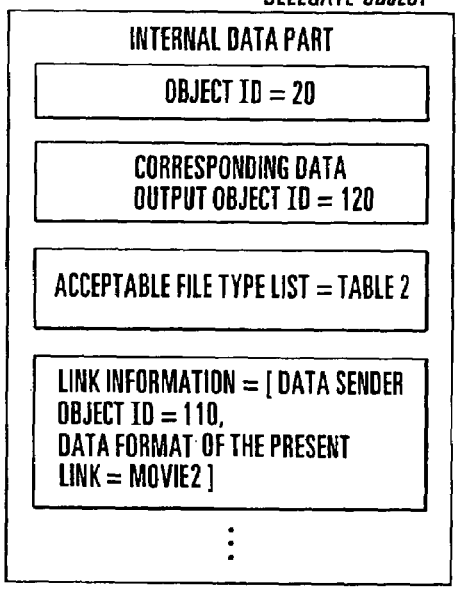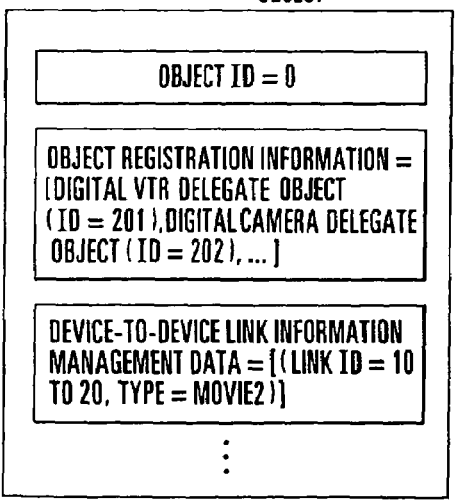

FIG. 51(a)

DIGITAL CAMERA ACCEPTABLE FILE TYPE LIST

| DATA ATTRIBUTE | FILE TYPE |
|---|---|
| Audio | Audio1, Audio2, Audio3 |
| Movie | Movie1, Movie2 |
| Audio & Movie | AM1, AM2, AM3 |

FIG. 51(b)

DIGITAL VTR ACCEPTABLE FILE TYPE LIST (PRIORITY ORDERED)

| DATA ATTRIBUTE | PRIORITY ORDERED FILE TYPE |
|---|---|
| Audio | ⑥Audio3, ⑦Audio4, ⑧Audio5 |
| Movie | ⑤Movie1, ④Movie2 |
| Audio & Movie | ①AM4, ②AM5, ③AM6 |

FIG.54

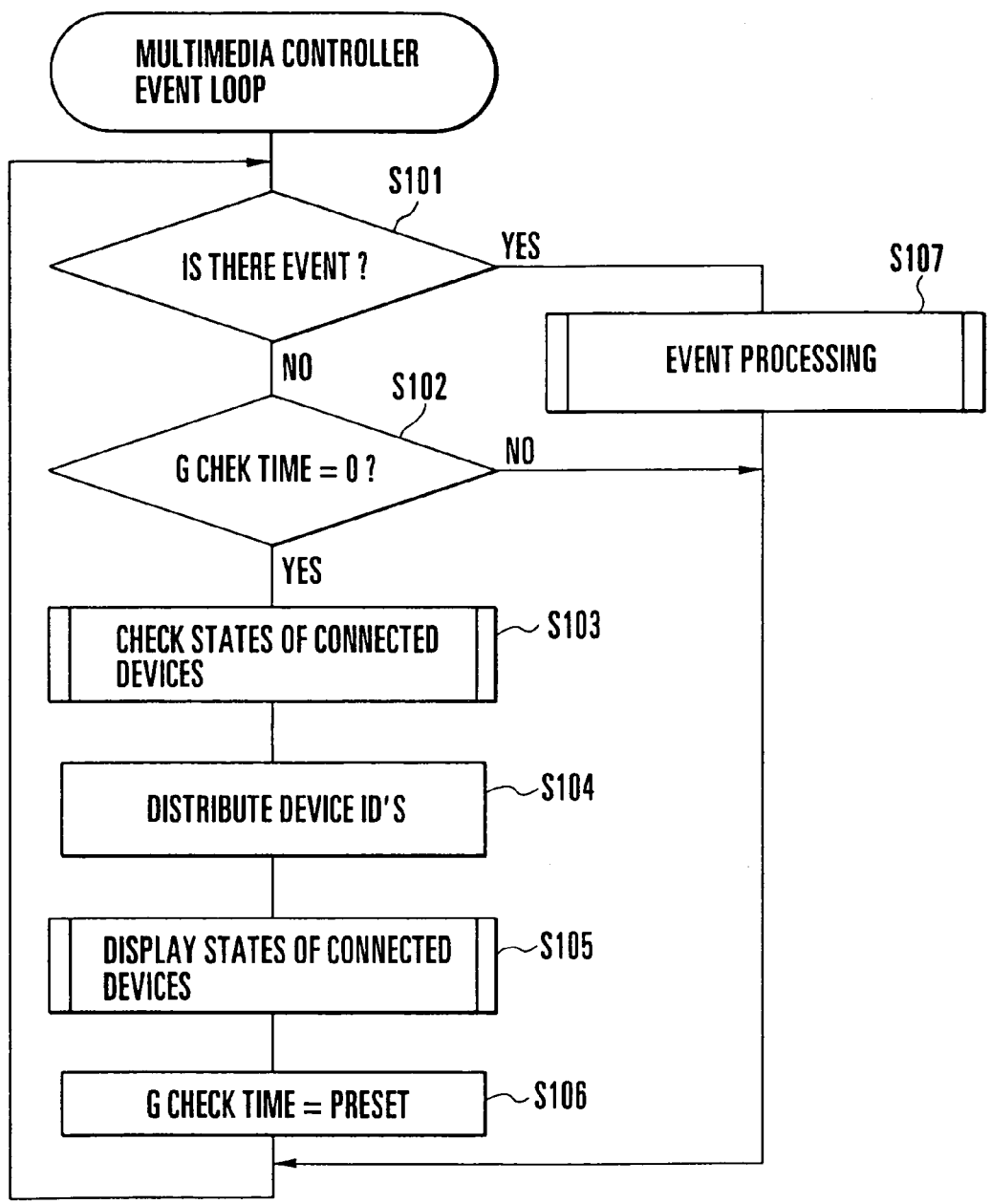

EVENT : EVENT OCCURRING BY MANIPULATION OF MULTIMEDIA CONTROLLER BY USER AND EVENT RECEIVED FROM CONNECTED DEVICE THROUGH COMMUNICATION.

G CHECK TIME : TIMER WHICH MANAGES PERIOD DURING WHICH MULTIMEDIA CONTROLLER PERFORMS A SERIES OF STATE-OF-CONNECTED-DEVICE CHECKING OPERATIONS. DECREMENTED BY EXTERNAL TIMER, SOFTWARE INTERRUPT TIMER OR THE LIKE.

PRESET : PERIOD DURING WHICH MULTIMEDIA CONTROLLER PERFORMS A SERIES OF STATE-OF-CONNECTED-DEVICE CHECKING OPERATIONS.

FIG.55

| CONFIRMATION OF CONNECTION | POWER ON/OFF | DEVICE ID | DEVICE NAME | UNIQUE NUMBER | OBJECT INFORMATION STORAGE ADDRESS |
|---|---|---|---|---|---|
| OK | ○ | 001 | Digital VTR1 | CANON-0466-36-5375 | |
| OK | × | 002 | Digital VTR2 | CANON-0466-35-8983 | |
| NG | ○ | 003 | CD Player | CANON-0467-55-6452 | |
| .. | .. | .. | .. | .. | |
| .. | .. | .. | .. | .. | |
| ............ | ............ | ............ | ............ | ............ | |

FIG. 64

| CONFIRMATION OF CONNECTION | POWER ON/OFF | COUNTER | DEVICE ID | DEVICE NAME | UNIQUE NUMBER | OBJECT INFORMATION STORAGE ADDRESS |
|---|---|---|---|---|---|---|
| OK | ○ | g Refresh Counter_001 | 001 | Digital VTR1 | CANON-0466-36-5375 | |
| OK | × | g Refresh Counter_002 | 002 | Digital VTR2 | CANON-0466-35-8983 | |
| NG | ○ | g Refresh Counter_003 | 003 | CD Player | CANON-0467-55-6452 | |
| .. | .. | .. | .. | .. | .. | |
| .. | .. | .. | .. | .. | .. | |
| ......... | ......... | ......... | ......... | ......... | ......... | |

FIG.66

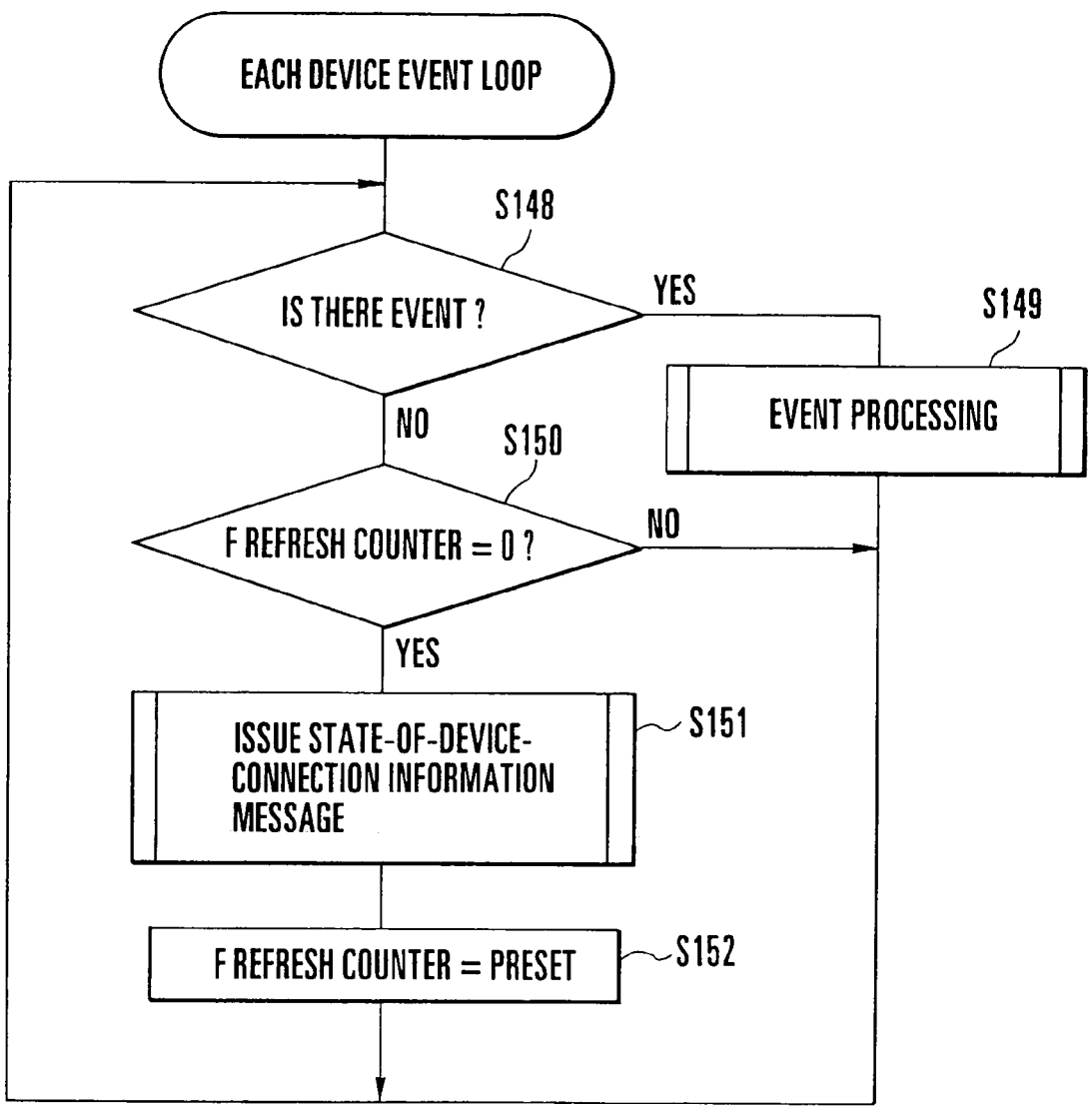

EVENT : EVENT OCCURRING BY MANIPULATION OF MULTIMEDIA CONTROLLER BY USER AND EVENT RECEIVED FROM CONNECTED DEVICE THROUGH COMMUNICATION.

F REFRESH COUNTER : TIMER WHICH MANAGES PERIOD DURING WHICH EACH MULTIMEDIA DEVICE INFORMS MULTIMEDIA CONTROLLER OF STATE OF CONNECTION OF ITS OWN.
DECREMENTED BY EXTERNAL TIMER, SOFTWARE INTERRUPT TIMER OR THE LIKE.

PRESET : PERIOD DURING WHICH EACH MULTIMEDIA DEVICE INFORMS MULTIMEDIA CONTROLLER OF STATE OF CONNECTION OF ITS OWN.

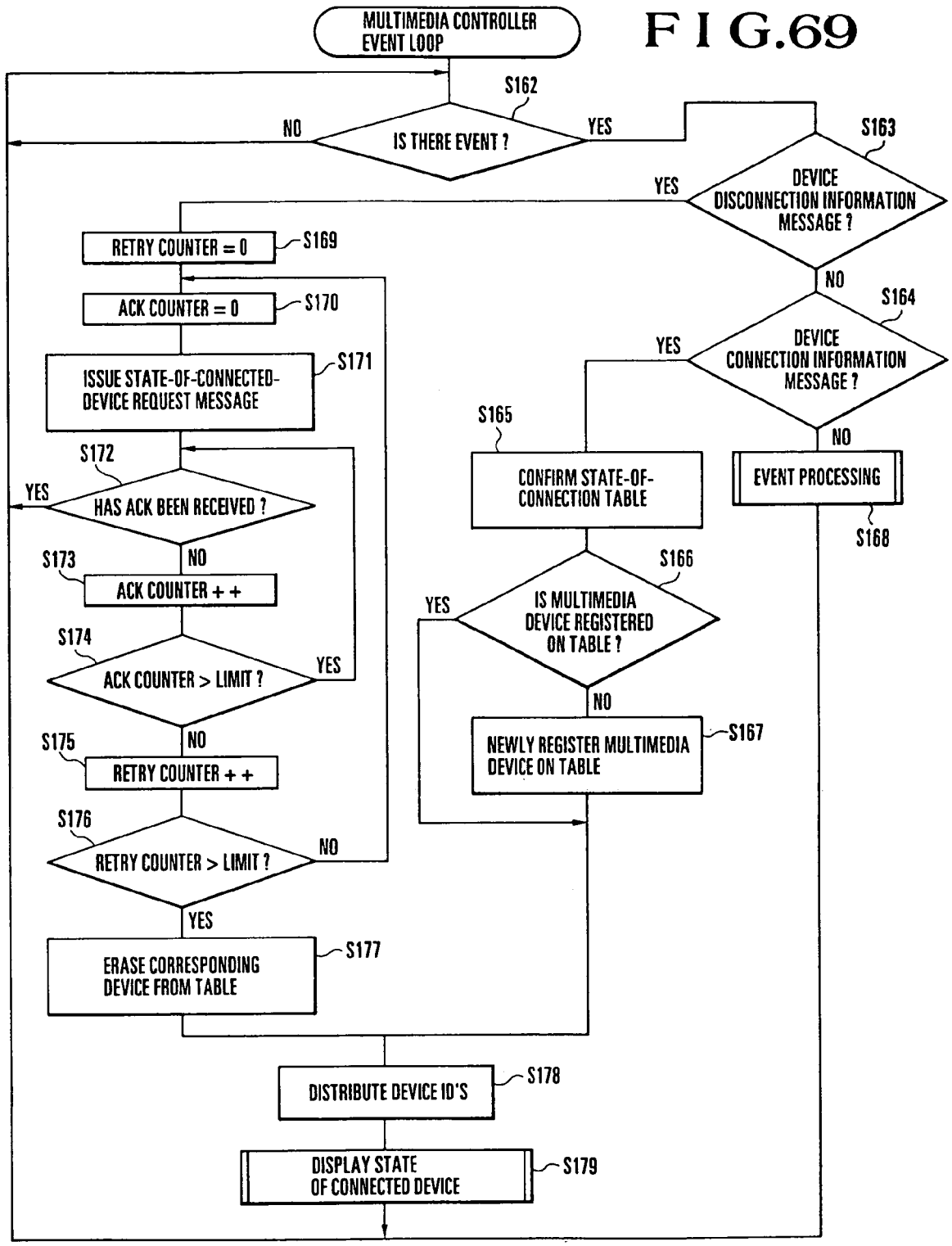
F I G. 69

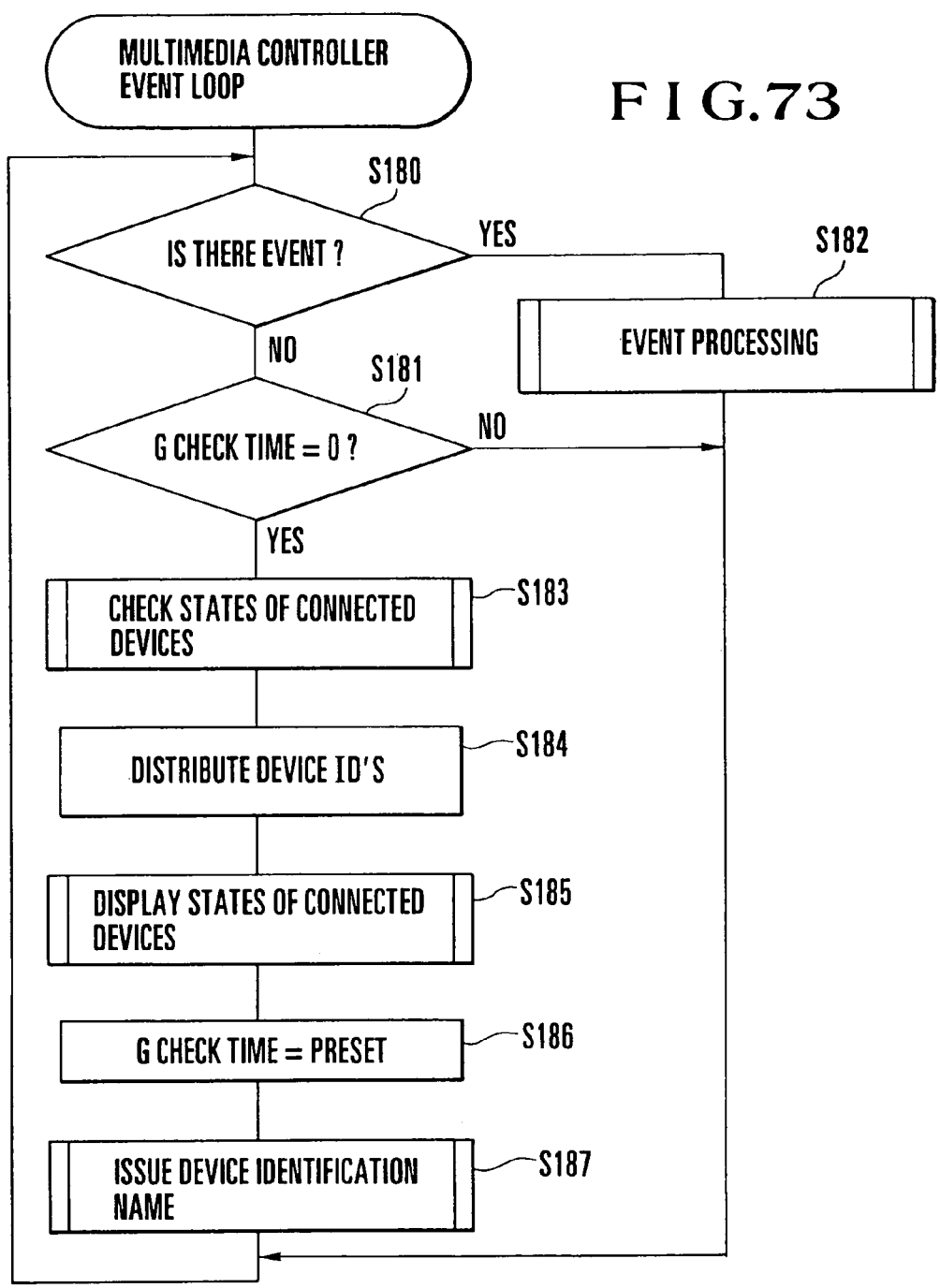

FIG.73

EVENT: EVENT OCCURRING BY MANIPULATION OF MULTIMEDIA CONTROLLER BY USER AND EVENT RECEIVED FROM CONNECTED DEVICE THROGH COMMUNICATION.

G CHECK TIME: TIMER WHICH MANAGES PERIOD DURING WHICH MULTIMEDIA CONTROLLER PERFORMS A SERIES OF STATE-OF-CONNECTED-DEVICE CHECKING OPERATIONS. DECREMENTED BY EXTERNAL TIMER, SOFTWARE INTERRUPT TIMER OR THE LIKE.

PRESET: PERIOD DURING WHICH MULTIMEDIA CONTROLLER PERFORMS A SERIES OF STATE-OF-CONNECTED-DEVICE CHECKING OPERATIONS.

SYSTEM FOR RECEIVING DESCRIPTION INFORMATION FROM A NETWORK DEVICE AND AUTOMATICALLY GENERATE A CONTROL PANEL AT A CONTROLLER FOR CONTROLLING THE DEVICE

CROSS-REFERENCE TO RELATED APPLICATIONS

This application is a divisional of application Ser. No. 08/942,729, filed Oct. 2, 1997 now U.S. Pat. No. 5,887,193, which is a continuation of application Ser. No. 08/281,355, filed Jul. 27, 1994, abandoned.

BACKGROUND OF THE INVENTION

1. Field of the Invention

The present invention relates to a system control method and a system control apparatus both of which are suitable for use in system control of multimedia devices capable of handling various kinds of information such as texts, sound, still images and moving images.

2. Description of the Related Art

In recent years, so-called AV devices which have chiefly relied on analog techniques, such as audio equipment, video equipment and television sets, have been being digitized more and more. As digitization of text information and still image information becomes more popular, text information, sound information, still-image information and moving-image information are beginning to be unitarily handled within computers.

However, if currently available multimedia devices (for example, sound input/output devices and image input/output devices such as digital cameras, CD-ROM players, scanners, sound boards and video boards) are to be utilized on a computer, it has been necessary to install application software or device drivers dedicated to driving the respective multimedia devices on the computer.

The above-described art has the problem that new software or device drivers must be prepared for new multimedia devices in each computer or OS (Operating System) and software development becomes a heavy burden and efficient and high-rapid control is impossible.

Another problem is that the above-described art generally does not allow a computer connected to a LAN (local area network) to transparently use a multimedia device connected to a different point of the LAN. Accordingly, it has been impossible to realize the concept of a multimedia system to enable a plurality of computers to access individual peripheral devices via a LAN.

SUMMARY OF THE INVENTION

It is, therefore, an object of the present invention to solve the above-described problems.

Another object of the present invention is to realize a highly versatile system environment suitable for control of multimedia devices.

Another object of the present invention is to improve the efficiency of control between multimedia devices interconnected via a LAN.

To achieve the above objects, in accordance with one aspect of the present invention, there is provided a control device for controlling a network device connected to a network. The control device comprises a communication interface adapted to receive description information of the network device from the network device via the network and a controller adapted to automatically generate an object for the network device using the description information after the description information is received from the network device. The object generated by the controller is adapted to generate a control panel for controlling the network device.

To achieve the above object, there is also provided a method in a control device that controls a network device connected to a network. The method comprises the steps of receiving description information of the network device from the network device via the network, and automatically generating an object for the network device using the description information after the description information is received from the network device, wherein the object is adapted to generate a control panel for controlling the network device.

In accordance with another aspect of the present invention, there is provided a control device for controlling a network device connected to a network. The control device, in this case, comprises a communication interface adapted to receive description information of the network device from the network device via the network and a controller adapted to automatically generate an object for the network device using the description information after the description information is received from the network device. The object generated by the controller is adapted to generate a control panel for controlling the network device, to start a first process that displays the control panel if a user selects an icon representing the network device and to start a second process that transmits a message relating to a graphical element on the control panel to the network device if the user operates the graphical element.

In accordance with another aspect of the invention, a method performed in a control device that controls a network device connected to a network is also provided. The method comprises the steps of receiving description information of the network device from the network device via the network and automatically generating an object for the network device using the description information after the description information is received from the network device. The object is adapted to generate a control panel for controlling the network device, to start a first process that displays the control panel if a user selects an icon representing the network device and to start a second process that transmit a message relating to a graphical element on the control panel to the network device if the user operates the graphical element.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 1 is a view showing a configuration of logical connection provided between a multimedia controller and multimedia devices;

FIG. 3 is a block diagram showing the internal construction of a multimedia device represented as an object;

FIG. 7 is a view showing a state in which the multimedia device has not yet been connected to the multimedia controller;

FIG. 10 is a view showing the structure of an object;

FIG. 40 is a view showing the design of a warning panel;

FIGS. 50(a) to 50(e) are views showing the internal data parts of the respective objects after a link is formed to extend from a digital camera to a digital VTR;

FIGS. 51(a) and 51(b) are tables respectively showing a digital camera acceptability file type list and a digital VTR acceptability file type list;

FIG. 54 is a flowchart of an event loop of a multimedia controller according to each of the fifth and tenth embodiments;

FIG. 55 is a conceptual diagram showing a device connection management table according to each of the fifth, seventh, eighth, ninth and tenth embodiments of the present invention;

FIG. 64 is a conceptual diagram showing a state-of-connection management table according to the sixth embodiment of the present invention;

FIG. 66 is a flowchart showing an event loop of each multimedia device according to the sixth embodiment of the present invention;

FIG. 69 is a flowchart of processing according to each of the seventh and eighth embodiments of the present invention as well as each of the ninth and tenth embodiments of the present invention;

FIG. 73 is a flowchart showing an event loop of a multimedia controller according to the tenth embodiment of the present invention;

DETAILED DESCRIPTION OF THE PREFERRED EMBODIMENTS

Figure 2A:
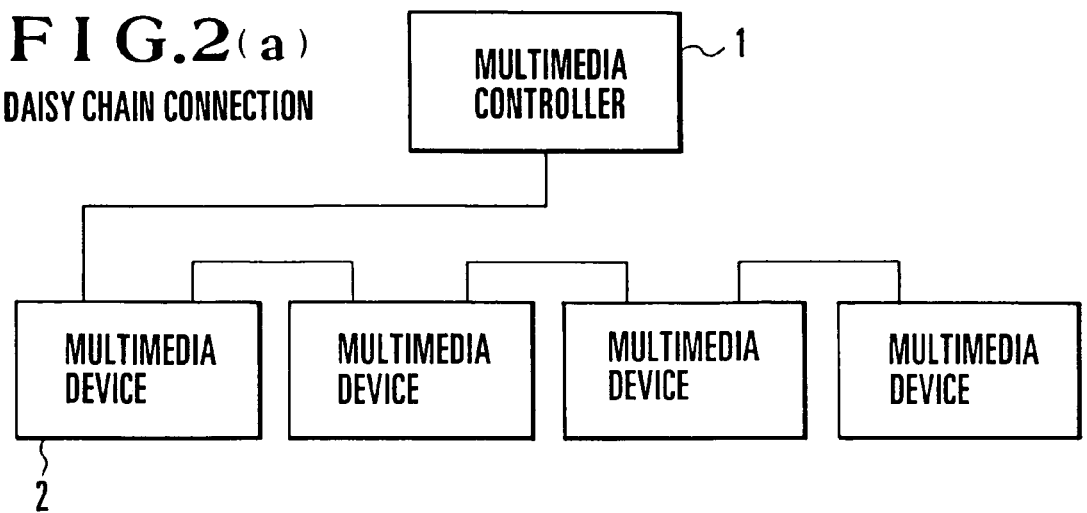
FIGS. 2(a), 2(b) and 2(c) are views showing different configurations of logical connection provided between the multimedia controller and the multimedia devices.

Embodiments of the present invention will be described below in detail with reference to the accompanying drawings.

In the present invention, a system control technique is employed in which individual multimedia devices are regarded as objects and a controller unitarily manages the objects.

The individual objects, which are managed by the controller, have the functions of sending their own functions and control means to the controller. Therefore, there is no need to prepare a control program in the controller, and it is possible to achieve control only by connecting the objects to the controller.

The controller has means for allowing a person who actually specifies control to display or manipulate the control means sent from connected objects, so that the controller can manage the multimedia devices in a centralized manner. Further, it is possible to achieve the flexibility and extensibility of being able to cope with a new multimedia device without making any new preparation.

Incidentally, the object-oriented concept employed in the present invention is described in detail in references, such as "Ishizuka: OBJECT-ORIENTED PROGRAMMING, ASCII, 1988", "Sakai: INTRODUCTION TO OBJECT-ORIENTED TECHNIQUE, OHM sha, 1990" and "B. J. Cocks: OBJECT-ORIENTED PROGRAMMING, TOP-PAN, 1988". Therefore, in the following description of each embodiment of the present invention, a basic technical description is omitted.

Such an object-oriented technique receives special attention from the viewpoint of more efficient, programming development environments, and can also be widely utilized in, for example, operating systems or multimedia databases. Concepts particularly characteristic of the object-oriented technique reside in the following three points:

(1) encapsulation, (2) inheritance, and (3) messaging.

The present invention is intended to develop and extend the object-oriented technique on the basis of the three concepts so that the object-oriented technique can be adapted to the control of multimedia devices.

FIG. 1 shows the configuration of a logical connection which is provided between a multimedia controller and multimedia devices on the basis of the object-oriented concept of the present invention. As shown, communication paths are formed between a plurality of multimedia devices 2 and a multimedia controller 1 so that each of the multimedia devices 2 can directly communicate with the multimedia controller 1 by passing various kinds of information therebetween on one-to-one basis via a respective one of the communication paths. The multimedia controller 1 controls each of the multimedia devices 2 by bi-directionally communicating messages therebetween via the corresponding one of the communication paths. The multimedia devices are devices of all kinds capable of handling multimedia data, for example, AV devices such as CD players, digital video tape recorders, digital cameras and digital television sets or OA devices such as digital facsimiles, digital copying machines and printers.

Although a dedicated device is employed as the controller, the controller may also be realized by installing a dedicated OS (operating system) and application software on a general-purpose computer such as a personal computer, a word processor or a work station.

Figure 2B:
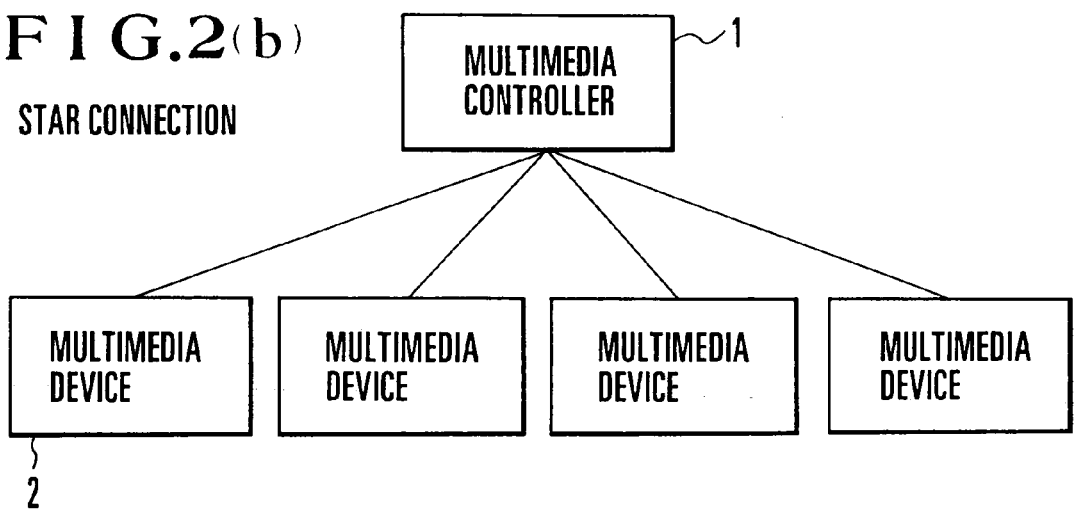
Figure 2C:
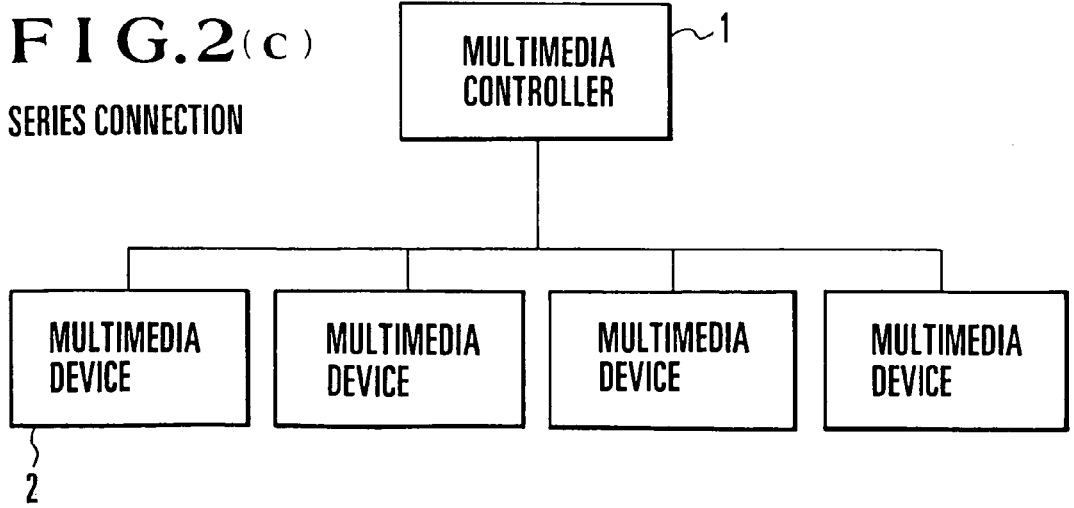

FIGS. 2(a) to 2(c) show the physical connection configurations required to form a bi-directional communication path between the multimedia controller 1 and each of the multimedia devices 2.

FIG. 2(a) shows the daisy chain connection system adopted in SCSI bus systems (ANSI X3.131-1986), FIG. 2(b) shows the star connection system adopted in Ethernet (IEEE 802.3) 10base-T, and FIG. 2(c) shows the series connection system adopted in Ethernet 10Base-2/10base-5.

Regarding the connection configurations, the mixed systems shown in FIGS. 2(a) to 2(c), such as GPIB (IEEE 488), are known, or the mixed systems shown in FIGS. 2(b) and 2(c) are adopted for Ethernet as well. Regarding the communication systems as well, it is possible to select various systems or combinations, such as a system employing optical cables and ISDN.

The following description does not specifically refer to the kinds of techniques for forming such a bi-directional communication path or which technique is to be selected. Physical limitations (such as transfer speed, number of connectable devices, length of connection and shape of connector) due to the differences between communication systems do not present a problem for the bi-directional communication of messages because the hierarchies of protocols differ. However, to securely form interconnections between peripheral devices, it is necessary to use at least one kind of interface physically (mechanically and/or electrically) common to all the connected devices.

To achieve high-speed data communication such as moving-image communication, it is possible to adopt a technique which employs optical communication, such as FDDI (Fiber Distributed Data Interface) or B-ISDN capable of communicating data at speeds higher than Ethernet. By way of example, the following description is made on the assumption that inexpensive and popular Ethernet 10Base-2/10Base-T connectors are employed as common communication connectors.

FIG. 3 is a block diagram showing the internal hardware construction of a general multimedia device.

A plurality of multimedia devices are connected to a multimedia controller by a LAN 4. Since the LAN 4 is Ethernet, an interface part 20 is provided for processing the communications protocol (TCP/IP) of the LAN 4. The interface part 20 can be implemented by using a dedicated LSI or the like. The interface part 20 takes out a received message itself or sends a message to the multimedia controller 1. For example, in the case of Objective-C, a general form of message is expressed as follows:

[target_object method_name: parameter]

In other languages which adopt different forms of expressions but are basically similar to Objective-C, the following items are specified:
 (1) target object
 (2) method (process to be executed)
 (3) parameter (if needed)

The handling of such a message will be described later with reference to the flow of software shown in FIG. 3.

The multimedia device 2 shown in FIG. 3 includes an internal bus 10, a CPU 11 for executing all the software processes and hardware controls, a ROM 12 in which programs, initial values and unique information are stored in advance, a RAM 13 in which to temporarily store data or internal parameters such as the state of the device or which is to be used as a work area during execution of a program, a data I/O 14 for accessing multimedia data 15 stored in an internal or external medium, a mechanism-part driving part 16 for controlling a mechanism part 17 such as a motor, and an electrical-part driving part 18 for controlling an electrical part 19 such as a switch SW or a display system including an LED and others. The CPU 11, the ROM 12, the RAM 13, the data I/O 14, the mechanism-part driving part 16 and the electrical-part driving part 18 are interconnected via the internal bus 10. The multimedia data 15 includes digital data, such as image, sound and texts, which are stored in a particular portion which can take various forms, for example, an optical disk such as a CD-ROM or an MD, or a magnetic tape medium such as a DCC or a DAT, or a semiconductor memory card.

Figure 4:
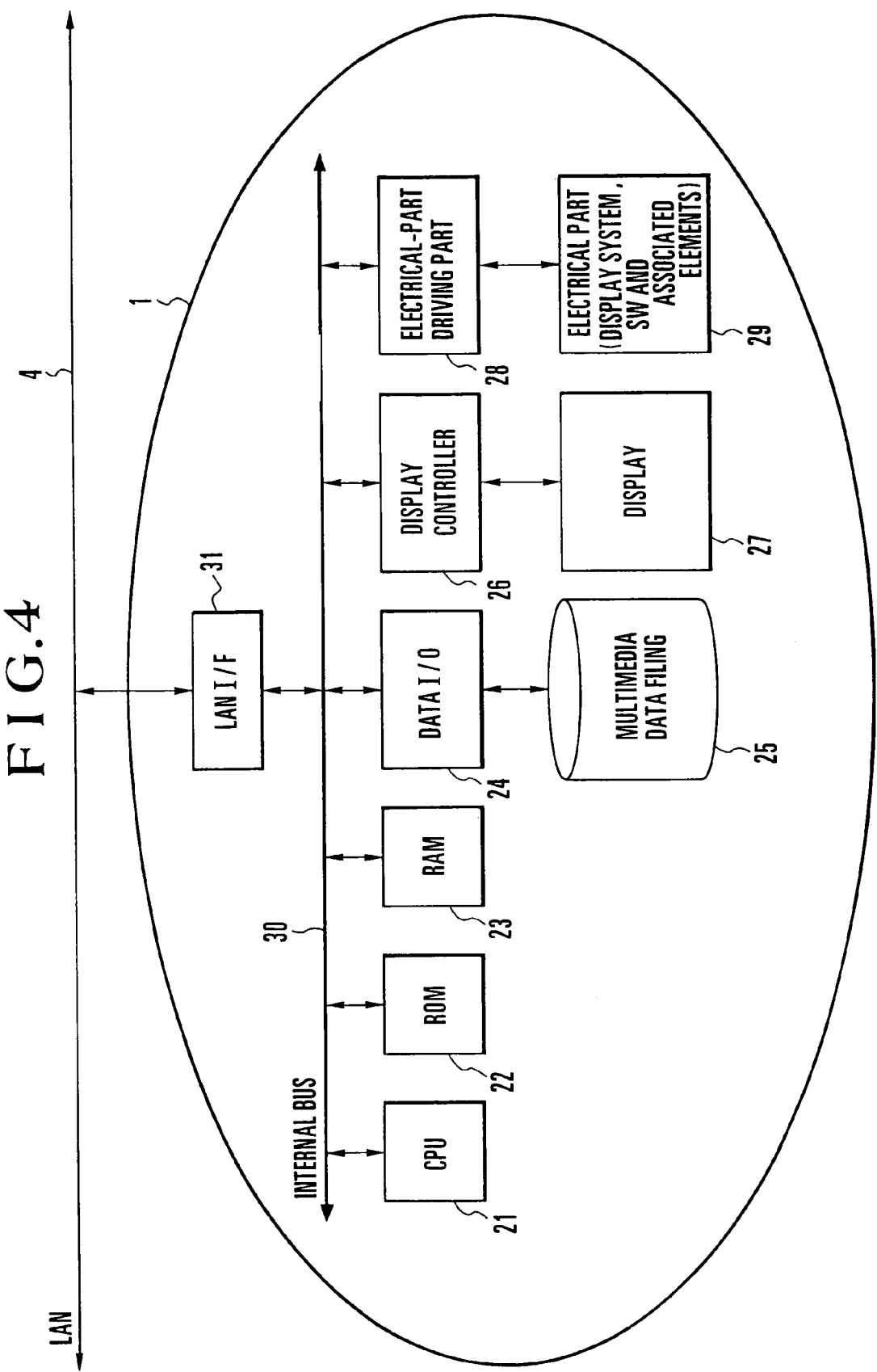
FIG. 4 is a block diagram showing the internal construction of the multimedia controller represented as an object.

FIG. 4 is a block diagram showing the internal hardware construction of the multimedia controller 1.

As shown in FIG. 4, the multimedia controller 1 is connected to the multimedia devices 2 by the LAN 4. Since the LAN 4 is Ethernet, an interface part 31 is provided for processing the communications protocol (TCP/IP) of the LAN 4. The interface part 31 can be implemented by using a dedicated LSI or the like. The interface part 31 takes out a received message itself or sends a message to a desired one of the multimedia devices 2.

The multimedia controller 1 shown in FIG. 4 includes an internal bus 30, a CPU 21 for executing all the software processes and hardware controls, a ROM 22 in which programs, initial values and unique information are stored in advance, a RAM 23 in which to temporarily store data or internal parameters such as the state of the device or which is to be used as a work area during execution of a program, a multimedia filing device 25 for executing processes, such as storage, retrieval, play (reproduction) and editing, of multimedia data with respect to either of an internal medium and an external medium, a data I/O 24 for executing access control of the multimedia filing device 25, an electrical-part driving part 28 for controlling an electrical part 29 such as a switch SW or a display system including an LED and others, a display controller 26 for executing display control of a display 27 which constitutes a man-machine interface, and a pointing device (not shown) such as a mouse. The CPU 21, the ROM 22, the RAM 23, the multimedia filing device 25, the data I/O 24, the electrical-part driving part 28, the electrical part 29, the display controller 26 and the display 27 are interconnected via the internal bus 30.

Figure 6:
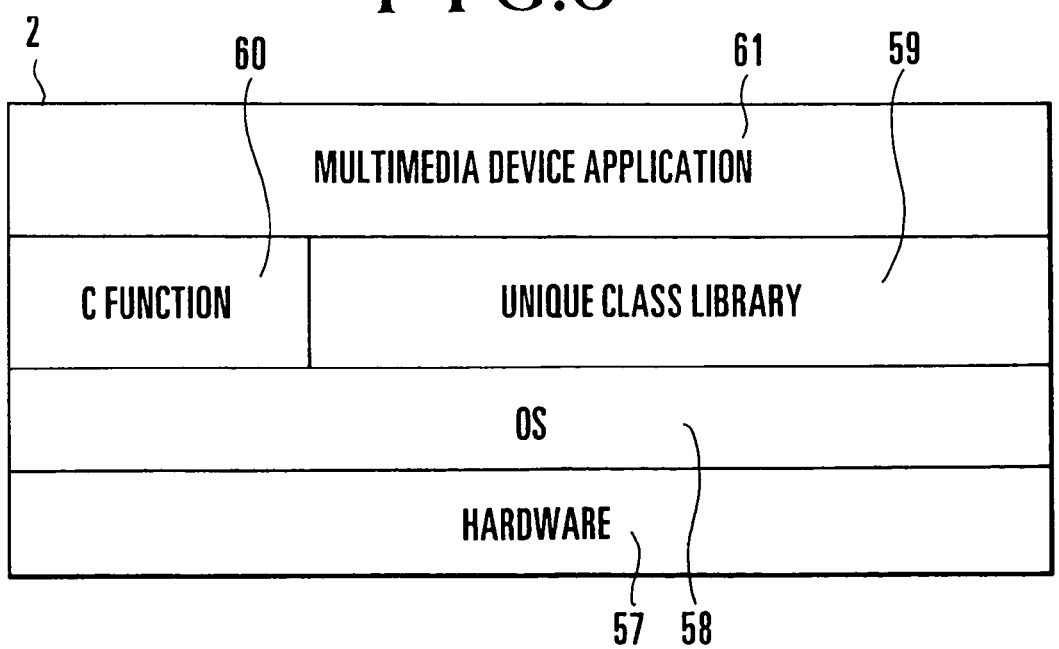
FIG. 6 is a system hierarchical chart of the multimedia device.

FIG. 6 is a system hierarchical chart of the software of the multimedia device 2. The internal block diagram shown in FIG. 3 corresponds to hardware 57, and an OS 58 is provided for executing basic control for controlling the hardware 57. Although the kind of the OS 58 is not limited to a particular OS, it is desirable to select an OS which has both a real-time processing feature and a multitasking function capable of simultaneously executing a plurality of programs in parallel. To represent the multimedia device 2 as an object, a class library 59 unique to the multimedia device 2 is provided above the OS 58.

Although not shown, the system hierarchy also includes a library associated with a control panel of the multimedia device 2 itself as well as control to be executed on the multimedia device 2, which library allows the multimedia device 2 itself to be controlled by the multimedia controller 1. While the multimedia device 2 is connected to the multimedia controller 1, control unique to the multimedia device 2 can be executed by the multimedia controller 1 by transmitting the library to the multimedia controller 1. At the same layer of the system hierarchy, a C function 60 is provided for executing a timer operation and an arithmetic operation.

The uppermost layer of the system hierarchy is occupied by application software 61 which serves to execute control of the multimedia device 2 itself and communications with the multimedia controller 1 as well as providing a user interface. The application software 61 can serve to execute various controls of the multimedia device 2 itself by exchanging massages with the multimedia controller 1, and internal parameters can be read out or modified as instance variables.

Figure 5:
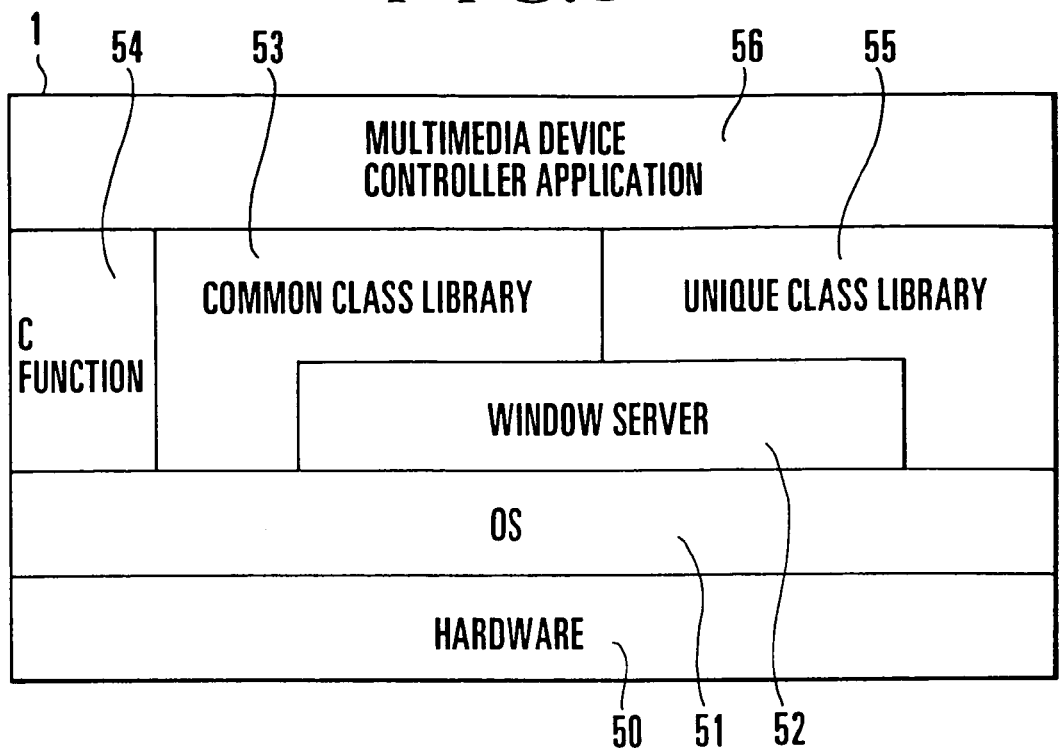
FIG. 5 is a system hierarchical chart of the multimedia controller.

FIG. 5 is a system hierarchical chart of the software of the multimedia controller 1. The internal block diagram shown in FIG. 4 corresponds to hardware 50, and an OS 51 is provided for executing basic control for controlling the hardware 50. Although the kind of the OS 51 is not limited to a particular OS, it is desirable to select an OS which has both a real-time processing feature and a multitasking function capable of simultaneously executing a plurality of programs in parallel.

A window server 52 is provided above the OS 51 for executing GUI (Graphical Users Interface) events, such as display of a control picture for a plurality of connected multimedia devices 2, display of the state of the entire system connection, and switching of controls or switching between data input and data output. A common class library 53 stores a group of basic and common components (a group of objects) associated with a user interface or control, such as button, slide volume and text display area, the components being prepared in the multimedia controller 1 in advance.

A unique class library 55 stores a group of components (a group of objects) associated with a panel display or control unique to a corresponding one of the connected multimedia devices 2. As described previously, the number of unique class libraries 55 increases each time another multimedia device is connected to the system and sends its unique class library to the multimedia controller 1. Specific procedures for sending such a unique class library will be described later. At the same layer of the system hierarchy, a C function 54 is provided for executing a timer operation and an arithmetic operation. The uppermost layer of the system hierarchy is occupied by application software 56 which serves to execute control of the entire connected multimedia device 2 and communications with the multimedia device 2 as well as providing a user interface.

The flow of specific control and the exchange of messages between the multimedia controller 1 and the multimedia devices 2 will be described below.

FIG. 7 is a view showing a state in which the multimedia device 2 has not yet been connected to the multimedia controller 1. Referring to FIG. 7, digital data is communicated by the LAN 4, and the multimedia controller 1 controls the operation of the entire system. The multimedia device 2 to be connected to the LAN 4 has a structure generalized as shown in FIG. 7. A system director object 205 is a software object (hereinafter referred to as "object") which is resident in the multimedia controller 1 and performs management of the entire system.

A multimedia device object 1064 is an object which functions as a multimedia device which is identified as an object by the other objects provided on the LAN 4.

The multimedia device object 1064 includes three objects 1065, 1066 and 1067.

The object 1065 is a multimedia device controller object for executing control of hardware to realize a greater part of the functions of the multimedia device 2. The object 1066 is a multimedia device data input object which serves to receive digital data inputted from another device via the LAN 4. The object 1067 is a multimedia device data output object which serves to output digital data to another device via the LAN 4.

Reference numeral 1061 denotes a multimedia device delegate object description file which describes the specifications of a multimedia device delegate object generated in the multimedia controller 1 when the multimedia device 2 is connected to the multimedia controller 1 via the LAN 4. The multimedia device delegate object description file 1061 includes a multimedia device control panel object description part 1062 which describes the specifications of a manipulation panel for the multimedia device 2 and a data input/output delegate object description part 1063 which describes the specifications of a data input/output delegate object which serves as a delegate to input or output data to or from the multimedia device 2. The multimedia device control panel object description part 1062 realizes the function of a GUI description language which describes a control panel to be used for manipulating the multimedia device 2 through a GUI.

Figure 8:
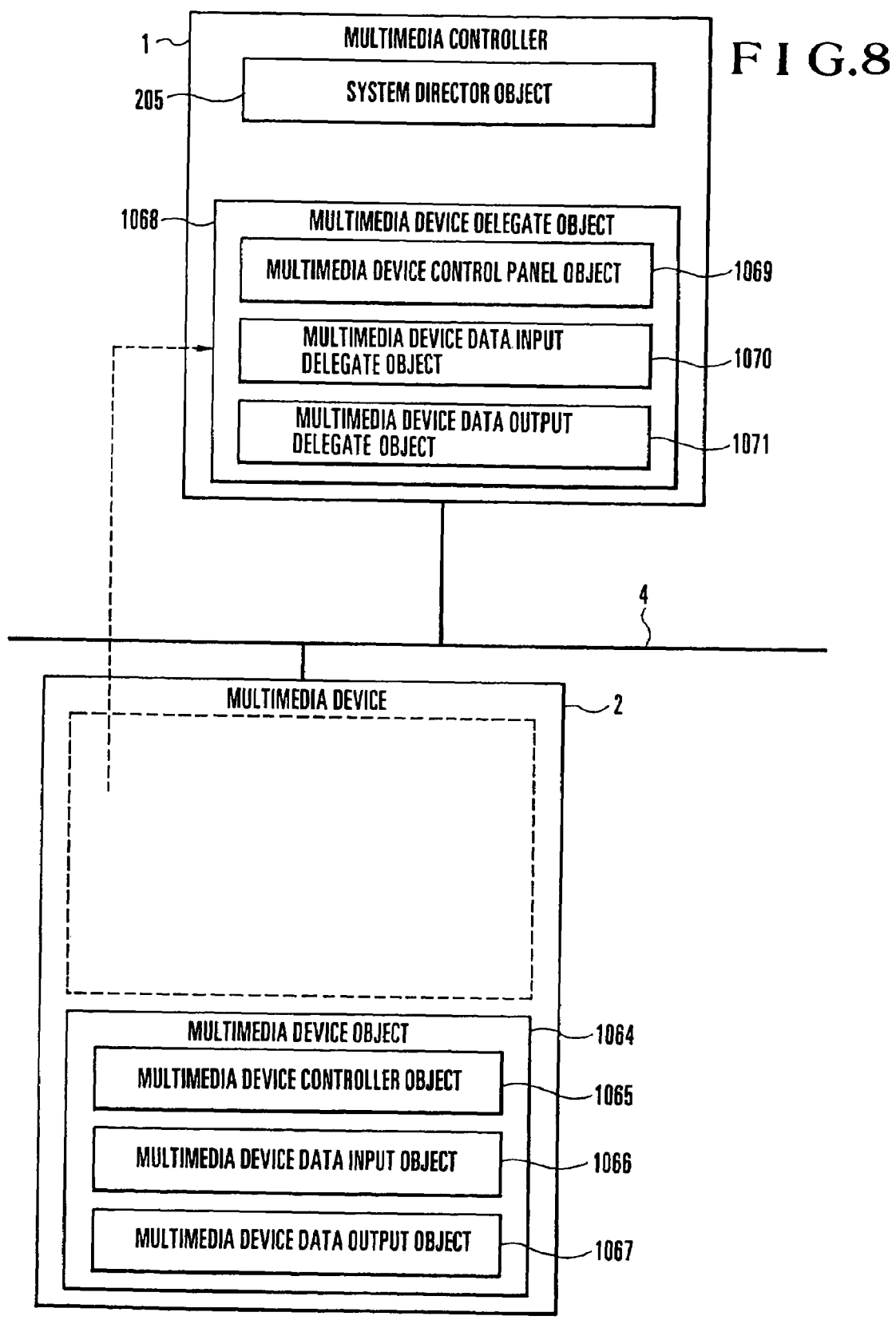
FIG. 8 is a view showing a state in which the multimedia device is connected to the LAN.

FIG. 8 is a view showing a state in which the multimedia device 2 is connected to the LAN 4. Referring to FIG. 8, a multimedia device delegate object 1068 is generated in the multimedia controller 1 and functions as the delegate of the multimedia device 2 in the multimedia controller 1. The multimedia device delegate object 1068 includes a multimedia device control panel object 1069 which functions as a control panel of the multimedia device 2, a multimedia device data input delegate object 1070 which functions as the delegate of the multimedia device data input object 1066 during inputting of data, and a multimedia device data output delegate object 1071 which functions as the delegate of the multimedia device data output object 1067.

Figure 9:
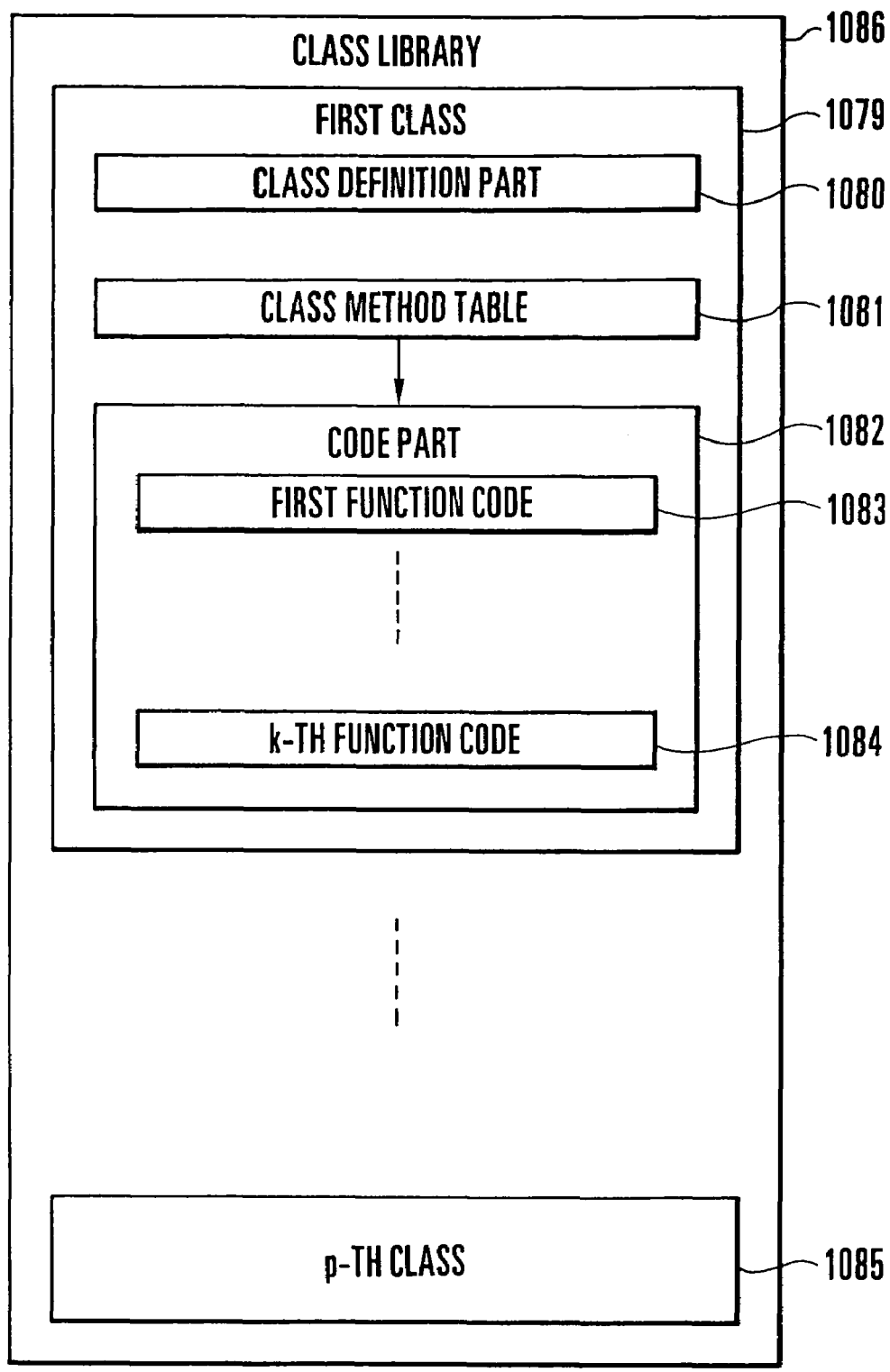
FIG. 9 is a view showing the construction of a general class library.

FIG. 9 is a view showing the construction of a general class library. Referring to FIG. 9, a first class 1079 is a class which functions as a template for generating objects for defining the nature or function common to objects having similar natures. A class library 1086 includes p classes, i.e., the first class 1079 to a p-th class 1085, and each object belongs to a particular one of the classes. A class definition part 1080 defines the data types and the names of internal variables of objects which belong to the class 1079, as well as the data types and the names of internal functions (generally called "class method") representative of data processing means. A class method table 1081 contains pointers to individual codes of the class method in the form of a table to enable access to the class method. A code part 1082 stores k function codes of the class method which include a first function code 1083 to a k-th function code 1084.

FIG. 10 is a view showing the structure of a general object. As shown in FIG. 10, an object 234 includes a pointer-to-class-method-table storage part 244, message communicating means 245, processing retrieving means 246, a method part 239 and an internal data part 235. The method part 239 includes m data processing means, i.e., first data processing means 240, second data processing means 241, m-th data processing means 242. An internal data part 235 includes n internal data, i.e., first internal data 236, second internal data 237, . . . , n-th internal data 238.

Since the individual internal data 236, 237, . . . , 238 which constitute the internal data part 235 are unique to the corresponding object 234, they are contained in the object 234. However, since the data processing means 240, 241, . . . , 242 which constitute the method part 239 can be shared by objects which belong to the same class, the data processing means of from the first data processing means 240 to the m-th data processing means 242 are managed for each class by the class method table 243 and shared by a plurality of objects which belong to the same class. The class method table 243 is referred to by each of the objects by means of the pointers stored in the pointer-to-class-method-table storage part 244.

The message communicating means 245 receives a message from another object and sends it to the processing retrieving means 246. The processing retrieving means 246 analyzes the message, retrieves data processing means which corresponds to the message from the method part 239 (actually, the class method table 243), and causes the retrieved data processing means to execute data processing.

The data processing means executes predetermined processing of the data added to the message, internal data present in the internal data part 235 and external data. In the case of processing which needs to send a message to another object, the message is sent out to the desired object by means of the message communicating means 245.

Figure 11:
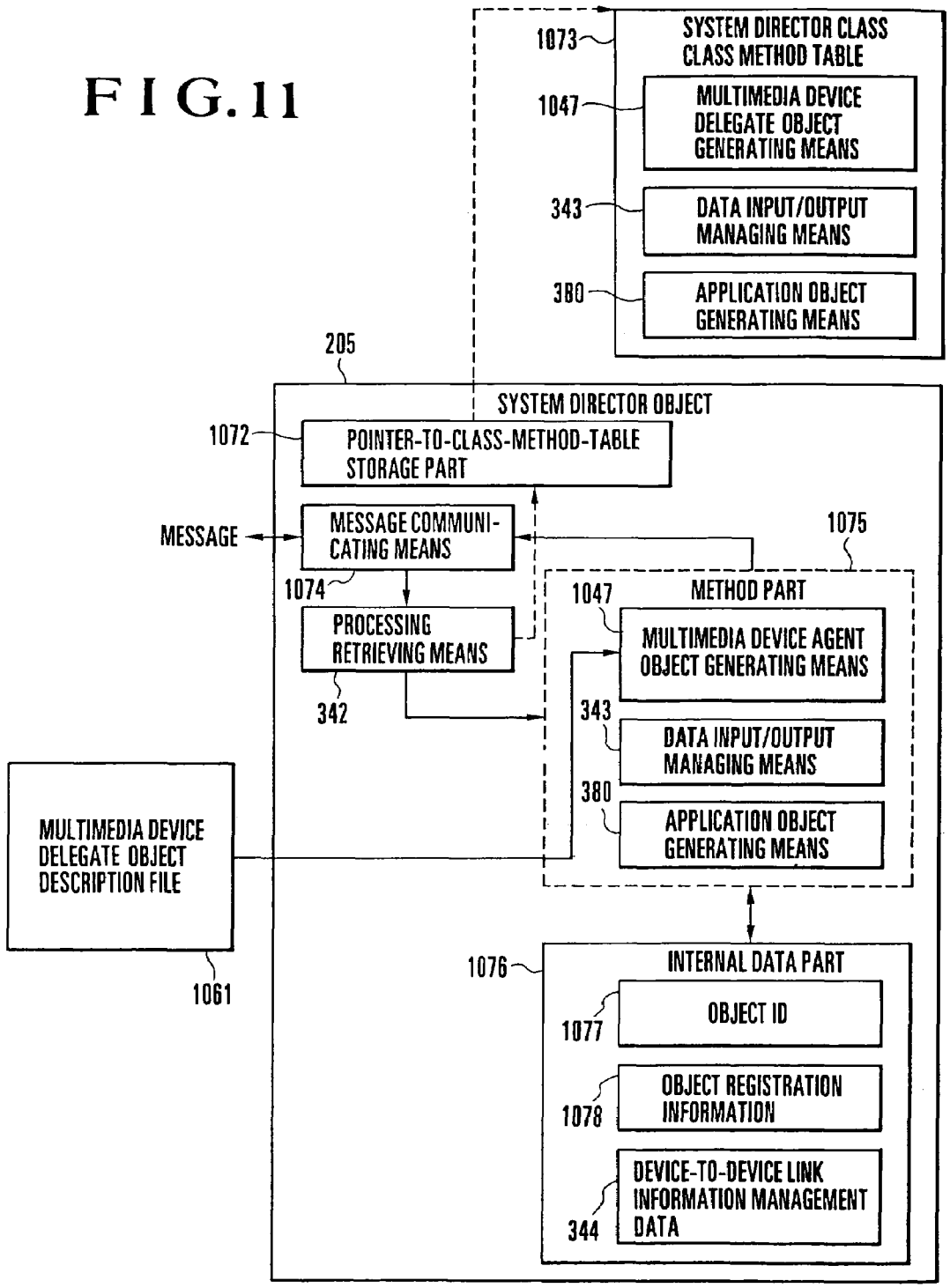
FIG. 11 is a view showing the structure of a system director object.

FIG. 11 is a view showing the structure of the system director object 205. The system director object 205 shown in FIG. 11 includes a pointer-to-class-method-table storage part 1072 which stores pointers to a system director class class method table 1073, multimedia device delegate object generating means 1047 for generating the multimedia device delegate object 1068 (refer to FIG. 8) on the basis of the description of the multimedia device delegate object description file 1061, data input/output managing means 343 for managing inputting and outputting of data between objects, application object generating means 380 for generating application objects for various purposes, message communicating means 1074, processing retrieving means 342, a method part 1075, and an internal data part 1076. The internal data part 1076 includes an object ID 1077, device-to-device link information management data 344 to be used for causing a plurality of multimedia devices to perform a particular operation, and object registration information 1078 about connected multimedia devices and generated objects.

In operation, when the multimedia device 2 is connected to the LAN 4, the system director object 205 reads the multimedia device delegate object description file 1061 by using the multimedia device delegate object generating means 1047, selects a class to which an object to be generated belongs, from the information described in the multimedia device delegate object description file 1061, and generates the multimedia device delegate object 1068 on the basis of the class definition part 1080 of the selected class in the class library 1086.

Figure 12:
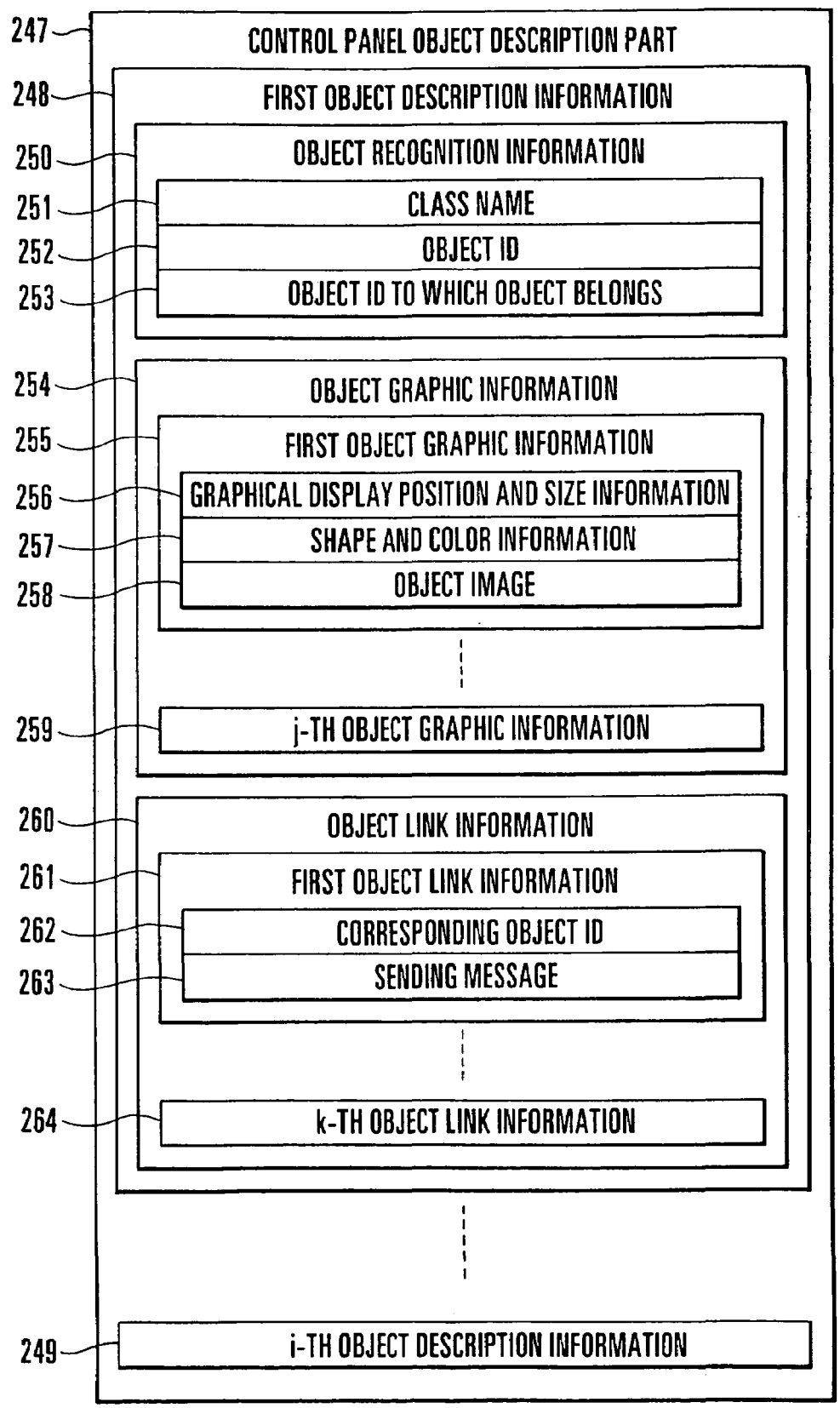
FIG. 12 is a view showing the construction of a control panel description part of a delegate object description file.

FIG. 12 is a view showing the construction of the control panel description part of a delegate object description file. Referring to FIG. 12, a control panel object description part 247 includes i pieces of object description information, i.e., first object description information 248 to an i-th object description information 249. One piece of object description information includes object recognition information 250, object graphical-display information 254 and object link information 260.

The object recognition information 250 includes a class name 251 indicative of a class to which the corresponding object belongs, an object ID 252 which is an ID unique to an i-th object, and an object ID 253 indicative of the ID of an object to which the i-th object directly belongs.

The object graphic information 254 is information to be used for graphically displaying objects, such as buttons which constitute part of a control panel display picture 231, and includes j pieces of object graphic information, i.e., first object graphic information 255 to j-th object graphic information 259. One piece of object graphic information includes graphical-display position and size information 256, shape and color information 257 and an object image 258.

The object link information 260 includes a description which provides link information about a link between an object, such as a digital VTR controller object 207, which constitutes a control panel object and an object to which such an object corresponds. The object link information 260 includes k pieces of object link information, i.e., first object link information 261 to k-th object link information 264.

One piece of object link information includes a corresponding object ID 262 and a sending message 263 to be sent out to a corresponding object.

Figure 13:
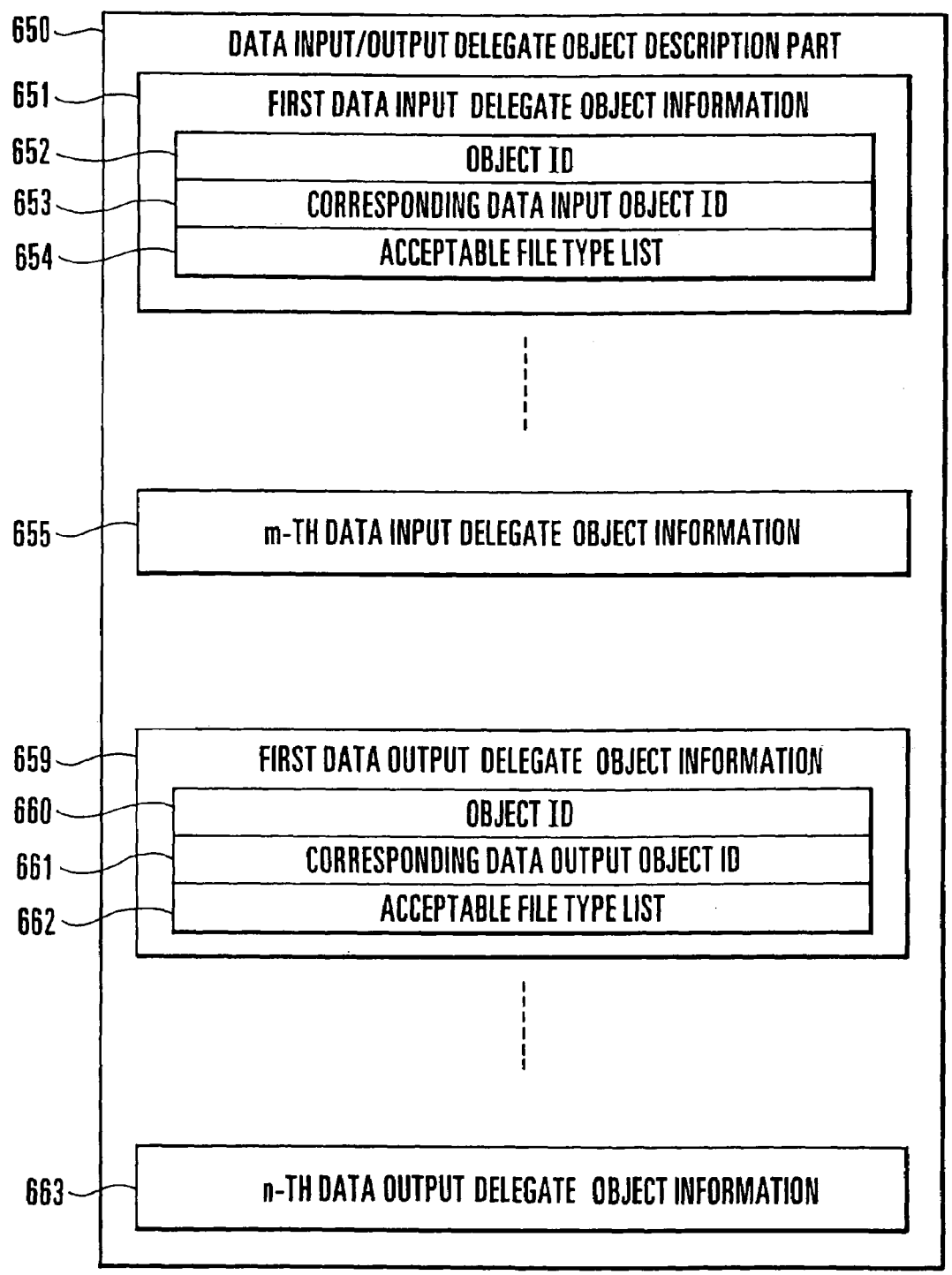
FIG. 13 is a view showing the construction of a data input/output object description part of the delegate object description file.

FIG. 13 shows the construction of a data input/output delegate object description part of the delegate object description file. In FIG. 13, a data input/output delegate object description part 650 includes first input delegate object information 651, . . . , m-th input delegate object information 655. Each of the input delegate object information 651 to 655 includes an object ID 652 of its own, a link-target corresponding data input object ID 653 indicative of the ID of a data input object to be linked, and an acceptable file type list 654 which is a list of file types which can be inputted. The data input/output delegate object description part 650 also includes first output delegate information 659, . . . , n-th output delegate object information 663. Each of the output delegate object information 659 to 663 includes an object ID 660 of its own, a corresponding data output object ID 661 indicative of the ID of a corresponding data output object, and an acceptable file type list 662 which is a list of file types which can be outputted.

The operation of the above-described embodiment will be described below with reference to a digital VTR which is one specific example of the multimedia devices 2 based on the above-described system control system.

Figure 14:
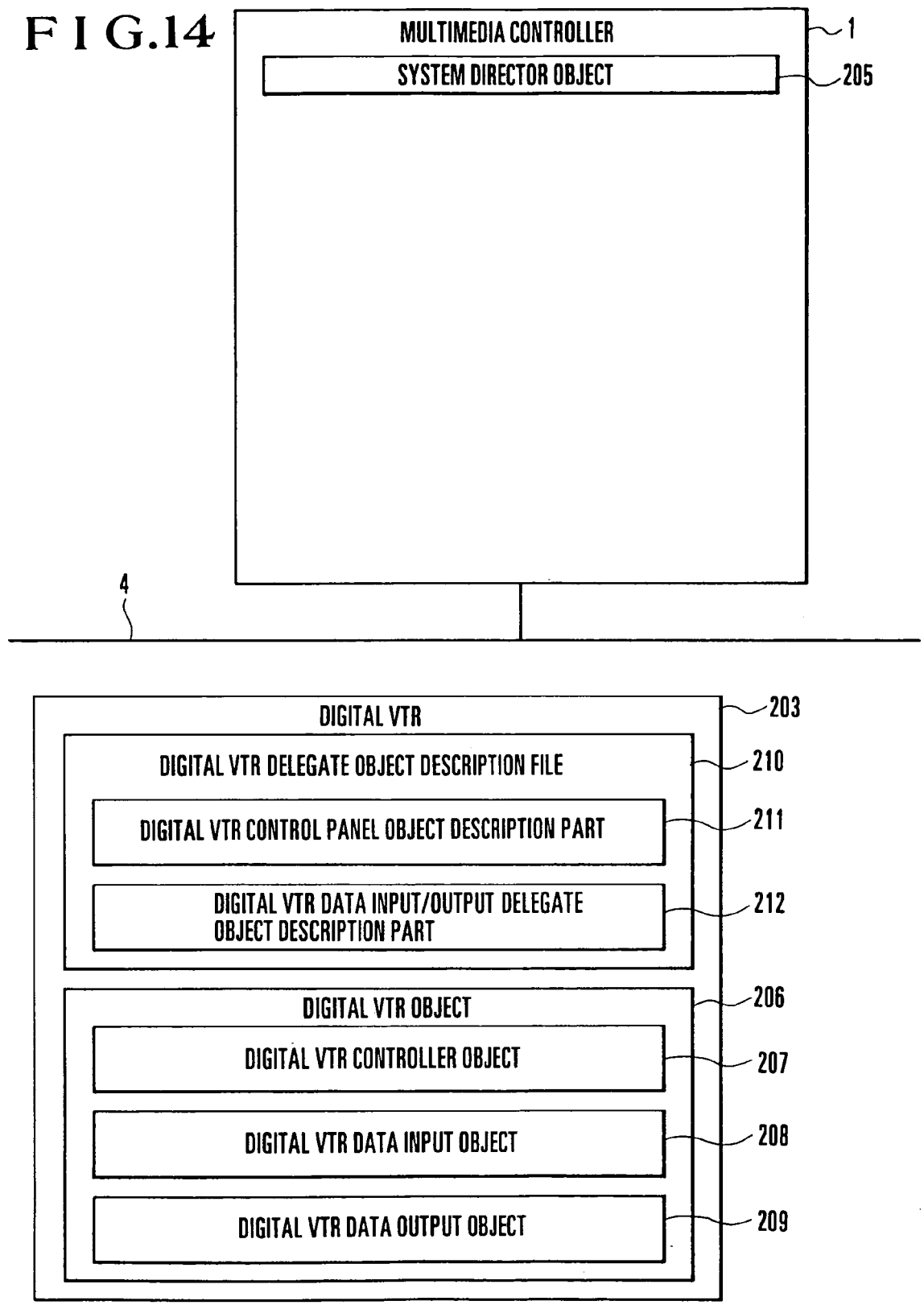
FIG. 14 is a view showing a state in which a digital VTR represented as an object has not yet been connected to the multimedia controller.

FIG. 14 is a view showing a state in which a digital VTR represented as an object has not yet been connected to the multimedia controller 1. As shown in FIG. 14, reference numeral 203 denotes the digital VTR, and a digital VTR object 206 is resident in the digital VTR 203 and functions as a digital VTR which is identified as an object by the other multimedia devices provided on the LAN 4. The digital VTR object 206 includes three objects. A digital VTR controller object 207 executes hardware control of the digital VTR 203.

A digital VTR data input object 208 serves to receive digital data inputted from another multimedia device via the LAN 4. A digital VTR data output object 209 serves to output digital data to another multimedia device via the LAN 4. A digital VTR delegate object description file 210 describes the specifications of a digital VTR delegate object generated in the multimedia controller 1 when the digital VTR 203 is connected to the multimedia controller 1 via the LAN 4.

The digital VTR delegate object description file 210 includes a digital VTR control panel object description part 211 which describes the specifications of a manipulation panel for the digital VTR 203 and a digital VTR data input/output delegate object description part 212 which describes the specifications of a digital VTR data input/output delegate object which serves as a delegate to input or output data to or from the digital VTR 203.

Figure 15:
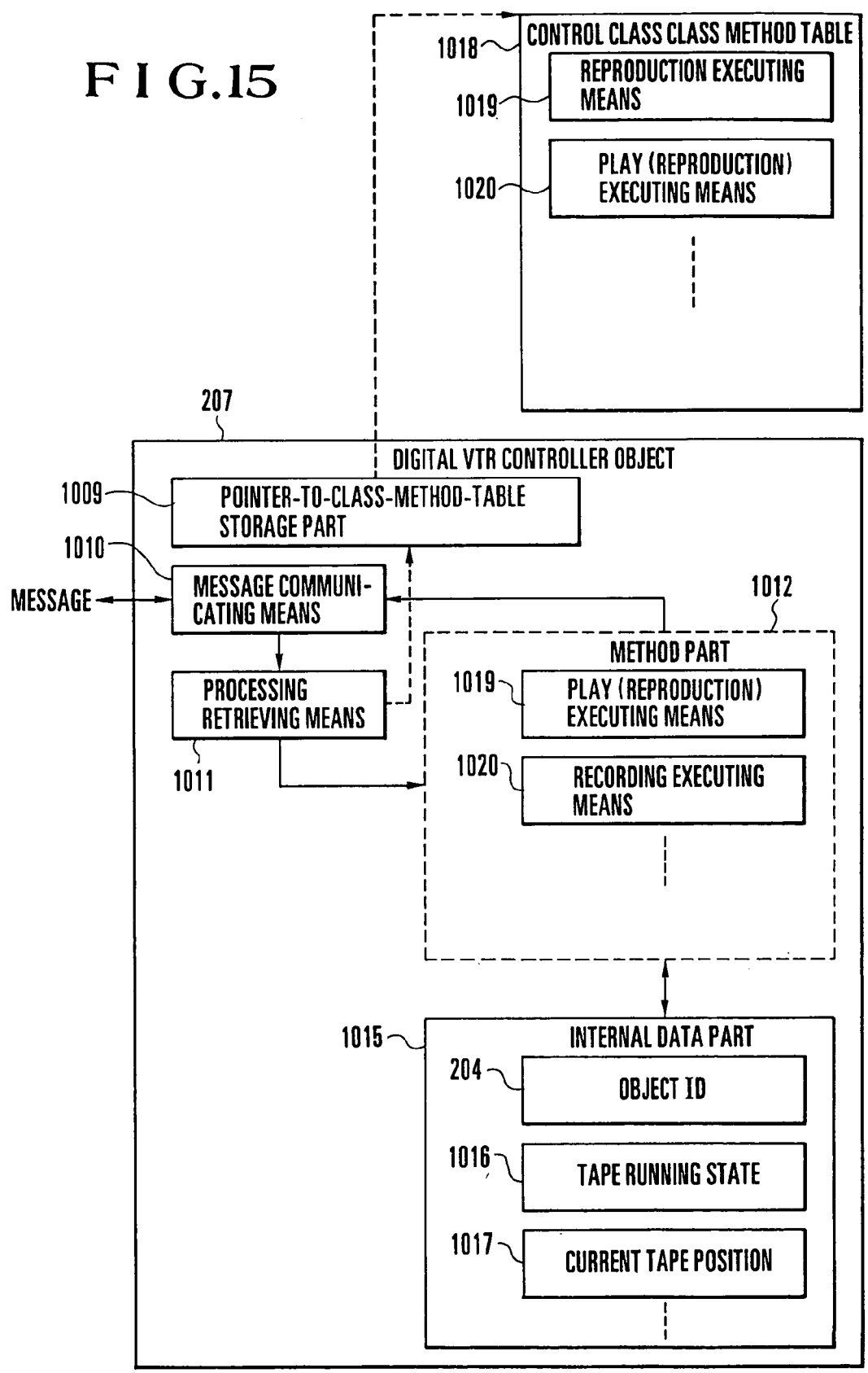
FIG. 15 is a view showing the structure of a VTR controller object.

FIG. 15 is a view showing the structure of the digital VTR controller object 207. Referring to FIG. 15, a pointer-to-class-method-table storage part 1009 stores pointers to a class method table 1018. The class method table 1018 includes a multiplicity of data processing means such as play executing means 1019 for controlling the hardware of the digital VTR 203 executing and executing a playback operation and recording executing means 1020 for executing a recording operation. The digital VTR controller object 207 also includes message communicating means 1010, processing retrieving means 1011, a method part 1012 and an internal data part 1015. A control class class method table 1018 contains actual data processing means to be executed by the method part 1012. The internal data part 1015 includes a multiplicity of variables and status information, such as a tape running state 1016 and a current tape position 1017, which are needed to control the digital VTR 203.

Figure 16:
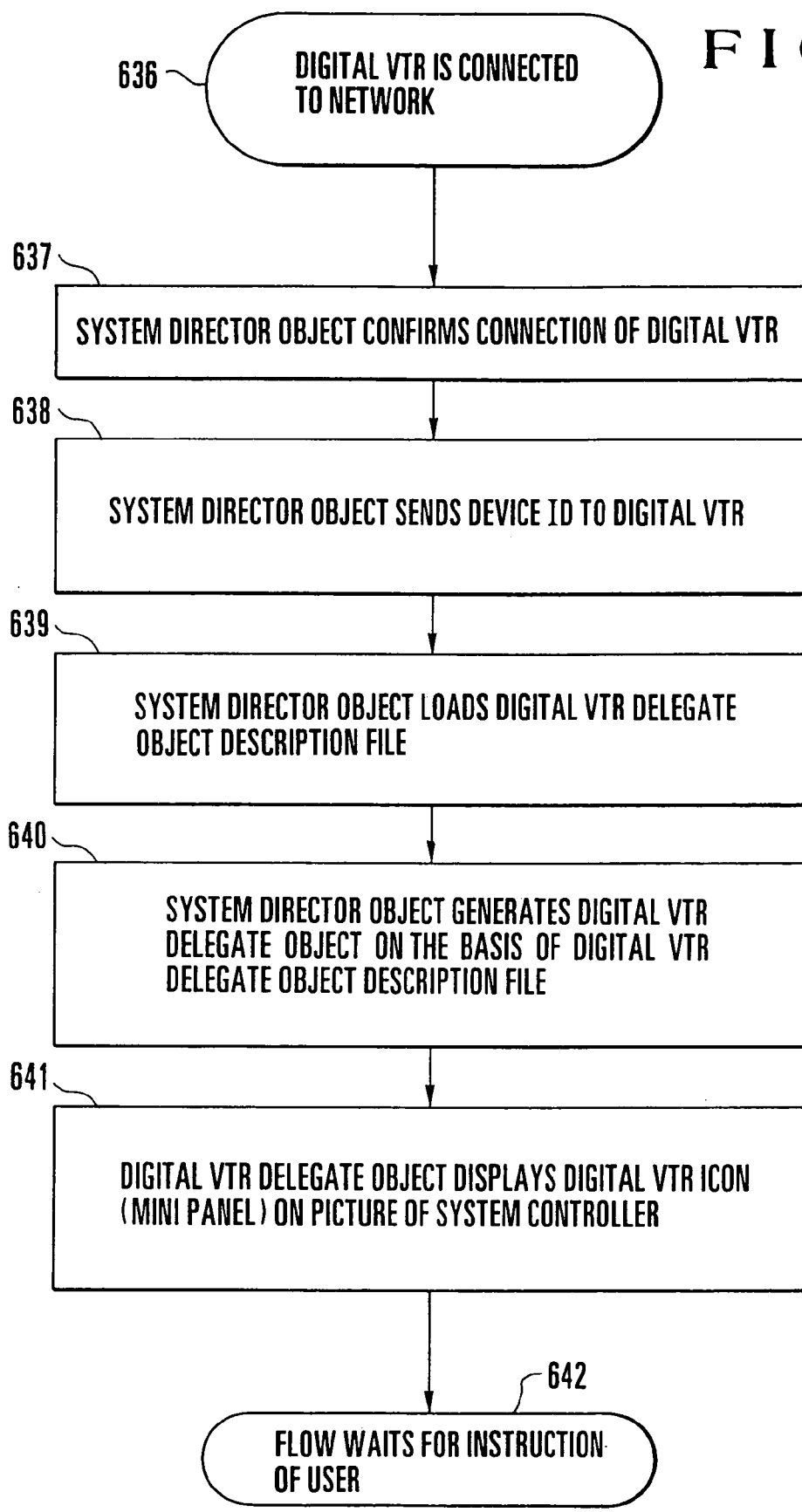
FIG. 16 is a flowchart showing the flow of the operation to be executed when the digital VTR is connected to the LAN.
Figure 17:
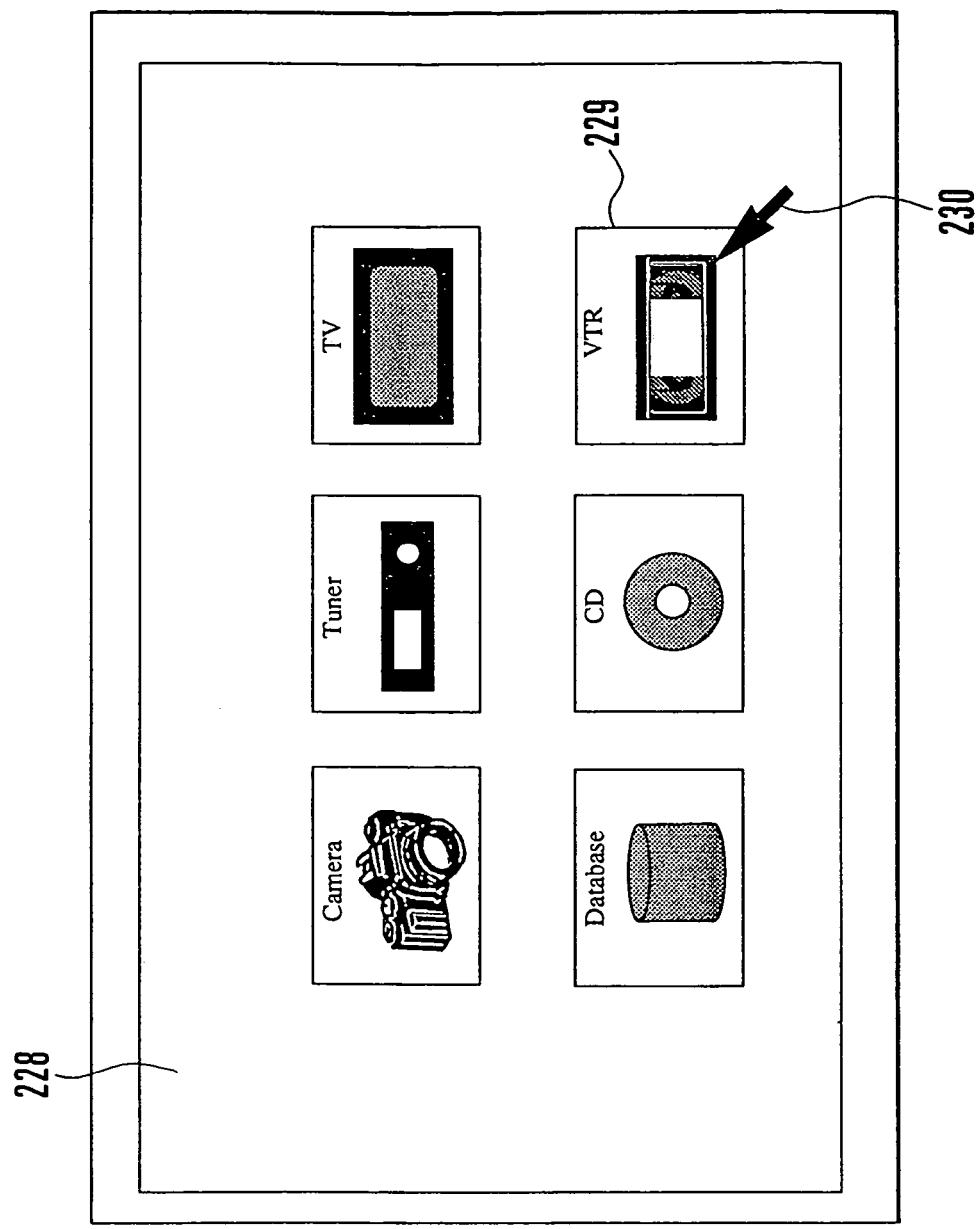
FIG. 17 is a diagrammatic view showing a picture of the multimedia controller.

First of all, an operation to be executed when the digital VTR 203 is connected to the LAN 4 will be described below. FIG. 16 is a flowchart showing the flow of the operation to be executed when the digital VTR 203 is connected to the LAN 4. FIG. 17 is a diagrammatic view showing a picture of the multimedia controller 1. In FIG. 17, reference numeral 228 denotes a display picture of the multimedia controller 1, reference numeral 229 denotes an icon display indicating that the digital VTR 203 is connected, and reference numeral 230 denotes a cursor indicating a position indicated by a pointing device such as a mouse. Although not shown, the pointing device has a button, and the operation of pressing and releasing the button is generally called "click" and the operation of repeating the click twice at a predetermined interval is generally called "double-click". Incidentally, a camera (still image input device), a tuner, a television set, various databases, a CD and other multimedia devices are connectable to the multimedia controller 1, and selection and control of such multimedia devices can be performed through icon displays on the display picture 228.

Figure 18:
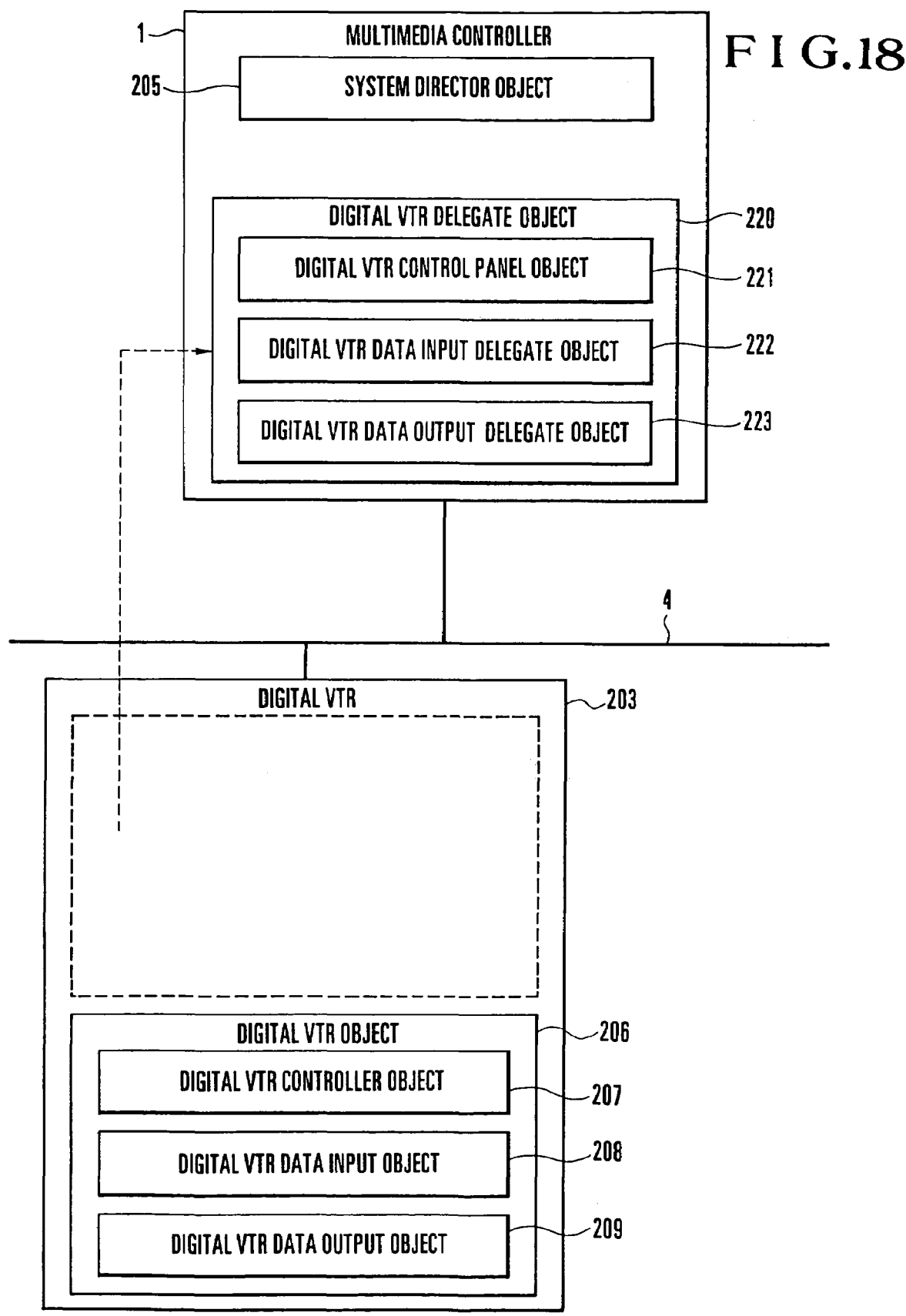
FIG. 18 is a view showing a state in which the digital VTR which is one multimedia device represented as an object is connected to the LAN.

FIG. 18 is a view showing a state in which the digital VTR 203, which is one example of the multimedia devices 2, is connected to the LAN 4. Referring to FIG. 18, a digital VTR delegate object 220 is generated in the multimedia controller 1 when the digital VTR 203 is connected to the LAN 4, and functions as the delegate of the digital VTR 203 in the multimedia controller 1. The digital VTR delegate object 220 includes a digital VTR control panel object 221 which functions as a control panel of the digital VTR 203, a digital VTR data input delegate object 222 which functions as the delegate of the digital VTR data input object 208 during inputting of data, and a digital VTR data output delegate object 223 which functions as the delegate of the digital VTR data output object 209.

An operation to be executed when the digital VTR 203, which is one example of the multimedia devices 2, is connected to the LAN 4 will be described below with reference to FIGS. 16, 17 and 18. When the digital VTR 203 represented as an object is connected to the LAN 4 (Step 636), the system director object 205 recognizes the connection to the digital VTR 203 (Step 637). Then, the system director object 205 sends a device ID to the digital VTR 203 (Step 638).

Then, the system director object 205 loads the digital VTR delegate object description file 210 from the digital VTR 203 by using the multimedia device delegate object generating means 1047 (Step 639). Then, the system director object 205 generates the digital VTR delegate object 220 in the multimedia controller 1 on the basis of the digital VTR delegate object description file 210 by using the multimedia device delegate object generating means 1047 (Step 640). The resultant state of connection is shown in FIG. 18. Then, the digital VTR delegate object 220 displays the icon display 229 of the digital VTR 203 on the display picture 228 of the multimedia controller 1 (Step 641). Subsequently, the digital VTR delegate object 220 waits for an instruction to be inputted by a user (Step 642).

Subsequently, the user can use the digital VTR 203 via the digital VTR delegate object 220 provided in the multimedia controller 1 by manipulating the digital VTR 203 on the basis of the manipulation picture displayed on the basis of the digital VTR control panel object 221 of the multimedia controller 1.

The relationship between the description of the digital VTR delegate object description file 210 and generated objects will be described below in further detail.

Figure 19:
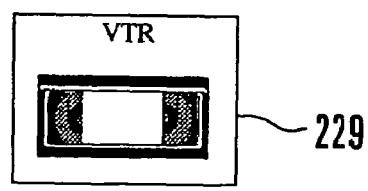
FIG. 19 is a view showing an icon of the digital VTR.
Figure 20:
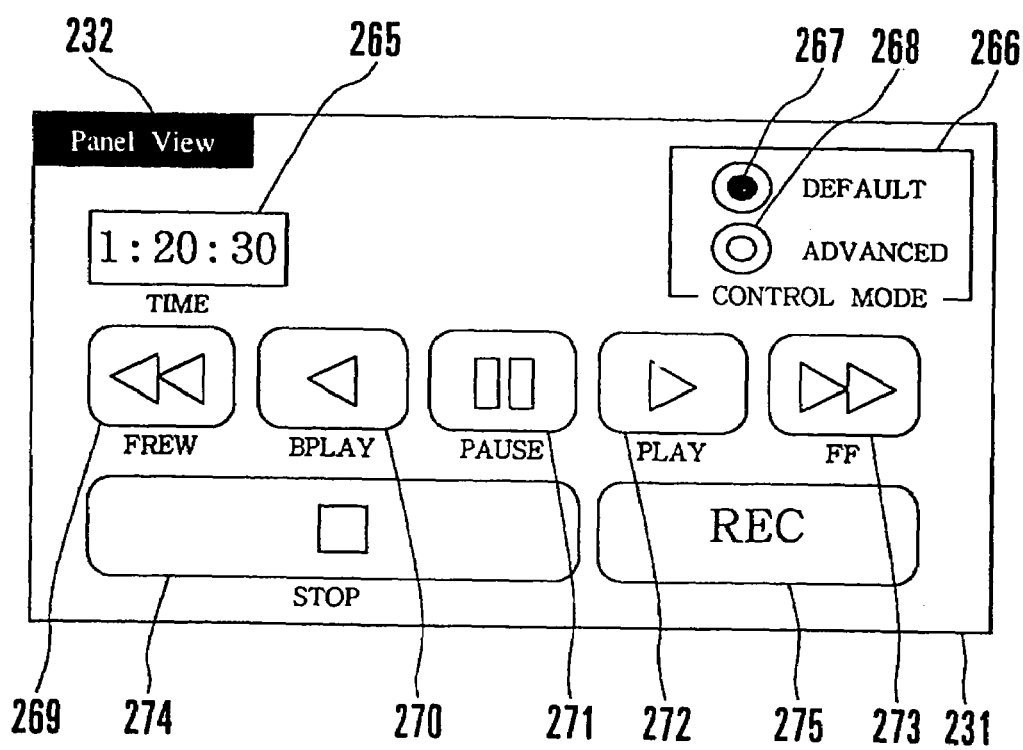
FIG. 20 is a view showing a control panel display picture.

FIG. 19 is a view showing the icon display of the digital VTR 203, and FIG. 20 is a view showing one example of a control panel display picture. FIG. 19 shows the icon display 229 to be displayed when the digital VTR 203 is connected to the LAN 4. FIG. 20 shows a default display picture graphically displayed by the digital VTR control panel object 221. The default display picture includes a control panel display selecting menu 232 displayed on the display picture, a time counter display 265 for indicating the elapsed time of tape, a control mode selecting part 266 for selecting a control mode of the digital VTR 203, a first switch button display 267 for selecting a default control mode, a second switch button display 268 for selecting a detailed control mode, a rewinding button display 269, a reverse play button display 270, a pause button display 271, a play button display 272, a fast forward feed button display 273, a stop button display 274 and a recording button display 275.

Figure 21:
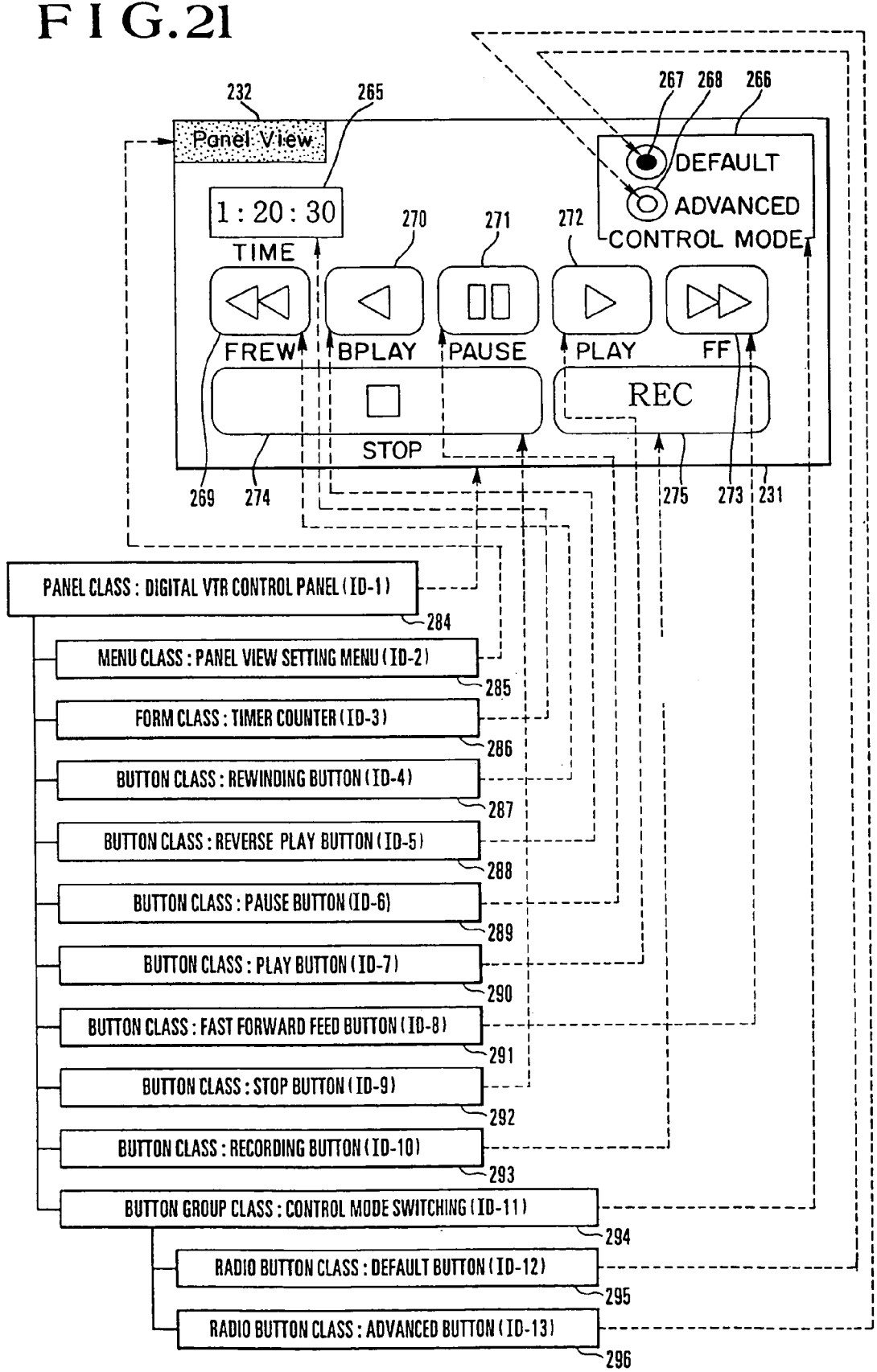
FIG. 21 is a view showing the correspondence between classes to which individual objects belong and the constituent elements of a digital VTR control panel object.

FIG. 21 is a view showing the correspondence between the classes to which individual objects belong and the constituent elements of the digital VTR control panel object 221. The classes to which the respective basic constituent elements belong are defined in the class library 1081 (refer to FIG. 9) in advance, and are held in the multimedia controller 1. As shown in FIG. 21, the individual constituent elements of the digital VTR control panel object 221 functions as objects which constitute the digital VTR control panel object 221.

As shown in FIG. 21, the frame of the control panel display picture 231 corresponds to a VTR control panel object 284 (ID=1) which belongs to a panel class. The control panel display selecting menu 232 corresponds to a panel view setting menu object 285 (ID=2) which belongs to a menu class. The time counter display 265 corresponds to a time counter object 286 (ID=3) which belongs to a form class. The rewinding button display 269 corresponds to a rewinding button object 287 (ID=4) which belongs to a button class. The reverse play button display 270 corresponds to a reverse play button object 288 (ID=5) which belongs to the button class. The pause button display 271 corresponds to a pause button object 289 (ID=6) which belongs to the button class. The play button display 272 corresponds to a play button object 290 (ID=7) which belongs to the button class. The fast forward feed button display 273 corresponds to a fast forward feed button object 291 (ID=8) which belongs to the button class. The stop button display 274 corresponds to a stop button object 292 (ID=9) which belongs to the button class. The recording button display 275 corresponds to a recording button object 293 (ID=10) which belongs to the button class.

The control mode selecting part 266 corresponds to a control mode switching object 294 (ID=11) which-belongs to a button group class. The first switch button display 267 corresponds to a default button object 295 (ID=12) which belongs to a radio button class. The second switch button display 268 corresponds to an advanced button object 296 (ID=13) which belongs to the radio button class.

The generation of the play button object 290 which is one of the objects constituting the digital VTR control panel object 221 will be described below by way of example.

Figure 22:
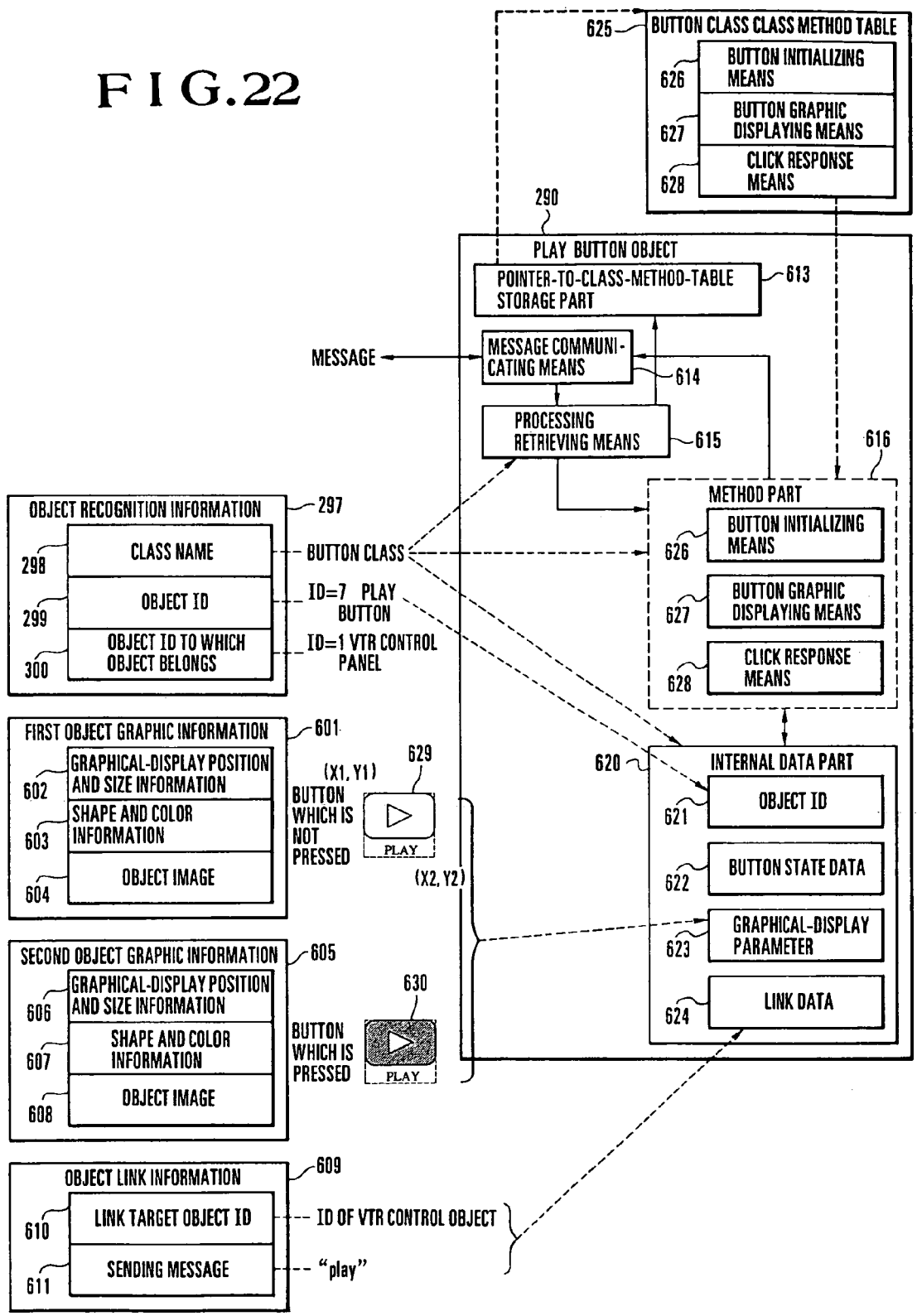
FIG. 22 is an explanatory view showing the generation of a play button object.

FIG. 22 is an explanatory view showing the generation of the play button object 290. In FIG. 22, reference numerals 297, 298, 299, 300, 601, 602, 603, 604, 605, 606, 607, 608, 609, 610 and 611 denote the elements described in the control panel object description part 247 of the digital VTR delegate object description file 210.

The object recognition information 297 includes the class name 298, the object ID 299 and the object ID 300 of an object to which the play button object 290 belongs. The first object graphical-display information 601 includes the graphical-display position and size information 602, the shape and color information 603 and the object image 604. The second object graphical-display information 605 includes the graphical-display position and size information 606, the shape and color information 607 and the object image 608. The object link information 609 includes the link target object ID 610 and the sending message 611.

The play button object 290 is generated from the button class and the information described in the control panel object description part 247 of the digital VTR delegate object description file 210. A pointer-to-class-method-table storage part 613 stores pointers which point to a button class class method table 625. The button class class method table 625 includes button initializing means 626 for initializing the internal variables of a button object when an object of the button class is to be generated, button graphic displaying means 627 for graphically displaying the play button object 290, and click response means 628. If the user specifies a desired position at which the play button object 290 is to be graphically displayed, by means of the cursor 230 of the pointing device such as a mouse and executes a click operation, the click response means 628 responds to the click operation to indicate that the play button object 290 has been clicked, as by temporarily changing the state of a button display, and sends a message to another object.

The definitions of these respective data processing means which are held on the button class class method table 625 are described in a class, and are referred to and used in common by not only the play button object 290 but also all the objects which belong to the other button classes. The play button object 290 includes message communicating means 614 and processing retrieving means 615. The play button object 290 also includes a method part 616 and an internal data part 620. The internal data part 620 includes an object ID 621, button state data 622, a graphical-display parameter 623 and link data 624. The types of internal data to be possessed by not only the play button object 290 but also all the button objects which belong to the button class are described in a class.

The system director object 205 reads the digital VTR delegate object description file 210 to generate the individual objects. In the example shown in FIG. 22, the system director object 205 generates the objects of the button class on the basis of the description of the class name 298 of the object recognition information 297. If the system director object 205 is to generate the digital VTR data output object 209, the internal data part 620 is initialized by the button initializing means 626. In the example shown in FIG. 22, the object ID 621 is set to ID=7 in accordance with the description of the object ID 299. From the description of the object ID 300 of an object to which the object (ID=7) belongs, the system director object 205 understands that the play button object 290 belongs to the digital VTR control panel object 221. Thus, from object ID information about objects to which the respective objects belong, the system director object 205 understands an object-to-object relationship representing which object belongs to which object, and generates an object made up of a plurality of objects in the form of a composite object.

The button graphic displaying means 627 graphically displays the play button object 290 on the basis of the graphical-display parameter 623 and the button state data 622. The button graphic displaying means 627 is automatically executed when a button object is to be generated and when an object to which an object belongs is moved.

The first object graphical-display information 601 describes graphical-display information 629 indicative of the play button which is not pressed. The graphical-display position and size information 602 describes rectangular-frame information indicative of the graphical-display position and the size of the play button object 290 in the digital VTR control panel object 221. The rectangular-frame information is defined by coordinate information relative to the coordinate system of the digital VTR control panel object 221, and is represented by, for example, the coordinates of a top-left point and those of a right-bottom point such as (X1, Y1) and (X2, Y2) of the graphical-display information 629 indicative of the play button which is not pressed. Graphical display of the play button which is not pressed is provided on the basis of either the shape and color information 603 or the object image 604. The shape and color information 603 is described in a language which serves to graphically display an object, such as the way of drawing lines and the way of painting colors. The object image 604 is represented as bit-map data. In general, the shape and color information 603 using such a language does not need a large amount of data, but the object image 604 using the bit-map data provides great flexibility.

The second object graphical-display information 605 describes graphical-display information 630 indicative of the play button which is pressed, in a manner similar to the first object graphical-display information 601. A graphical-display parameter 623 is determined on the basis of the first object graphical-display information 601 and the second object graphical-display information 605. The link data 624 is set on the basis of the object link information 609, and "PLAY" is set as a sending message and a link target object ID is set as the link target object ID 610. In order to uniquely determine a receiver object in the entire system before the message is sent out, the device ID, which is assigned to the digital VTR 203 by the system director object 205 when the digital VTR 203 is connected to the LAN 4, is added to the link target object ID 610.

Accordingly, if identical IDs are assigned to different objects of different devices, it is possible to transmit the message to a desired object. The button state data 622 holds state data indicating whether the play button is pressed.

Figure 23:
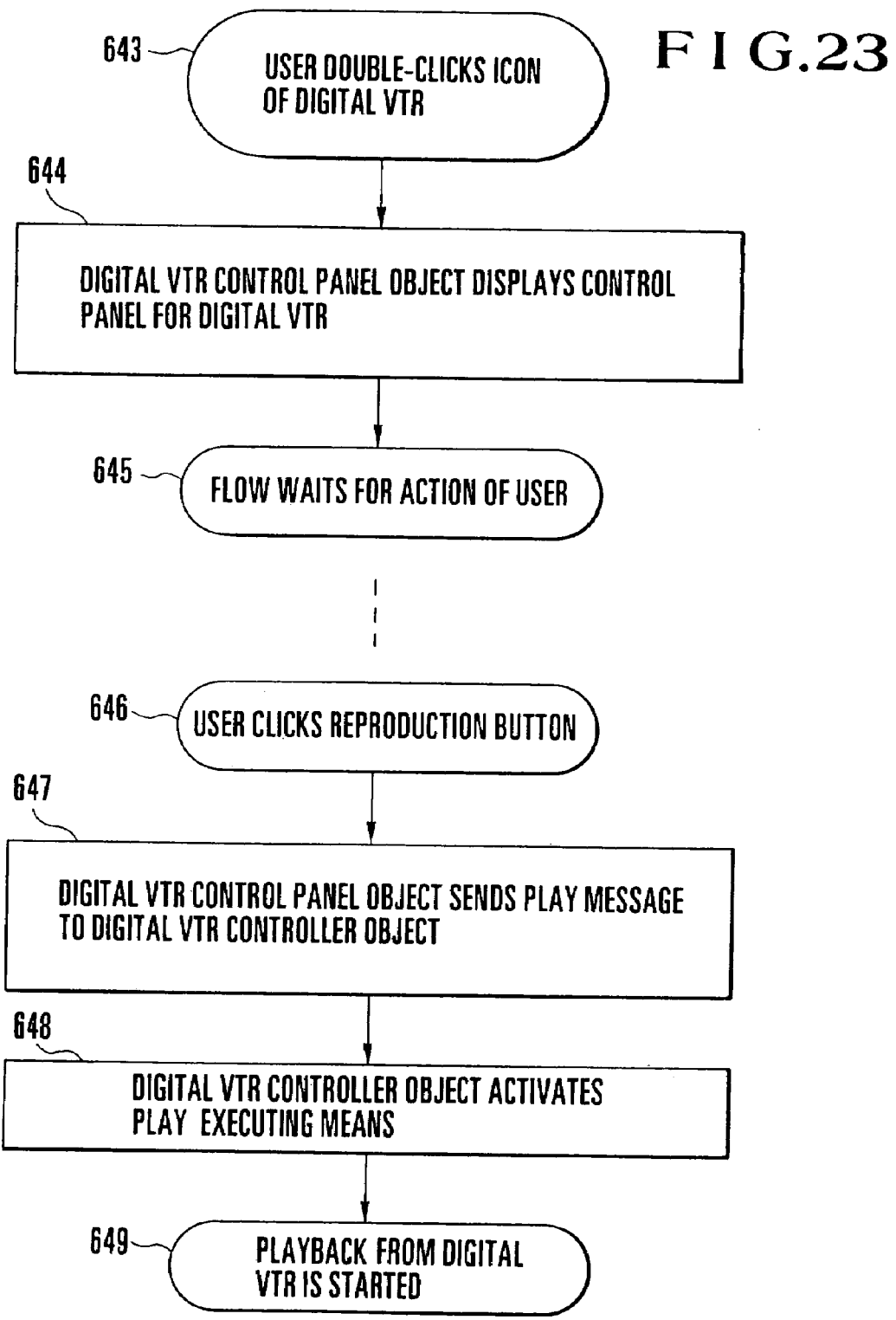
FIG. 23 is a view showing the flowchart of an operation to be executed when a cursor is placed on the icon display of the digital VTR to select a control.

FIG. 23 is a view showing the flowchart of an operation to be executed when a user places the cursor 230 on the icon display 229 of the digital VTR 203 and double-clicks the icon display 229, as well as the flowchart of an operation to be executed when the user manipulates the control panel of the digital VTR 203.

Figure 24:
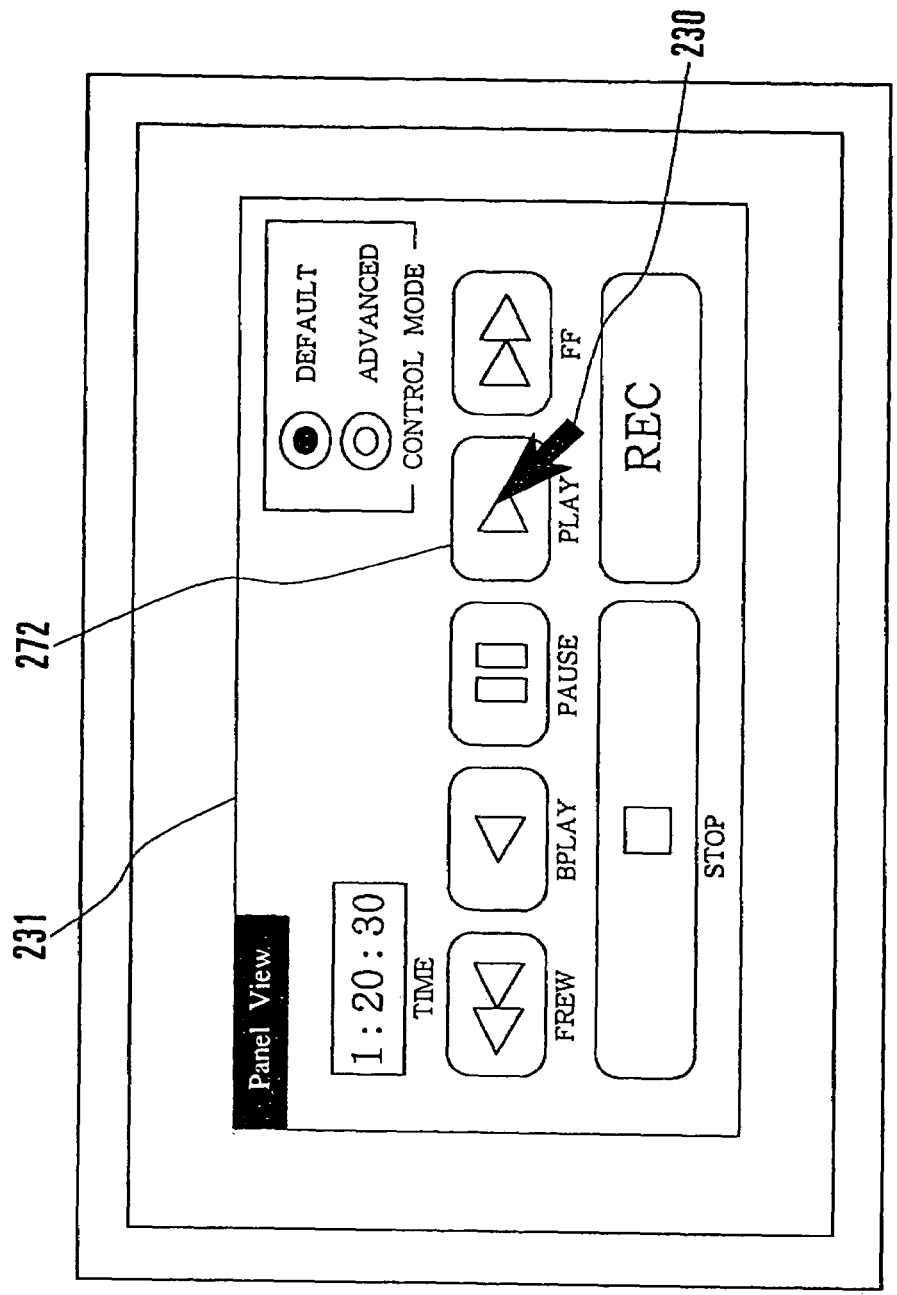
FIG. 24 is a view showing a display picture of the multimedia controller to be displayed when an operator selects a control from among the icon displays of the digital VTR.

FIG. 24 is a view showing a display picture of the multimedia controller 1 to be displayed when the user double-clicks the icon display 229 of the digital VTR 203. In the display picture shown in FIG. 24, the control panel display picture 231 of the digital VTR 203 is displayed as a default control display picture, and the play button display 272 is displayed as shown.

Figure 29:
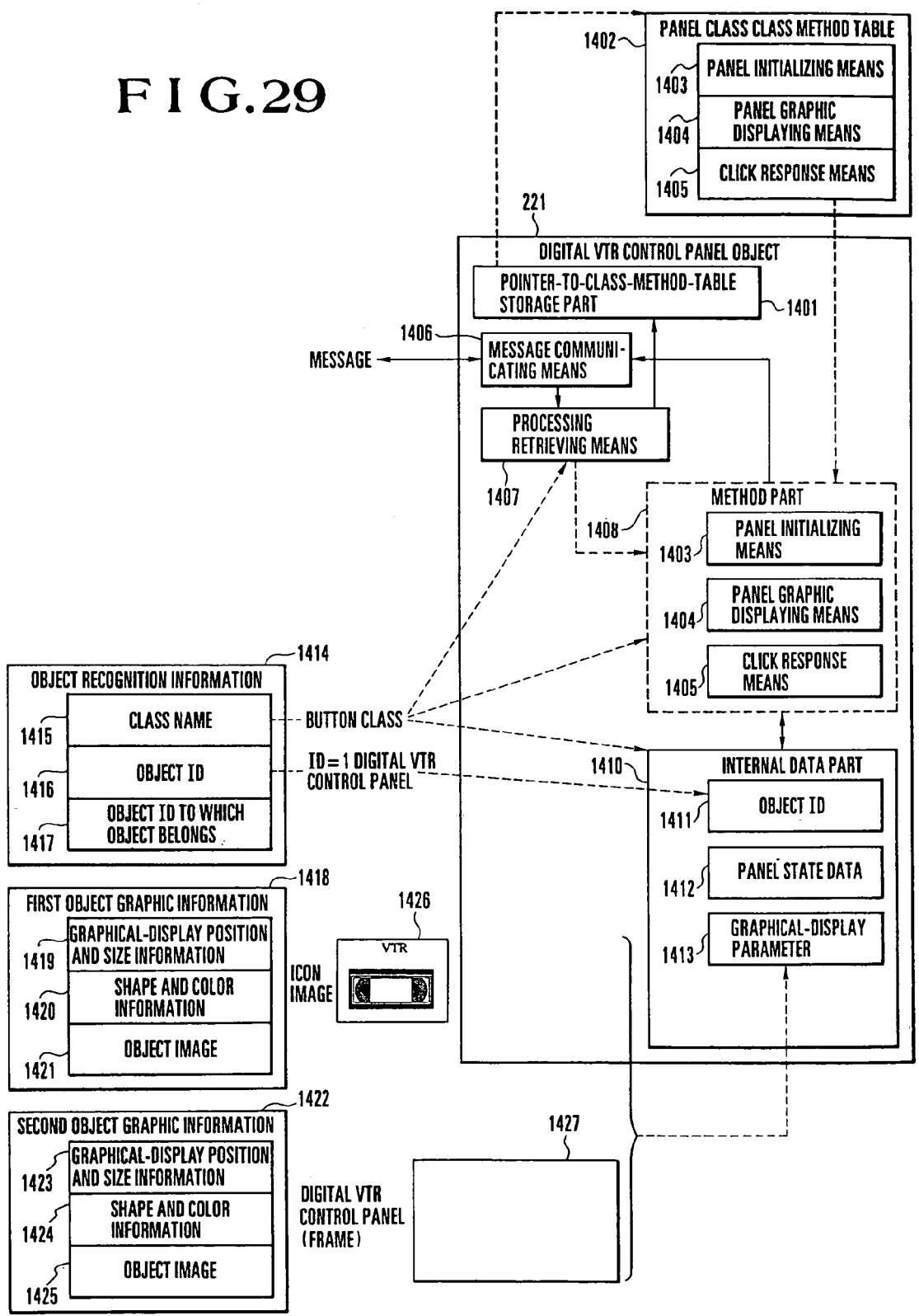
FIG. 29 is a view showing the relation between the structure of a digital VTR control panel object which belongs to a panel class and object description information.

FIG. 29 is a view showing the structure of the digital VTR control panel object which belongs to the panel class as well as the relationship between the structure and object description information.

In FIG. 29, the digital VTR control panel object 221 includes a pointer-to-class-method-table storage part 1401 which stores pointers to a panel class class method table 1402. The panel class class method table 1402 includes panel initializing means 1403 for initializing a panel object, panel graphic displaying means 1404 for graphically displaying a panel, and click response means 1405 for displaying a click response operation when the panel is double-clicked. The digital VTR control panel object 221 also includes message communicating means 1406, processing retrieving means 1407 and internal data part 1410. The internal data part 1410 includes an object ID 1411, panel state data 1412 and a graphical-display parameter 1413. The internal data part 1410 is initialized in accordance with the description of the digital VTR delegate object description file 210. The digital VTR control panel object description part 211 of the digital VTR delegate object description file 210 includes object recognition information 1414, first object graphic information 1418 indicative of an icon image 1426 of the digital VTR 203, and second object graphic information 1422 indicative of a frame 1427 of the control panel of the digital VTR 203. The object recognition information 1414 includes a class name (panel class) 1415, an object ID (ID=1) 1416 and an object ID 1417 of an object to which the object belongs. The first object graphic information 1418 includes graphical-display position and size information 1419, the shape and color information 1420, and an object image 1421. The second object graphic information 1422 includes graphical-display position and size information 1423, shape and color information 1424, and an object image 1425.

The operation of displaying the control panel of the digital VTR 203 and a technique for instructing a playback operation to be executed will be described below with reference to FIGS. 23 and 29.

In the operation described with reference to FIG. 16, at the time when the system director object 205 generates the digital VTR delegate object 220, the digital VTR delegate object 220 displays the icon display 229 on the basis of the icon image 1426. If the user double-clicks the icon display 229 of the digital VTR 203 while placing the cursor 230 on the icon display 229 (step 643), the digital VTR control panel object 221 of the digital VTR delegate object 220 sends messages to all the objects which constitute the digital VTR control panel object 221, thereby instructing all the objects to execute the respective graphical displays. All the objects shown in FIG. 21 execute their graphical display means in accordance with the respective messages, and the digital VTR control panel object 221 graphically displays the frame of the control panel of the digital VTR 203 on the basis of the second object graphic information 1422. Thus, the digital VTR control panel display picture 231 for manipulating the digital VTR 203 is displayed as shown in FIG. 24 (step 644), and the flow waits for an instruction to be given by the user (Step 645). During this state, if the user clicks the play button display 272 of the control panel display picture 231 while placing the cursor 230 on the play button display 272 (Step 646), the digital VTR control panel object 221 sends the massage "PLAY" to a controller object 214 of the digital VTR 203 (Step 647). Thus, the controller object 214 of the digital VTR 203 activates play executing means in response to the message (Step 648). When the play executing means is activated, the play operation of the digital VTR 203 is started (Step 649).

As described above, in accordance with the above-described embodiment, only by connecting a multimedia device to a multimedia controller via a LAN, the multimedia device delegate object required to manipulate the multimedia device is automatically generated in the multimedia controller. Further, the control panel required to manipulate the multimedia device is automatically displayed on the display picture of the multimedia controller, and if a user manipulates the control panel, an appropriate message is sent to a controller object of the multimedia device so that a desired manipulation can be performed. The information required to generate the multimedia device delegate object required to manipulate the multimedia device is obtained from a multimedia device delegate object description file read from the multimedia device. Accordingly, the multimedia controller needs only to have a basic class library, and does not need to have information about a specific multimedia device.

Figure 25:
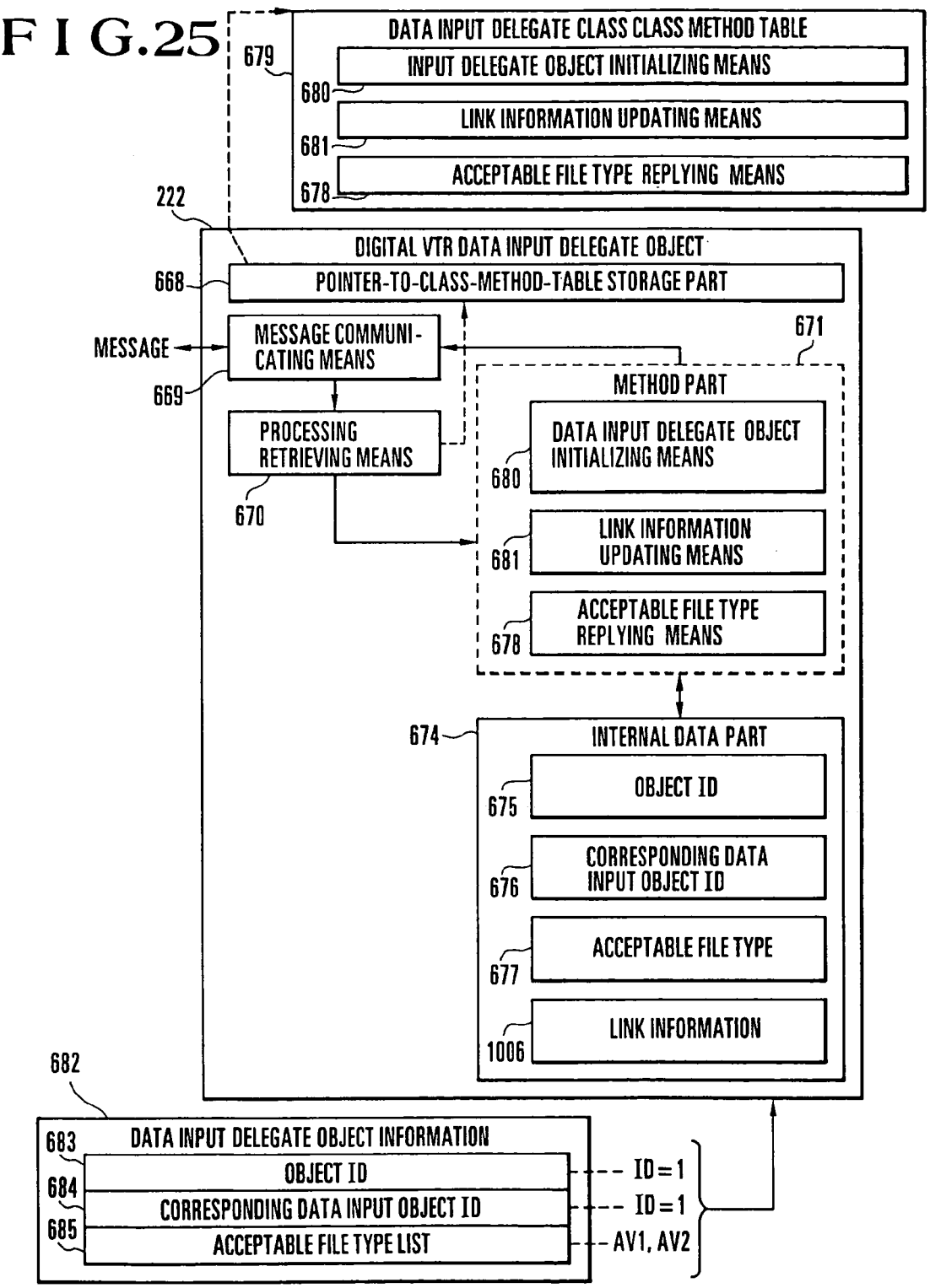
FIG. 25 is a view showing the relation between the structure of a digital VTR data input delegate object and object description information.

FIG. 25 is a view showing the structure of the digital VTR data input delegate object as well as the relationship between the structure and object description information. The digital VTR data input delegate object 222 shown in FIG. 25 includes a pointer-to-class-method-table storage part 668 which stores pointers to a data input delegate class class method table 679. The data input delegate class class method table 679 includes data input delegate object initializing means 680, link information updating means 681 and acceptable file type replying means 678.

The digital VTR data input delegate object 222 also includes message communicating means 669, processing retrieving means 670 and a method part 671. An internal data part 674 includes an object ID 675, corresponding data input object ID 676 indicative of the ID of a corresponding data input object, an acceptable file type 677 indicative of the file types of data which can be inputted, and link information 1006 indicative of a link to a data output object.

The digital VTR data input delegate object 222 is generated on the basis of the digital VTR data input/output delegate object description part 212 of the digital VTR delegate object description file 210. Input delegate object information 682 which is described in the digital VTR data input/output delegate object description part 212 includes an object ID (in this example, ID=1) 683, a corresponding data input object ID (in this example, ID=1) 684, and an acceptable file type list 685 (which conforms to formats called AV1 and AV2, in this example). The data input delegate object initializing means 680 initializes the data of the internal data part 674 in accordance with the descriptions of the input delegate object information 682.

Figure 26:
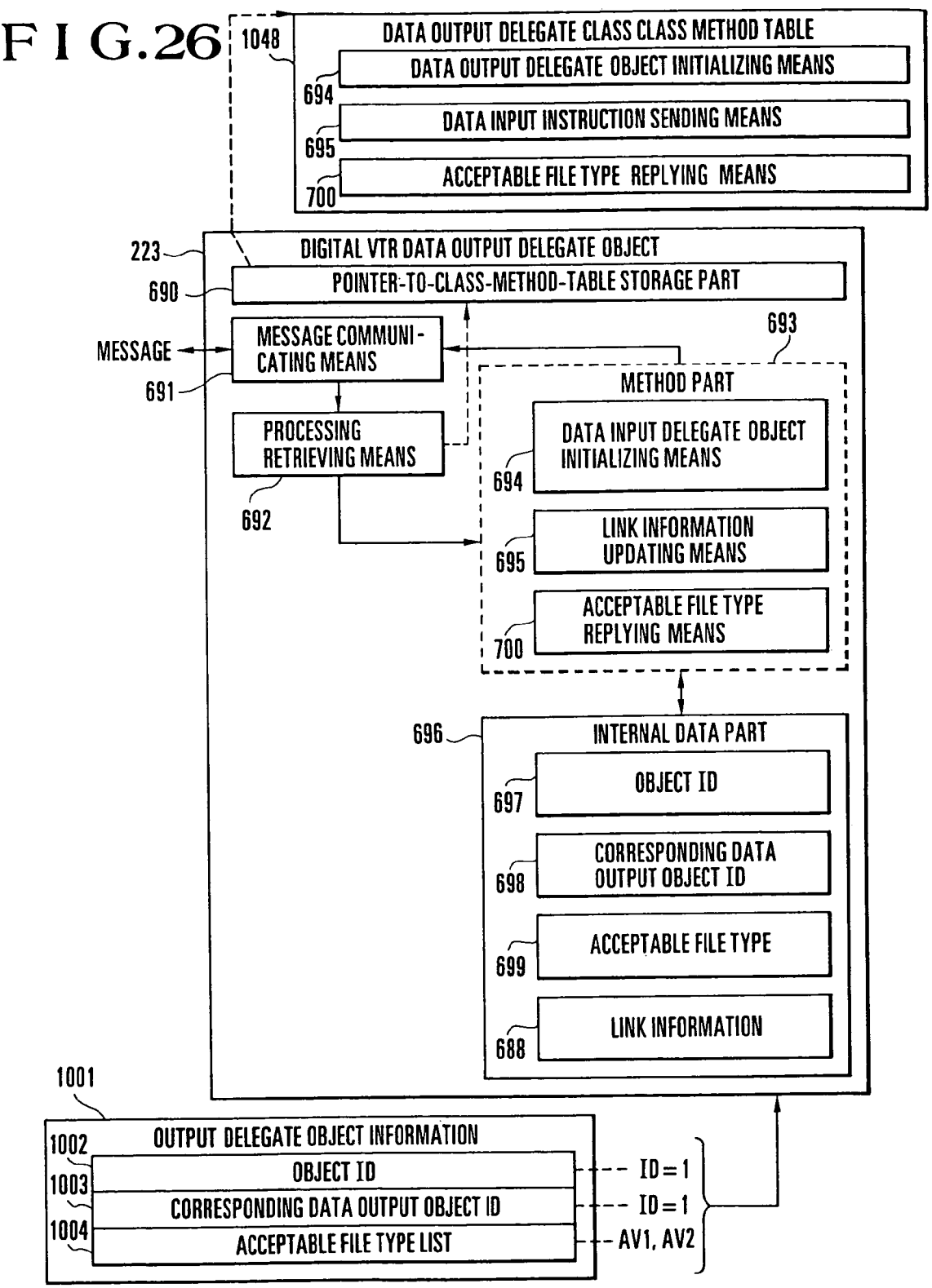
FIG. 26 is a view showing the relation between the structure of a digital VTR data output delegate object and object description information.

FIG. 26 is a view showing the structure of the digital VTR data output delegate object as well as the relationship between the structure and object description information. The digital VTR data output delegate object 223 shown in FIG. 26 includes a pointer-to-class-method-table storage part 690 which stores pointers to a data output delegate class class method table 1048. The data output delegate class class method table 1048 includes data input delegate object initializing means 694, data input instruction sending means 695 and acceptable file type replying means 700.

The digital VTR data output delegate object 223 also includes message communicating means 691, processing retrieving means 692, a method part 693 and an internal data part 696. The internal data part 696 includes an object ID 697, a corresponding data output object ID 698 which is the ID of a corresponding data output object ID, an acceptable file type 699 indicative of the file types of data which can be inputted, and link information 688 indicative of a link to an data output object.

The digital VTR data output delegate object 223 is generated on the basis of the digital VTR data input/output delegate object description part 212 of the digital VTR delegate object description file 210. Output delegate object information 1001 which is described in the digital VTR data input/output delegate object description part 212 includes an object ID (in this example, ID=1) 1002, a corresponding data output object ID (in this example, ID=1) 1003 and an acceptable file type list 1004 (which conforms to the formats called AV1 and AV2, in this example). The data output delegate object initializing means 694 initializes the data of the internal data part 696 in accordance with the description of the output delegate object information 1001.

Figure 27:
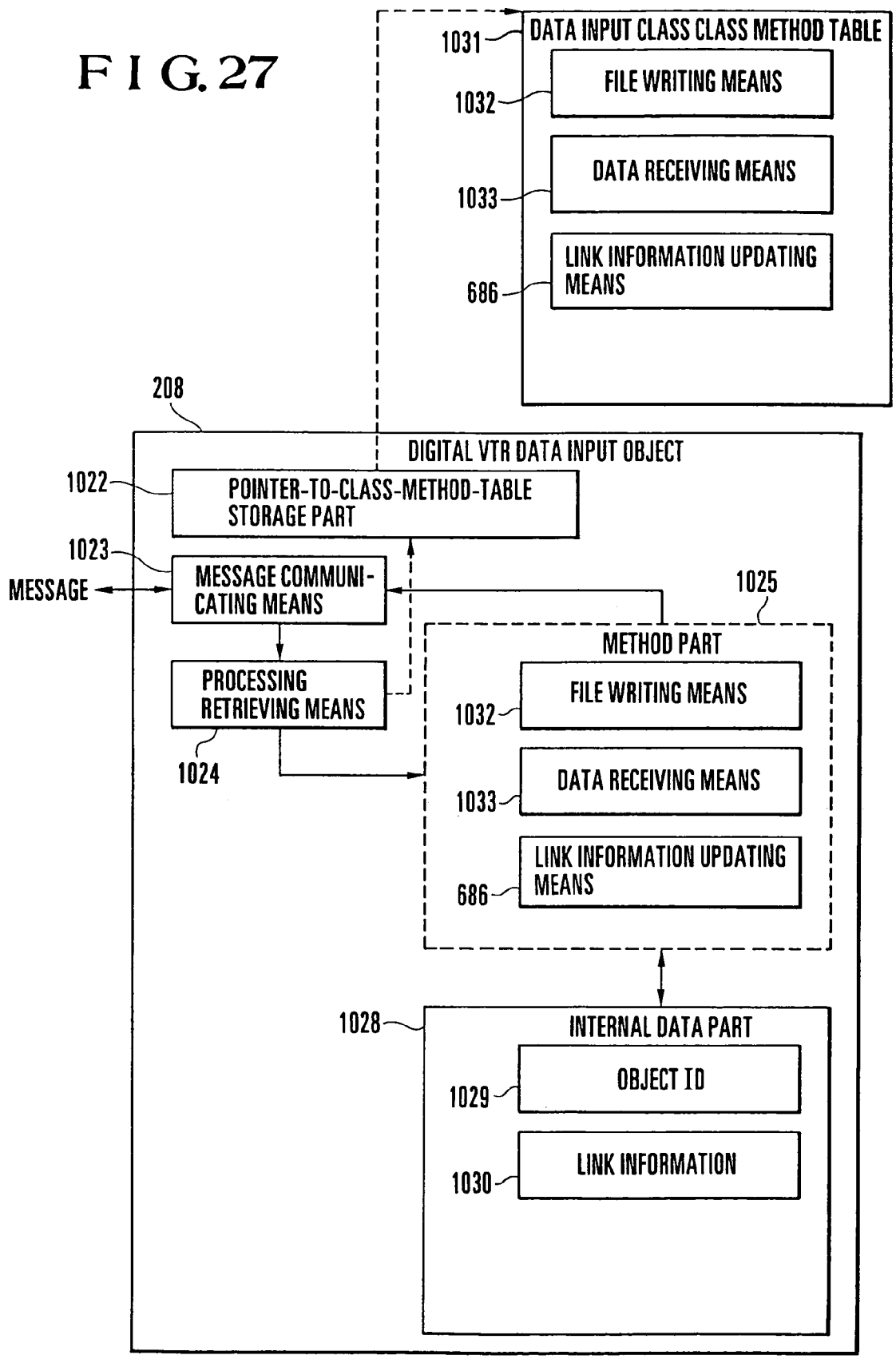
FIG. 27 is a view showing the structure of a digital VTR data input object.

FIG. 27 is a view showing the structure of the digital VTR data input object. The digital VTR data input object 208 shown in FIG. 27 includes a pointer-to-class-method-table storage part 1022 which stores pointers to a data input class class method table 1031. The data input class class method table 1031 includes file writing means 1032, data receiving means 1033 and link information updating means 686. The digital VTR data input object 208 also includes message communicating means 1023, processing retrieving means 1024, a method part 1025 and an internal data part 1028. The internal data part 1028 includes an object ID 1029 and link information 1030.

Figure 28:
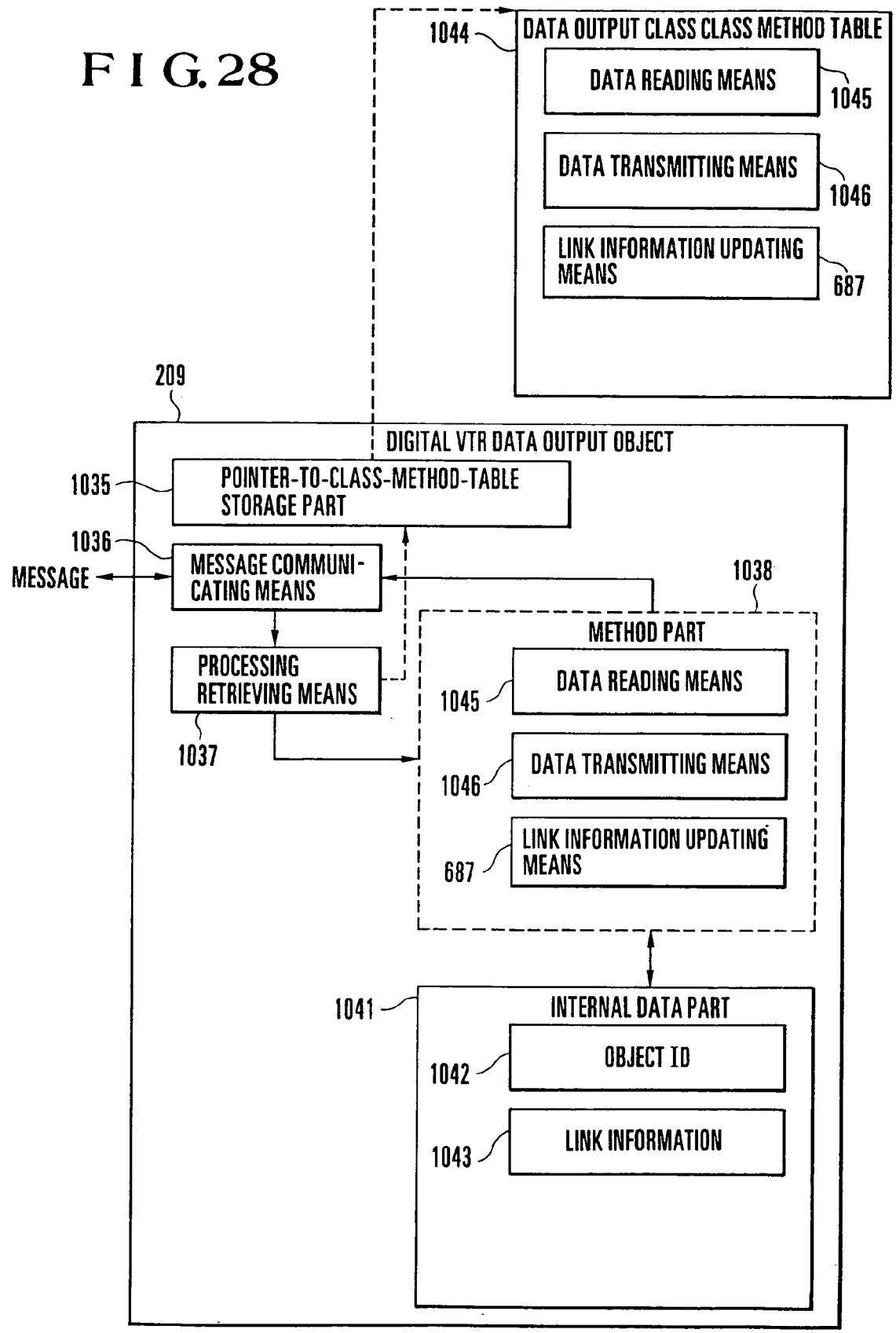
FIG. 28 is a view showing the structure of a digital VTR data output object.

FIG. 28 is a view showing the structure of the digital VTR data output object. The digital VTR data output object 209 shown in FIG. 28 includes a pointer-to-class-method-table storage part 1035 which store pointers to a data output class class method table 1044. The data output class class method table 1044 includes data reading means 1045, data transmitting means 1046 and link information updating means 687. The digital VTR data output object 209 includes message communicating means 1036, processing retrieving means 1037, a method part 1038 and an internal data part 1041. The internal data part 1041 includes an object ID 1042 and link information 1043.

When the digital VTR data input delegate object 222 and the digital VTR data output delegate object 223 of the digital VTR 203 are generated in the multimedia controller 1, the digital VTR data input delegate object 222 and the digital VTR data output delegate object 223 function as if they were the digital VTR data input object 208 and digital VTR data output object 209. For example, if the file of another multimedia device is to be copied to the digital VTR 203, the system director object 205 makes an inquiry as to the types of files which can be inputted to the digital VTR data input delegate object 222. In response to the inquiry of the system director object 205, the acceptable file type replying means 678 of the digital VTR data input delegate object 222 replies as to the file types which can be received by the digital VTR 203.

If the type of a file to be copied is contained in the replied file types, a link is set to connect the output delegate object of a multimedia device having the file to be copied to the digital VTR data input delegate object 222. The link information updating means 681 of the digital VTR data input delegate object 222 sends a message to the digital VTR data input object 208 and activates the link information updating means 686 of the digital VTR data input object 208, and the link information updating means 686 updates the link information 1030 of the digital VTR data input object 208.

Simultaneously, the data output delegate object of the multimedia device having the file to be copied sends a message for updating the link information of the data output object, whereby the link information is updated. Thus, a link is set between the data output object of the multimedia device having the file to be copied and the digital VTR data input object 208.

After that, the data transmitting means of the data output object of the multimedia device having the file to be copied is activated, and the data output object of the multimedia device having the file to be copied sends a message to the digital VTR input object. Thus, the data receiving means 1033 and the file writing means 1032 are activated to perform copying of the file. In other words, if a copy instruction or the like is inputted to both of the data input delegate object and the data output delegate object in the multimedia controller, the data input delegate object and the data output delegate object respectively send messages to the data input object and the data output object in each of the desired multimedia devices, thereby setting a data link between the multimedia devices. Accordingly, the multimedia controller does not need to directly participate in an actual, data copying process or the like.

As is apparent from the above description, in accordance with the above-described embodiment, if the entire system including a multimedia controller and a multiplicity of multimedia devices connected thereto is to be controlled, the software required to perform such control, such as device drivers or application software, does not need to be installed or prepared in the multimedia controller in advance. Further, only if a desired multimedia device is connected to a LAN, a corresponding control panel and the state of the connected multimedia device are displayed on the display of the multimedia controller, whereby it is possible to achieve great advantages; for example, on the picture, it is possible to easily turn on and off a power source, to control the multimedia device, and to execute switching between input and output.

In addition, some of the components of a control panel sent from a multimedia device to the multimedia controller can be replaced with components having identical definitions and provided in the multimedia controller in advance, to satisfy a user's taste. Accordingly, it is possible to unify various user interfaces which differ among manufacturers.

Further, control by a distant multimedia controller and access to multimedia devices can be transparently executed via a LAN.

Figure 30:
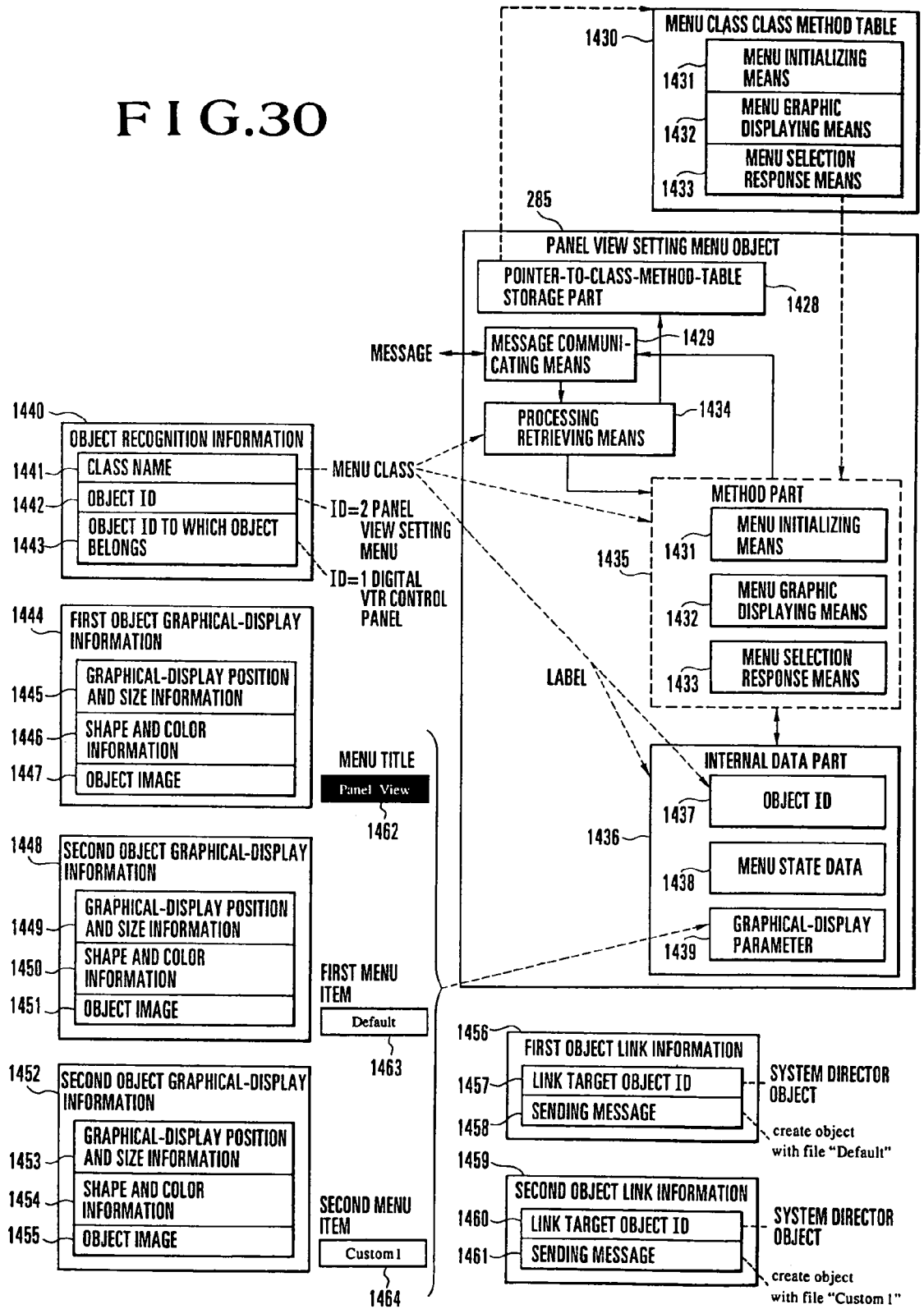
FIG. 30 is a view showing the relation between the structure of a panel view setting menu object which belongs to a menu class and object description information.

FIG. 30 is a view showing the structure of the panel view setting menu object as well as the relationship between the structure and object description information.

The panel view setting menu object 285 shown in FIG. 30 includes a pointer-to-class-method-table storage part 1428 which stores pointers to a menu class class method table 1430. The menu class class method table 1430 includes menu initializing means for initializing a menu object, menu graphic displaying means 1432 for graphically displaying a menu, and menu selection response means 1433 for displaying a response operation when a selection from the menu is performed. The panel view setting menu object 285 also includes message communicating means 1429, processing retrieving means 1434, a method part 1435 and an internal data part 1436. The internal data part 1436 includes an object ID 1437, menu state data 1438 and a graphical-display parameter 1439. The internal data part 1436 is initialized in accordance with the digital VTR delegate object description file 210, and the panel view setting menu description part of the digital VTR control panel object description part 211 of the digital VTR delegate object description file 210 includes object recognition information 1440, first object graphical-display information 1444 for displaying the title of a panel view setting menu, second object graphical-display information 1448 for displaying a first menu item of the panel view setting menu, and third object graphical-display information 1452 for displaying a second menu item of the panel view setting menu. The object recognition information 1440 includes a class name 1441 (in this example, a menu class), an object 1442 (in this example, ID=2) and an object ID 1443 of an object to which the object belongs (in this example, a digital VTR control panel of ID=1). The first object graphical-display information 1444 includes graphical-display position and size information 1445, shape and color information 1446 and an object image 1447, and represents a menu title 1462. The second object graphical-display information 1448 includes graphical-display position and size information 1449, shape and color information 1450 and an object image 1451, and represents a first menu item 1463. The third object graphical-display information 1452 includes graphical-display position and size information 1453, shape and color information 1454 and an object image 1455, and represents a second menu item 1464. First object link information 1456 describes a message to be issued when the first menu item 1463 is selected as well as a receiver to which the message is to be sent. The link target object ID 1457 is the ID of the system director object 205, and a sending message 1458 represents the message "Create object with file "Default"". Second object link information 1459 describes a message to be issued when the second menu item 1464 is selected as well as a receiver to which the message is to be sent. A link target object ID 1460 represents the ID of the system director object 205, and a sending message 1461 represents the message "Create object with file "Custom1"".

Figure 31:
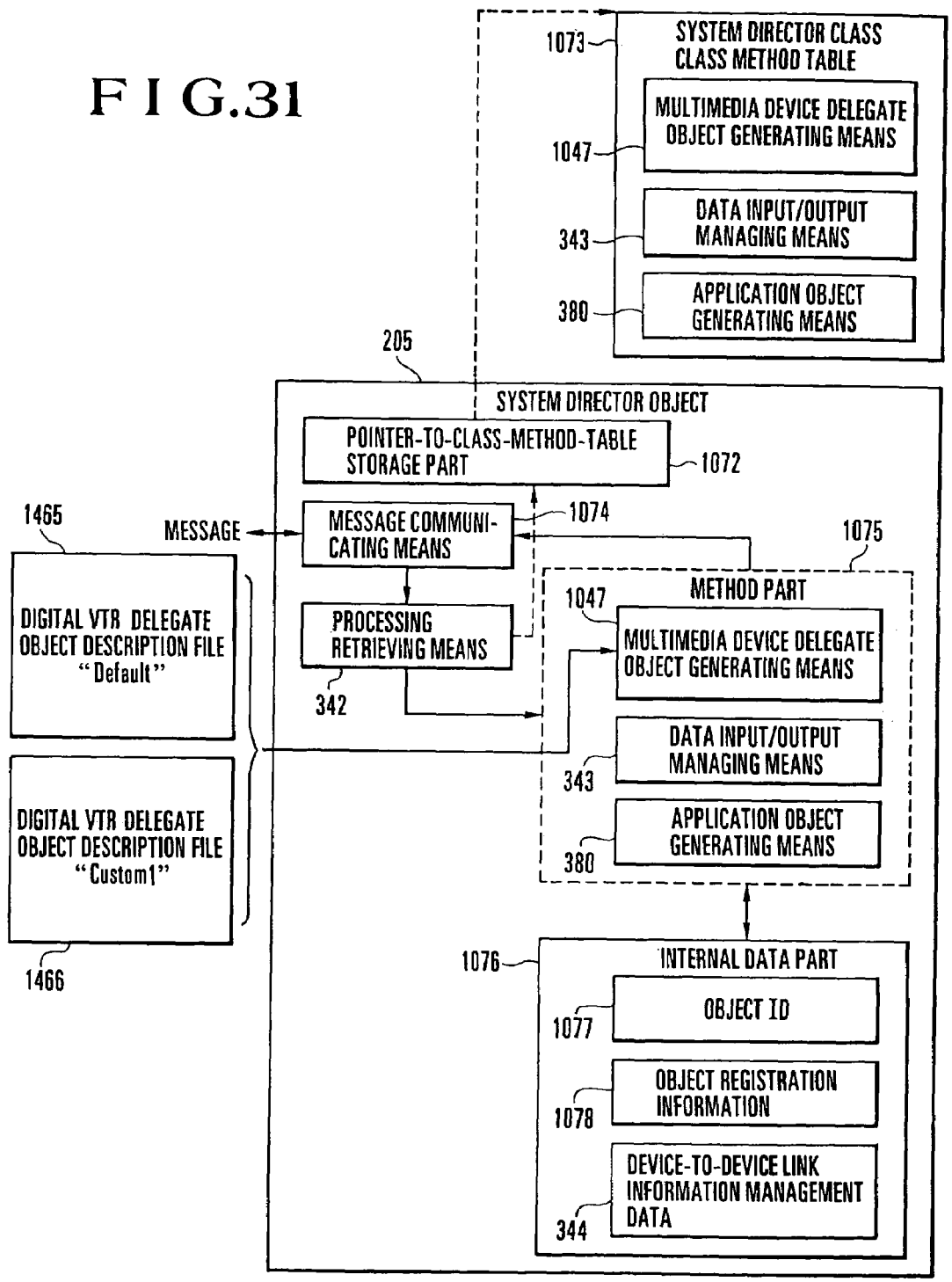
FIG. 31 is an explanatory view showing the function of a system director object to select one file from a plurality of files when the system director object is to read a multimedia device delegate object description file.

FIG. 31 is an explanatory view showing that the system director object 205 has the function of selecting one file from a plurality of files when the system director object 205 is to read a multimedia device delegate object description file. In FIG. 31, reference numeral 1465 denotes a digital VTR delegate object description file named "Default", and reference numeral 1466 denotes a digital VTR delegate object description file named "Custom1".

Figure 32:
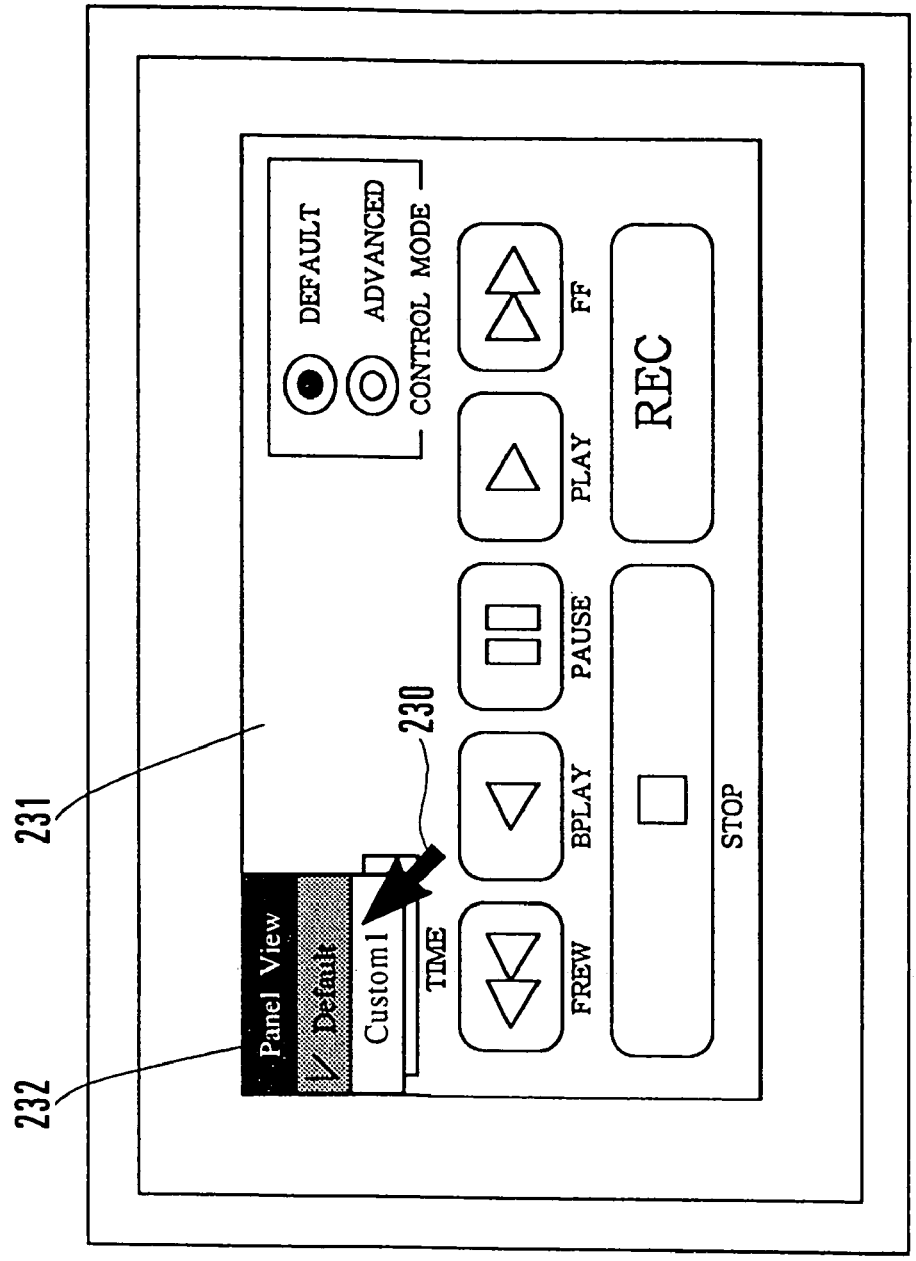
FIG. 32 is a view showing the way of switching the control panel.
Figure 33:
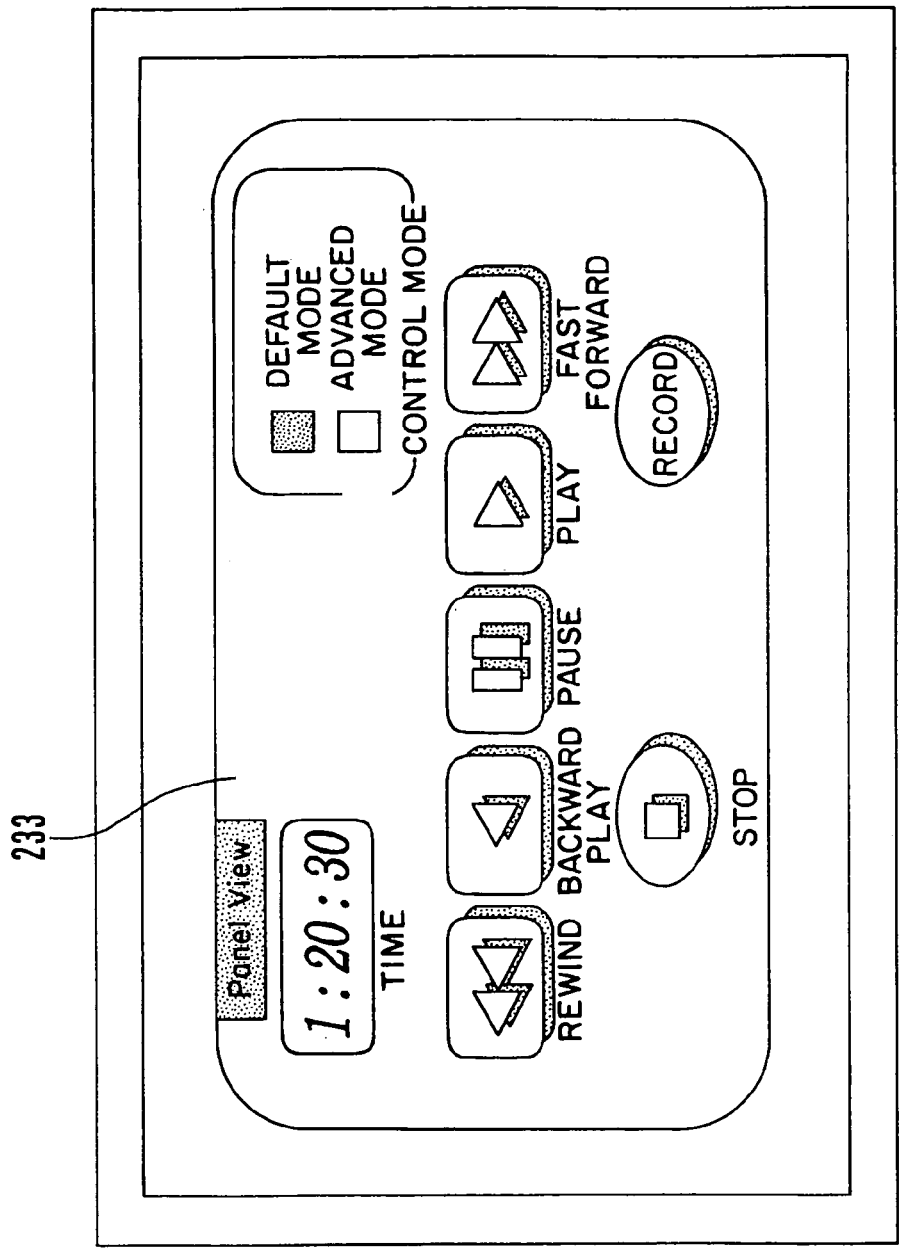
FIG. 33 is a view showing a picture which appears after the switching of the control panel.

FIG. 32 is a view showing the way in which a user switches the control panel. FIG. 33 is a view showing a picture which appears after the switching of the control panel.

As shown in FIG. 32, in the case of a default setting, since the system director object 205 reads the digital VTR delegate object description file 1465 named "Default" and generates the digital VTR control panel object 221, the digital VTR control panel display picture 231 is displayed in its default state and the panel view setting menu 232 is set to "Default". If a user selects "Custom1" of the panel view setting menu 232 with the cursor 230 of the pointing device, the panel view setting menu object 285 sends the message "Create object with file "Custom1"" to the system director object 205 by the menu selection response means 1433. In response to the message, the system director object 205 discards and regenerates the digital VTR delegate object 220 through the multimedia device delegate object generating means 1047. At this time, the system director object 205 reads the digital VTR delegate object description file 1466 named "Custom1" and regenerates the digital VTR control panel object 221 on the basis of the digital VTR delegate object description file 1466. A control panel which is apparently different from the digital VTR delegate object description file 1465 named "Default" is written into the digital VTR delegate object description file 1466 named "Custom1", whereby it is possible to display an apparent, second control panel display picture 233 as shown in FIG. 33 by way of example.

In the example shown in FIG. 33, the corners of the frame are rounded, the button displays are shadowed and the Japanese text displays are substituted for the English text displays. However, according to the present invention, it is possible to meet a variety of users' demands by preparing various delegate object description files.

Figure 34A:
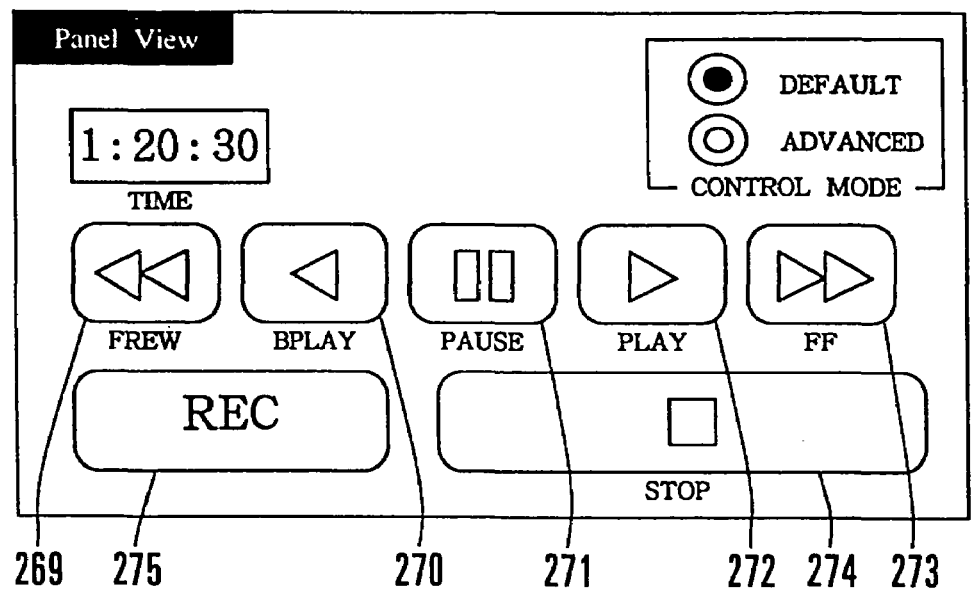
FIGS. 34(a) and 34(b) are views showing different examples of the arrangement of manipulating buttons.
Figure 34B:
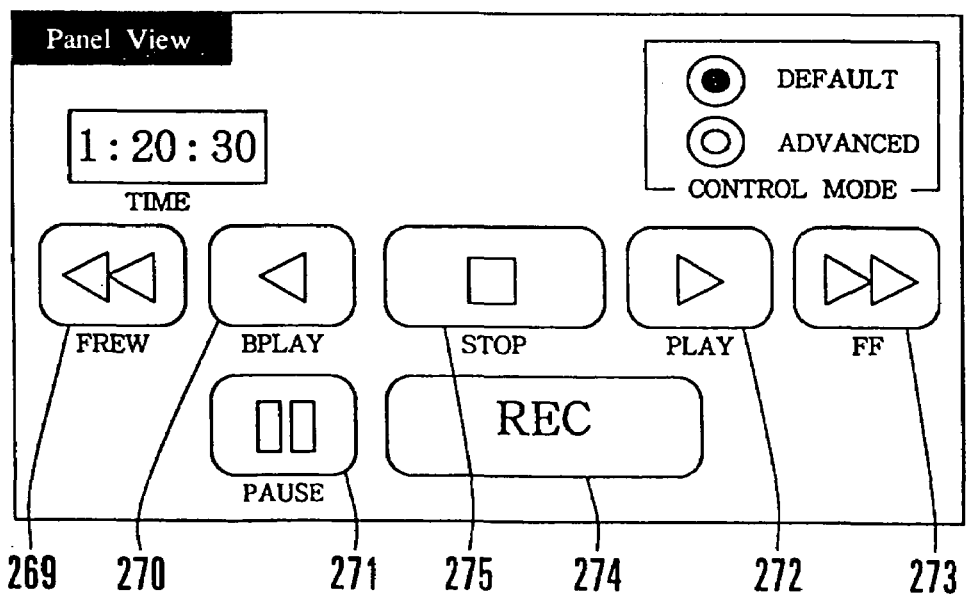

FIGS. 34(*a*) and 34(*b*) are views showing different examples of the arrangement of manipulating buttons. In general, the arrangements of manipulating buttons of electrical equipment as well as multimedia devices differ among manufacturers, and may even differ among products manufactured by a single manufacturer. This fact confuses users. If a user who is familiarized with the manipulation of a particular device purchases a new device, the user needs to learn the manipulation of the new device. In accordance with the present invention, it is possible to easily change the arrangement of manipulating buttons by modifying a delegate object description file, and users can be allowed to select a desired one from among a plurality of arrangements.

If application software is provided which allows a user to modify the arrangement of manipulating buttons through an interactive manipulation and causes a delegate object description file to reflect the result of the modification, users become able to freely customize control panels to their tastes. For example, if a company or a third party, which provides the multimedia controller 1, provides various multimedia device delegate object description files, the arrangements of manipulating buttons of multimedia devices which differ among individual companies, for example, the arrangement of FIG. 34(*a*) adopted by a company A and the arrangement of FIG. 34(*b*) adopted by a company B, can be unified in accordance with the policy of the company or the third party which provides the multimedia controller 1.

An increase in the functional level of multimedia devices is another cause for confusion of users. Specifically, if manipulating members for functions which are normally not used by ordinary users or which can only be used by users having technical knowledge are displayed on a control panel, the ordinary users may become unable to easily use multimedia devices. To solve such a problem, the present invention also makes it possible to display only the manipulating members needed by a user.

Figure 35:
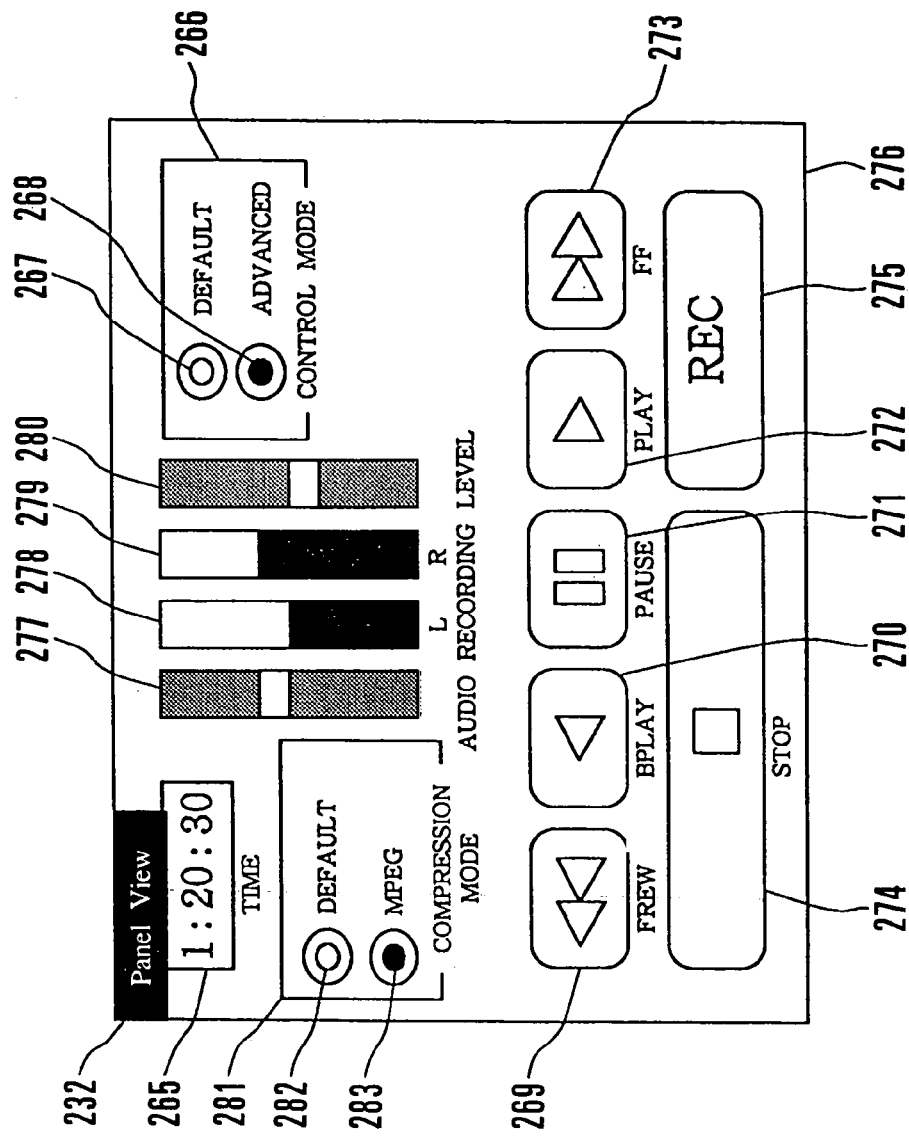
FIG. 35 is a view showing the control panel display picture of the digital VTR.

FIG. 35 shows the control panel display picture of a digital VTR having high-level functions. As shown in FIG. 35, a control panel display picture 276 to be used for manipulating functions which contain additional functions includes sliders 277 and 280 for manually adjusting sound recording levels, respectively, and level meters 278 and 279 for monitoring the respective sound recording levels. A button group 281 for setting a desired image compression mode includes a default compression mode setting button 282 and an MPEG (an internationally standardized, moving-image compression system) compression mode setting button 283. These manipulating members merely confuse users who do not need such high-level functions.

It is possible to perform switching between the control panel display picture 231 for manipulating only the minimum required functions and the control panel display picture 276 for manipulating functions which contains additional functions, by means of the control mode switching object 294. Specifically, if the user selects the advanced button 268 shown in FIG. 35 by using the pointing device, the system director object 205 reads a digital VTR control panel delegate object description file which describes the control panel display picture 276 for manipulating the functions which contain the additional functions, to generate a control panel object for manipulating the functions which contain the additional functions. If no additional functions are needed, the user similarly selects the default button 267 shown in FIG. 35 by using the pointing device, so that the system director object 205 reads a digital VTR control panel delegate object description file which describes the control panel display picture 231 for manipulating the minimum required functions, to regenerate a control panel object for manipulating the minimum required functions.

In the above-described example, a plurality of multimedia device delegate object description files are employed for selecting a plurality of GUIs. However, it is also possible to describe a plurality of GUIs in the multimedia device control panel object of a single multimedia device delegate object description file.

As is apparent from the above description, in accordance with the above-described embodiment, to control the entire system including a controller and a plurality of multimedia devices connected thereto, it is not necessary to install and prepare, in the controller, device drivers, application software or the like for controlling the entire system. Only if a desired multimedia device is connected to a LAN, a corresponding control panel and the state of the connected multimedia device are displayed on the picture of the controller, whereby users can perform various operations on the picture, such as the operation of turning on and off the power source of the multimedia device, the operation of controlling the multimedia device itself and the operation of switching the inputting and the outputting of data therebetween.

In addition, by selecting a desired one from among a plurality of GUI descriptions when a control panel is to be generated, not only is it possible to unify various user interfaces which differ among makers, but also each individual user can select a desired GUI to the user's taste and also edit the selected GUI. Further, since it is possible to display only the required manipulating members in accordance with the manipulation of the user, the user can easily manipulate the control panel.

A second embodiment of the present invention will be described below.

The second embodiment is intended to provide an environment which makes it possible to transparently use multimedia devices in a common manner through a controller via a LAN without the need for special software such as application software or a device driver. Further, the second embodiment is intended to make it possible to construct, for communication of data between the multimedia devices, a data sending and receiving relationship between the multimedia devices by means of a user interface which can be easily manipulated by a user, thereby enabling the multimedia devices to communicate data therebetween without passing the data through the controller during an actual data communication.

To achieve the above objects, in accordance with the second embodiment, there is provided a system which comprises a plurality of multimedia devices and a controller for controlling the plurality of multimedia devices. The plurality of multimedia devices and the controller are connected to a network in such a manner that the plurality of multimedia devices and the controller can communicate a message and data based on an object-oriented technique between each of the plurality of multimedia devices and the controller via the network. The controller includes display means for displaying icons representative of the respective plurality of multimedia devices, and pointing means for forming a link between arbitrary multimedia devices selected from among the plurality of multimedia devices to specify a data input and output relationship between the arbitrary multimedia devices.

According to this arrangement, a data sending and receiving relationship between audio-visual devices can be constructed or modified merely by changing the internal data of an object which relates to the construction or modification of the data sending and receiving relationship, without the need to change the physical connection between the audio-visual devices.

Control programs for individual objects do not need to be prepared in the controller in advance, and control of the objects can be realized merely by connecting the objects to the controller.

The controller allows a person who actually specifies a desired control to display and manipulate control means sent from a connected object, so that the person can manipulate through a single interface all the audio/visual devices connected to a network.

Means for managing the connections between the individual devices is provided in the controller, and this managing means uses the display means to display the connection status of each of the devices. Accordingly, even if a multiplicity of connection relationships are constructed, users can easily recognize the statuses of the respective connections.

Regarding the system in which the multimedia devices and the controller are connected via the LAN, messaging to be executed when a user is to copy data from a digital camera to a digital VTR will be specifically described below as a second embodiment. It is assumed here that the digital camera referred to in the description of the second embodiment is of a handy type capable of outdoor recording of moving images and sound and has communication means for communication with the system.

Figure 36A:
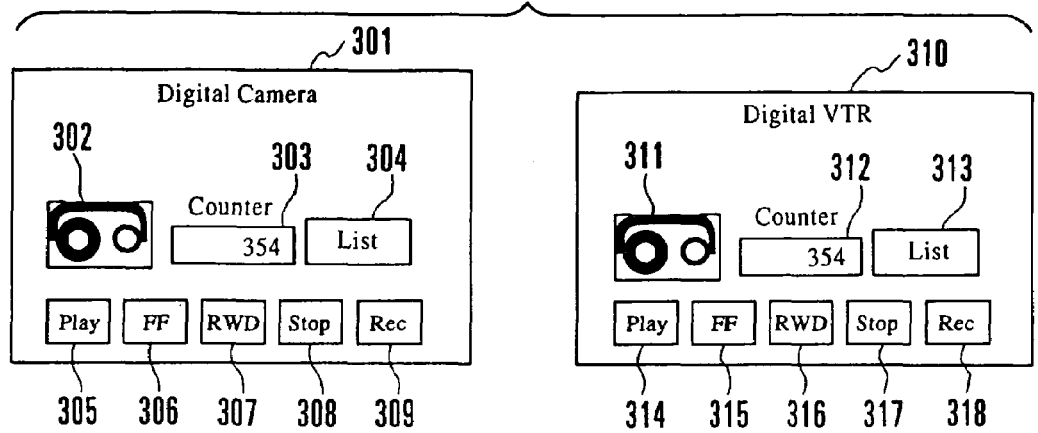
FIGS. 36(a) and 36(b) are views showing different examples of the control panel displayed on a multimedia controller display according to a second embodiment of the present invention as well as the operations of the respective examples.
Figure 36B:
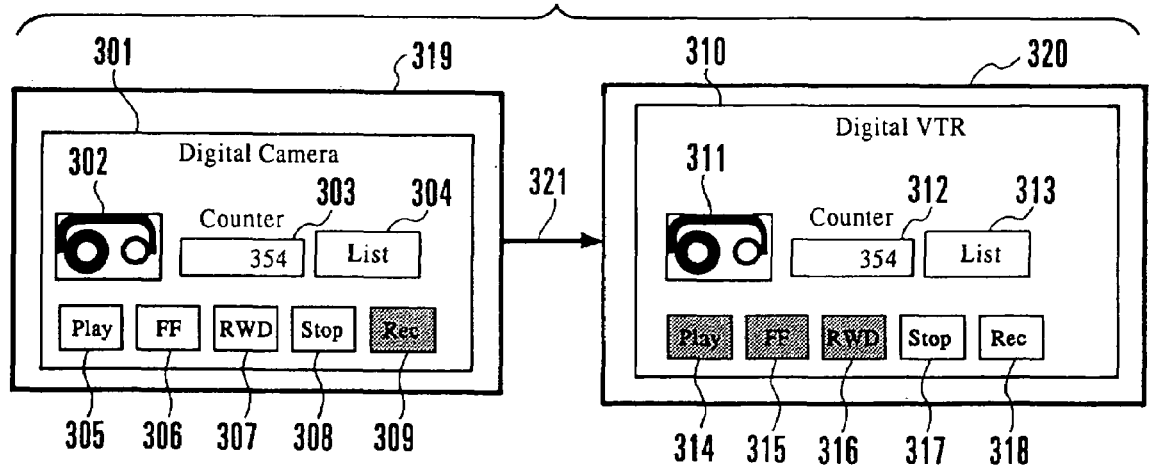

FIG. 36(*a*) shows control panels to be displayed on a multimedia controller display. Reference numeral 301 denotes a control panel for controlling a digital camera device, and reference numeral 310 denotes a control panel for controlling a digital VTR device. Each of the control panels 301 and 310 is displayed on the multimedia controller display by the previously-described multimedia device control panel object description part (1062 in FIG. 7) being read from the corresponding one of the devices into the multimedia controller by a system director, and waits for an event to be specified by the user.

Referring to FIG. 36(*a*), tape insertion display parts 302 and 311 display whether tapes are inserted in the respective devices. Counters 303 and 312 display the running times of the tapes inserted in the respective devices. Button objects 304 and 313 are for displaying the lists of the contents of the tapes inserted in the respective devices, and when the button object 304 or 310 is clicked with a mouse, the list of the contents of the tape is displayed. When a Play button object 305 or 314 is clicked with the mouse, the corresponding device executes a playback operation.

When an FF button object 306 or 315 is clicked with the mouse, the corresponding device executes fast forward feeding of the tape. When an RWD button object 307 or 316 is clicked with the mouse, the corresponding device executes rewinding of the tape. When a stop button object 308 or 317 is clicked with the mouse, the corresponding device stops any of the Play, FF, RWD and Rec functions. When the Rec button object 309 or 318 is clicked with the mouse, the corresponding device starts to record video and audio data inputted from the outside via a communication medium such as a LAN.

A procedure for dubbing video and audio data from the digital camera to the digital VTR by manipulating such a user interface will be described below with reference to FIGS. 36(*a*) and 36(*b*).

When the user starts to drag a mouse cursor in the control panel 301 of the user interface shown in FIG. 36(*a*), a black frame 319 is displayed as shown in FIG. 36(*b*). If the user continues the dragging on the control panel 301 and moves the mouse cursor out of the black frame 319, an arrow 321 is displayed to extend in such a manner that the pointing head reaches the position of the mouse cursor. If the user further continues to move the mouse and the mouse cursor enters the inside of the frame of the control panel 310, a black frame 320 is displayed. If the user stops the dragging at this time, a link is formed to extend from the control panel 301 to the control panel 310.

At this time, the multimedia controller determines whether the link is valid or invalid. If the link is invalid, the state of display returns to that shown in FIG. 36(*a*), whereas if the link is valid, the state shown in FIG. 36(*b*) is maintained.

Processing which is executed in the multimedia controller when the link is formed by the manipulation of the user will be described below with reference to FIGS. 37, 38 and 39.

Figure 37:
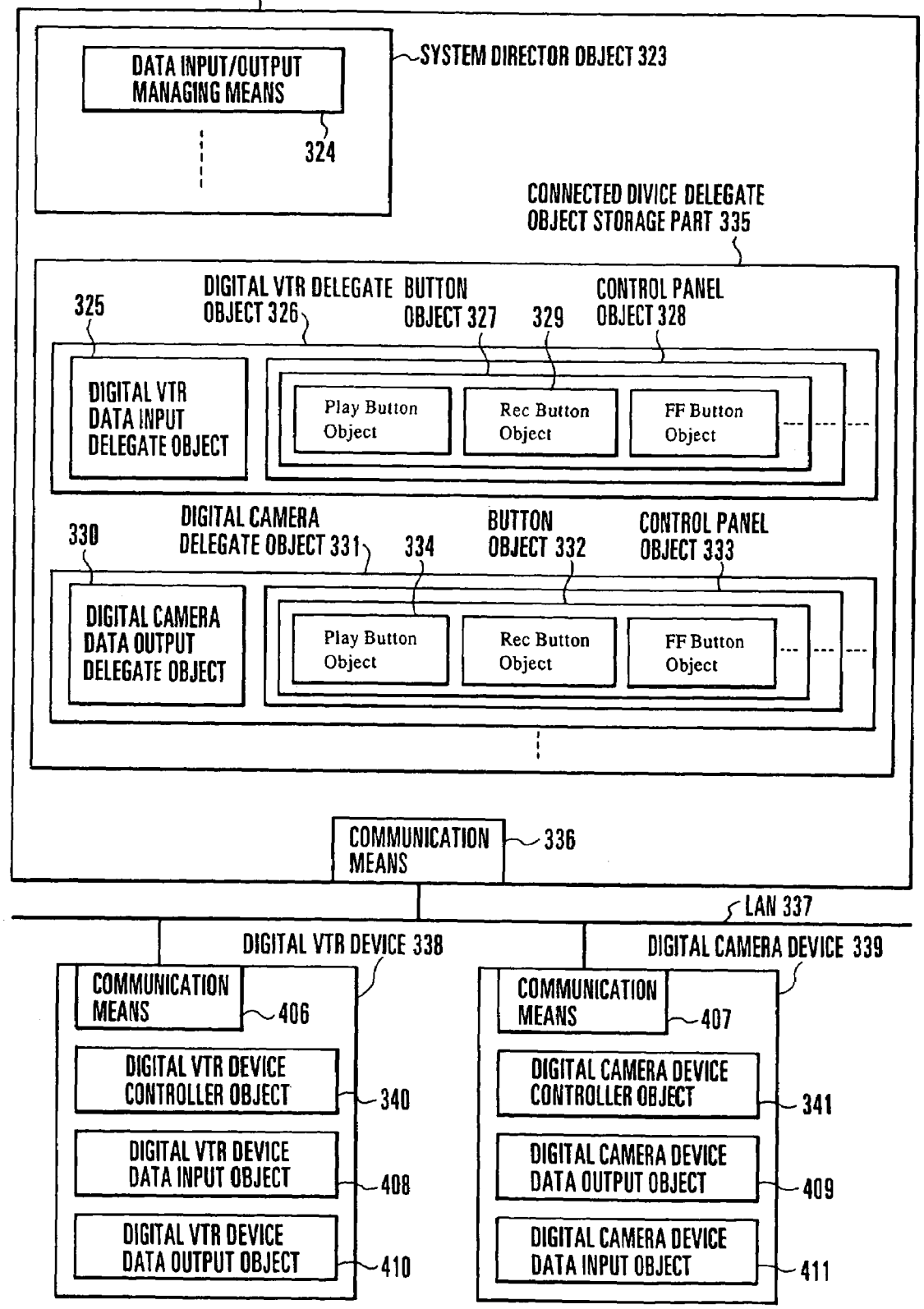
FIG. 37 is a view showing the construction of internal objects of each of a multimedia controller, a digital VTR device and a digital camera device as well as the connection status of each of them.

FIG. 37 is a view showing the construction of internal objects of each of a multimedia controller 322, a digital VTR device 338 and a digital camera device 339 as well as the connection status of each of them.

The objects in each of the multimedia controller 322 and the devices 338 and 339 can communicate messages and data to each other. The objects of one of the multimedia controller 322 and the devices 338 and 339 can also communicate messages with the objects which exist in another one of the multimedia controller 322 and the devices 338 and 339, by means of communication means 336, 406 and 407 via a LAN 337. Each of the objects shown in FIG. 37 can communicate messages and data with another arbitrary object.

The object-to-object relationship between the objects shown in FIG. 37 is represented by the object IDs of objects to which the respective objects belong, as described above in connection with the basic structure of the objects. A system direction object 323 includes a method part having means (data input/output managing means) 324 for determining whether input data and output data match each other when data outputted from one device is inputted to another device. A connected device delegate object storage part 335 is a part which stores the delegate object of each device created by connected device delegate object initializing means reading the predetermined information required for initialization from each device connected to the LAN 337 at the time of system activation and at predetermined time intervals.

It is assumed here that the second embodiment is arranged to read initialization information from the digital VTR device 338, the digital camera device 339 and other devices (none of which is shown in FIG. 37) which are connected to the LAN 337, and create a digital VTR delegate object 326, a digital camera delegate object 331 and the objects of the other devices (none of which is shown in FIG. 37). A digital VTR data input delegate object 325 has answer means for answering an inquiry about the inputting of data into the digital VTR device 338. A digital camera data output delegate object 330 has answer means for answering an inquiry about the outputting of data from the digital camera device 339. A digital VTR device controller object 340 controls the hardware of the digital VTR device 338 in response to a message sent from another object. A digital camera device controller object 341 controls the hardware of the digital camera device 339 in response to a message sent from another object. A digital VTR device data input object 408 has data receiving means capable of receiving data sent to its own object ID. A digital camera device data output object 409 has data sending means for adding information, such as a data receiver ID, to data reproduced by a reproducing device provided in a digital camera device (not shown) and sending the resultant data through the communication means 407. The communication means 336, 406 and 407 are provided for allowing the multimedia controller 322, the digital VTR device 338 and the digital camera device 339, all of which are connected to the LAN 337, to communicate with one another.

FIG. 11 shows the structure of the system director object 323. When the processing retrieving means 342 receives from the window server an information message which indicates that a link is formed between devices by the input of a user, the processing retrieving means 342 activates the data input/output managing means 343. The data input/output managing means 343 performs a series of processings for making a decision as to the matching of data between the devices linked by the user.

Figure 38:
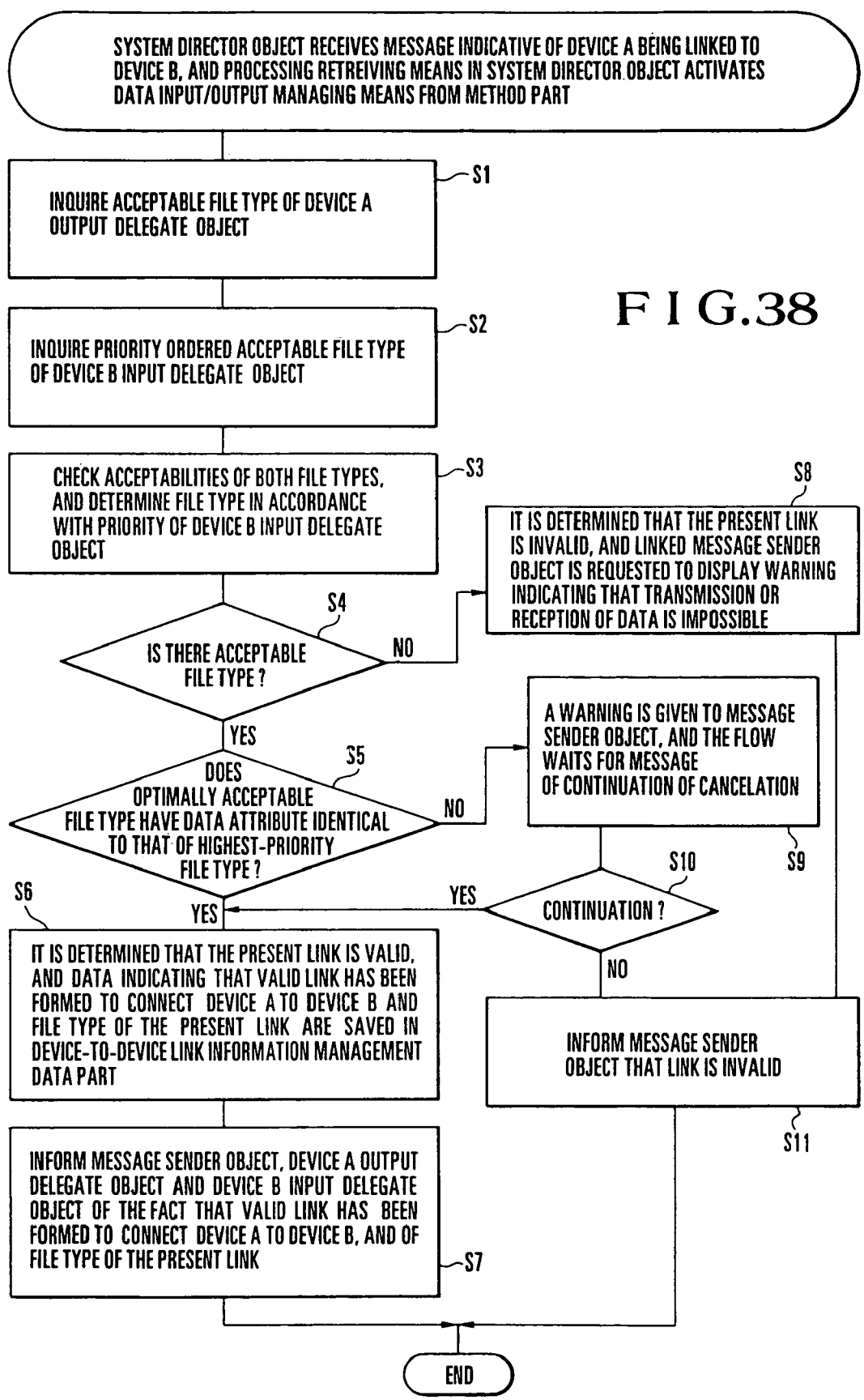
FIG. 38 is a flowchart showing the processing procedure of data input/output managing means.

FIG. 38 is a flowchart showing the processing procedure of the data input/output managing means. If the user forms a link which extends from a device A to a device B, by means of a user interface such as those shown in FIGS. 36(*a*) and 36(*b*), the window server sends the system director object (205 in FIG. 11) a message (linked message) which indicates that the link has been formed to extend from the device A to the device B. The processing retrieving means (342 in FIG. 11) receives the message and activates the data input/output managing means in the method part.

The procedure of processing which is executed by the data input/output managing means when the user forms the link from the device A to the device B will be described below with reference to the flowchart of FIG. 38.

In Step S1, the data input/output managing means inquires as to an acceptable file type of the output delegate object of the device A (if there are a plurality of acceptable file types, a list of the acceptable file types is replied).

In Step S2, the data input/output managing means inquires as to an acceptable file type of the input delegate object of the device B. If there are a plurality of acceptable file types (acceptable formats) for the device B, the input delegate object of the device B sends information indicative of the priority of each of the file types to the data input/output managing means. Incidentally, the priority indicates the order of file types which can be suitably inputted into the device B, the order being specified by the manufacturer of the device B or the user. A file type of highest priority is herein referred to as the "highest-priority file type for the device B". Then, in Step S3, an acceptable file type (or an acceptable file type list) for the device A is searched for in accordance with the priority of the device B. Specifically, a highest-priority file type for the device B is searched for from among the acceptable file types for the device A which have been read in Step S1. The file type which has been obtained through this processing is hereinafter referred to as an optimally acceptable file type for the device A and the device B.

If, in Step S4, the data input/output managing means fails to search for an acceptable file type in Step S3, i.e., if the same file type does not coexist in the device A acceptable file type list and the device B acceptable file type list, the process proceeds to Step S8. If the data input/output managing means succeeds in searching for the same file type, the process proceeds to Step S5. It is determined in Step S5 whether the data attribute of the optimally acceptable file type obtained in Step S3 coincides with the data attribute of the highest-priority file type for the device B. If a coincidence is obtained, the process proceeds to Step S6.

In Step S6, it is determined that the present link is valid, and information indicating that the valid link has been formed to extend from the device A to the device B, and the data attribute and the file type of the present link are saved in the device-to-device link information management data part (344 in FIG. 11) which exists in a system director object internal data part.

In Step S7, the data input/output managing means informs a linked message sender object, the output delegate object of the device A and the input delegate object of the device B of the fact that the valid link has been formed to extend from the device A to the device B, as well as of the file type of the present link. Then, the data input/output managing means brings a series of processings to an end.

If no coincidence of the acceptable file types is obtained in Step S4, the process proceeds to Step S8, in which it is determined that the present link is invalid. The data input/output managing means informs the linked message sender object that since no common format is present, the link is invalid. In Step S11, the data input/output managing means sends the linked message sender object a message indicative of a request to erase the link, and brings the processing to an end.

If the data attribute of the optimally acceptable file type and the data attribute of the highest-priority file type do not coincide with each other in Step S5, the process proceeds to Step S9, in which the data input/output managing means sends the linked message sender object a message indicative of a request to provide a warning display. This message has a content which inquires of the user whether the user can be satisfied with the communication of data based on the data attribute of the optimally acceptable file type, and serves as an event loop which waits for the user to input a decision as to whether the connection of the present link should be continued or cancelled. If the user specifies the continuation of the connection of the present link, the process proceeds to Step S6 through Step S10. If the user specifies the cancellation of the connection of the present link, the process proceeds to Step S11 through Step S10, and the data input/output managing means sends out a link erasure request message and bring a series of processings to an end.

The procedure of processing which is executed in the multimedia controller when the user forms a link from the digital camera control panel (301 in FIG. 36(a)) to the digital VTR control panel (310 in FIG. 36(a), will be described more specifically with reference to FIGS. 36, 11 and 39.

If the user forms the link 321 from the digital camera control panel to the digital VTR control panel, as shown in FIG. 36(a), on the user interface shown in FIG. 36(a), the window server sends the system director object of FIG. 11 a message which indicates that the link has been formed from the digital camera control panel to the digital VTR control panel.

When the processing retrieving means 342 in the system director object receives this message, the processing retrieving means 342 activates the data input/output managing means 343 in the method part. The data input/output managing means 343 executes processing according to the flowchart of FIG. 39, and executes the processing of determining whether the link formed between the digital camera control panel and the digital VTR control panel is valid or invalid.

In Step S1, the data input/output managing means 343 inquires as to an acceptable file type of the digital camera output delegate object. The table shown in FIG. 51(a) is a list of a plurality of digital camera acceptable file types according to the second embodiment. In FIG. 51(a), the acceptable filetypes are shown together with the respective data attributes. In FIG. 51(a), the data attributes Audio, Movie and Audio & Movie respectively represent audio data, moving-image data, and audio and moving-image data which are synchronized.

Then, in Step S2, the data input/output managing means 343 inquires as to an acceptable file type of the input delegate object of the digital VTR. The digital VTR used in the second embodiment can cope with a plurality of file types as shown in the table of FIG. 51(b), and informs the data input/output managing means 343 of each of the file types together with the corresponding priority. In the second embodiment, as shown in FIG. 51(b), a file type AM4 corresponding to the data attribute Audio & Movie is a highest-priority file type for the digital VTR.

Then, in Step S3, the data input/output managing means 343 searches for a coincident file type in the table shown in FIG. 51(a), in accordance with the priority shown in the table of FIG. 51(b). Since the format (file type) AM4 has the first priority as shown in the table of FIG. 51(b), the format AM4 is searched for in the table of FIG. 51(a). Since the table of FIG. 51(a) does not have the format AM4, a format AM5 of second highest priority is searched for in the table of FIG. 51(a).

If the search for the format AM5 also fails, a similar search is repeated in accordance with the priority until a coincident file type is obtained. In the second embodiment, the data input/output managing means 343 finds a coincident file type by making a search for a format Movie2 having the fourth highest priority, and adopts the format Movie2 as an optimally acceptable file type for a link to be formed from the digital camera to the digital VTR.

Since the coincident file type has been found in the search of Step S3, the process proceeds from Step S4 to Step S5.

Since the data attribute Movie of the optimally acceptable file type Movie2 obtained in Step S3 and the data attribute Audio & Movie of the highest-priority file type for the digital VTR do not coincide with each other, the process proceeds from Step S5 to Step S9.

In Step S9, the data input/output managing means 343 sends the window server a message indicative of a request to provide a warning display, such as that shown in FIG. 40, and enters a loop S12 for waiting for the next input from the user.

If the user clicks "YES" on the panel shown in FIG. 40, the process proceeds from Step S10 to Step S6.

In Step S6, data indicating that the valid link according to the data attribute Movie and the file format Movie2 has been formed from the digital camera to the digital VTR is saved in the device-to-device link information management data (344 in FIG. 11) contained in the system director's internal data part.

Finally, in Step S7, the data input/output managing means 343 sends the digital camera output delegate object and the digital VTR input delegate object a message which indicates that the link according to the file type Movie2 has been formed from the digital camera to the digital VTR. Then, the data input/output managing means 343 brings a series of processing to an end.

Figure 47:
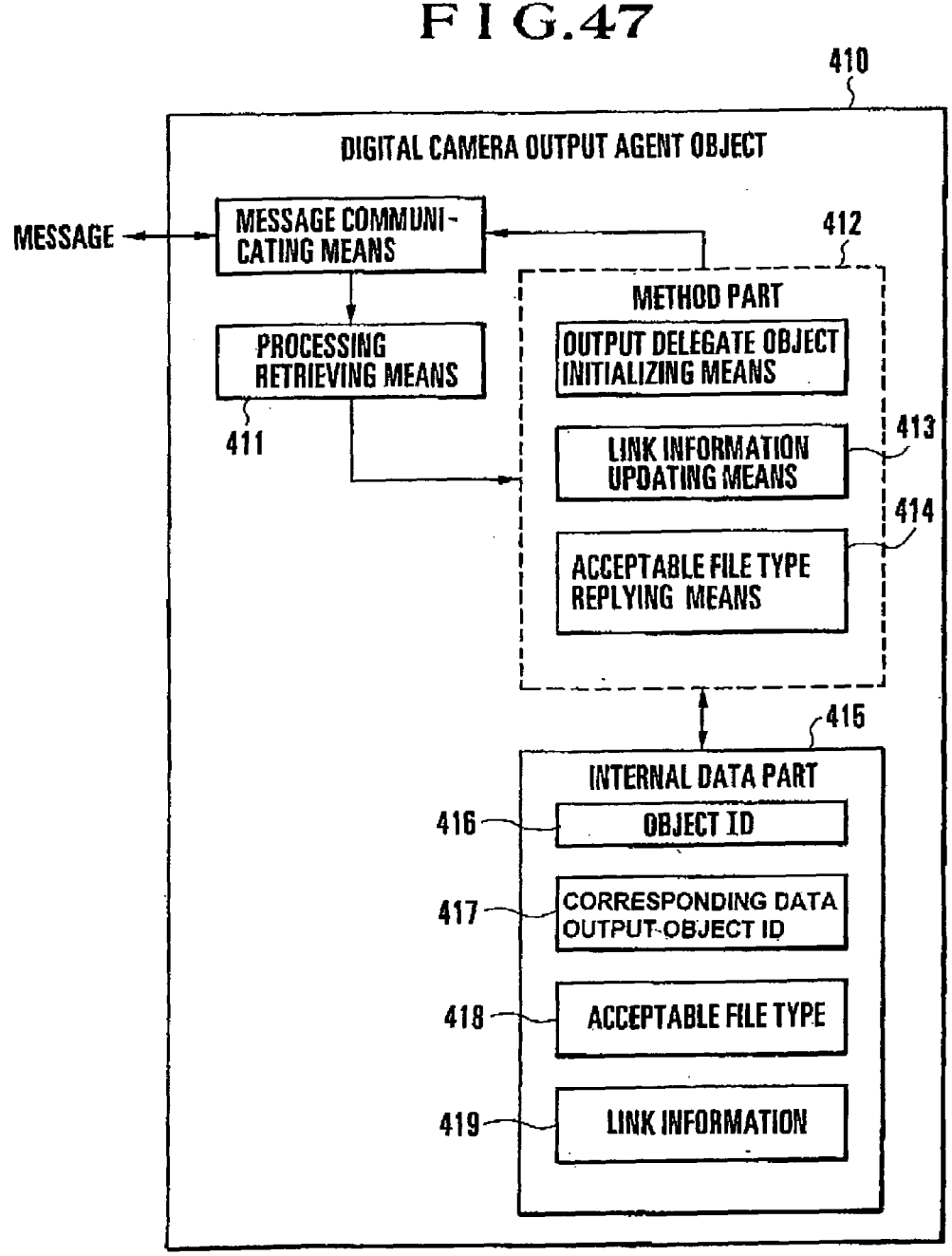
FIG. 47 is a view showing the internal structure of the digital camera output delegate object.
Figure 48:
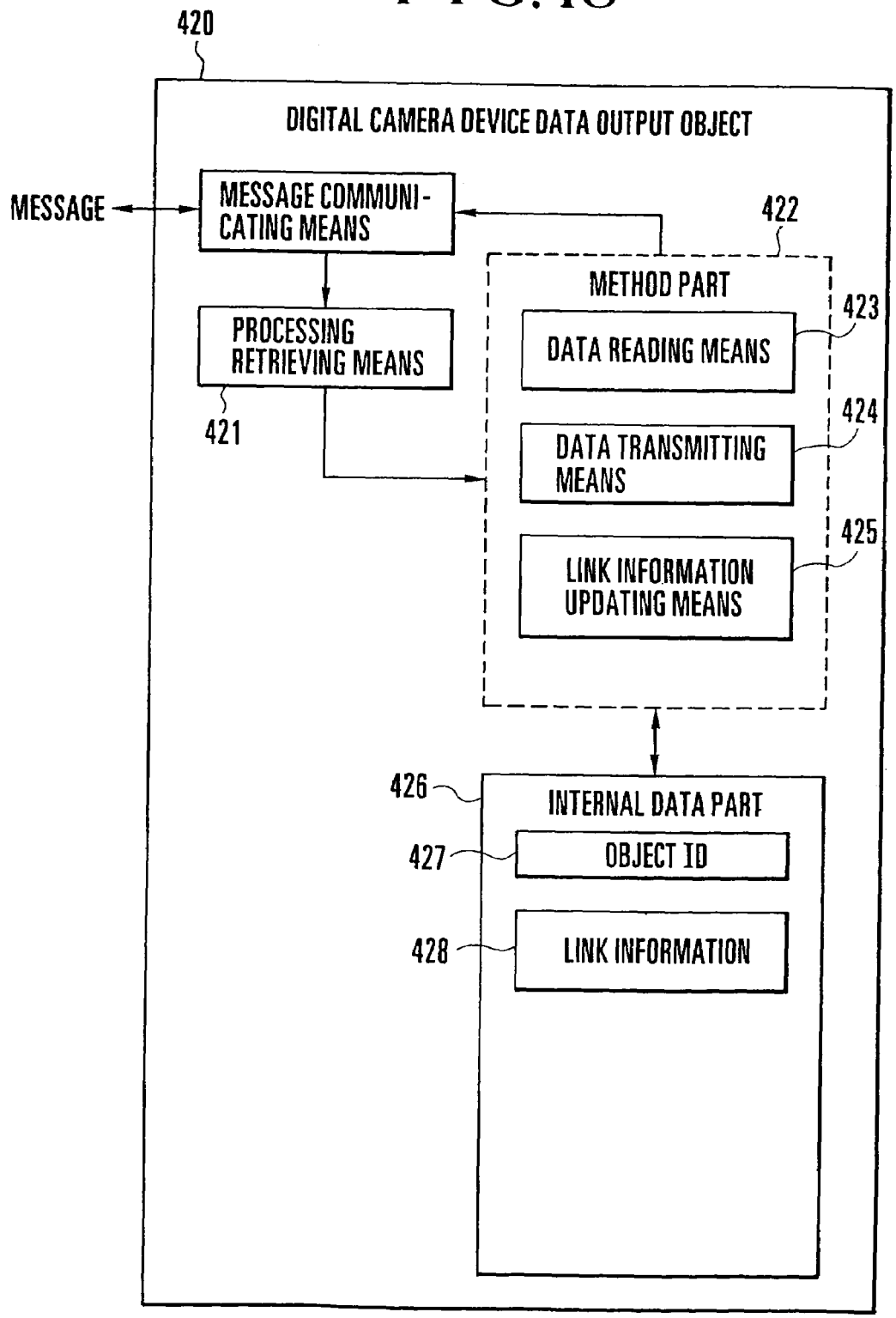
FIG. 48 is a view showing the internal structure of a digital camera data output object.

The digital camera output delegate object (410 in FIG. 47), which has received the message from the data input/output managing object (343) in Step S7, activates the link information updating means (413 in FIG. 47) of its method part. The activated link information updating means (413 in FIG. 47) stores data indicative of the formation of the link from the digital camera to the digital VTR according to the format Movie2, in the link information (419 in FIG. 47) of its internal data part, and sends a message which indicates that the link information has been updated and a message indicative of the content of the updating to the digital camera data output object (420 in FIG. 48) having a corresponding data input object ID. The digital camera data output object (420 in FIG. 48) activates the link information updating means (425 in FIG. 48) and saves the updated content of the link in the link information (428 in FIG. 48).

The digital camera output delegate object (410 in FIG. 47) grays out any object that does not relate to data output, from among all the objects which belong to the digital camera control panel object (333 in FIG. 37), and sends a message indicative of an instruction to make the user's input impossible. In response to the message, the Rec button 309 shown in FIG. 36(*b*) is grayed out to reject the mouse click of the user.

The digital VTR input delegate object (222 in FIG. 25) which has received the message from the system director object activates the link information updating means 681. The activated link information updating means 681 saves data indicative of the formation of the link from the digital camera to the digital VTR according to the format Movie2, in the link information 1006 of the internal data part 674. The link information updating means 681 also sends a message indicative of the updated content of the link information to the digital VTR data input object (208 in FIG. 27) having a corresponding data input object ID. The digital VTR data input object (208 in FIG. 27) which has received the message activates the link information updating means (686 in FIG. 27) to save the updated content of the link information in the link information (1030 in FIG. 27). The digital VTR input delegate object (222 in FIG. 25) grays out any object that does not relate to data input, from among all the objects which belong to the digital VTR control panel object (328 in FIG. 37), and sends a message indicative of an instruction to make the user's input impossible.

In response to the message, the Play button 314, the FF button 315 and the RWD button 316 shown in FIG. 36(*b*) are grayed out to reject the mouse click of the user, and the valid link is maintained in the state formed as shown in FIG. 36(*b*).

FIGS. 50(*a*) to 50(*e*) are the states of the respective internal data parts obtained when the valid link is formed as shown in FIG. 36(*b*). FIG. 50(*a*) shows the internal data part of the digital camera output delegate object, FIG. 50(*b*) shows the internal data part of the digital VTR data input delegate object, FIG. 50(*c*) shows the internal data part of the digital camera data output object delegate, FIG. 50(*d*) shows the internal data part of the digital VTR data input object, and FIG. 50(*e*) shows the internal data part of the system director object. In each of the internal data parts, the internal variable updated as the result of the formation of the link by the user is shown in a square bracket.

If the user clicks the Play button 305 of the control panel 301 with the valid link being formed as shown in FIG. 36(*b*) and the respective internal data parts being in the states shown in FIGS. 50(*a*) to 50(*e*), the digital camera starts to transfer data according to the format Movie2 to the digital VTR.

Then, if the user clicks the Rec button 318, the digital VTR starts to record the data of format Movie2 which is sent from the digital camera to the digital VTR, thereby executing device-to-device dubbing. Messaging which is carried out between the internal part of the multimedia controller and each of the devices during this time will be described below.

Figure 49:
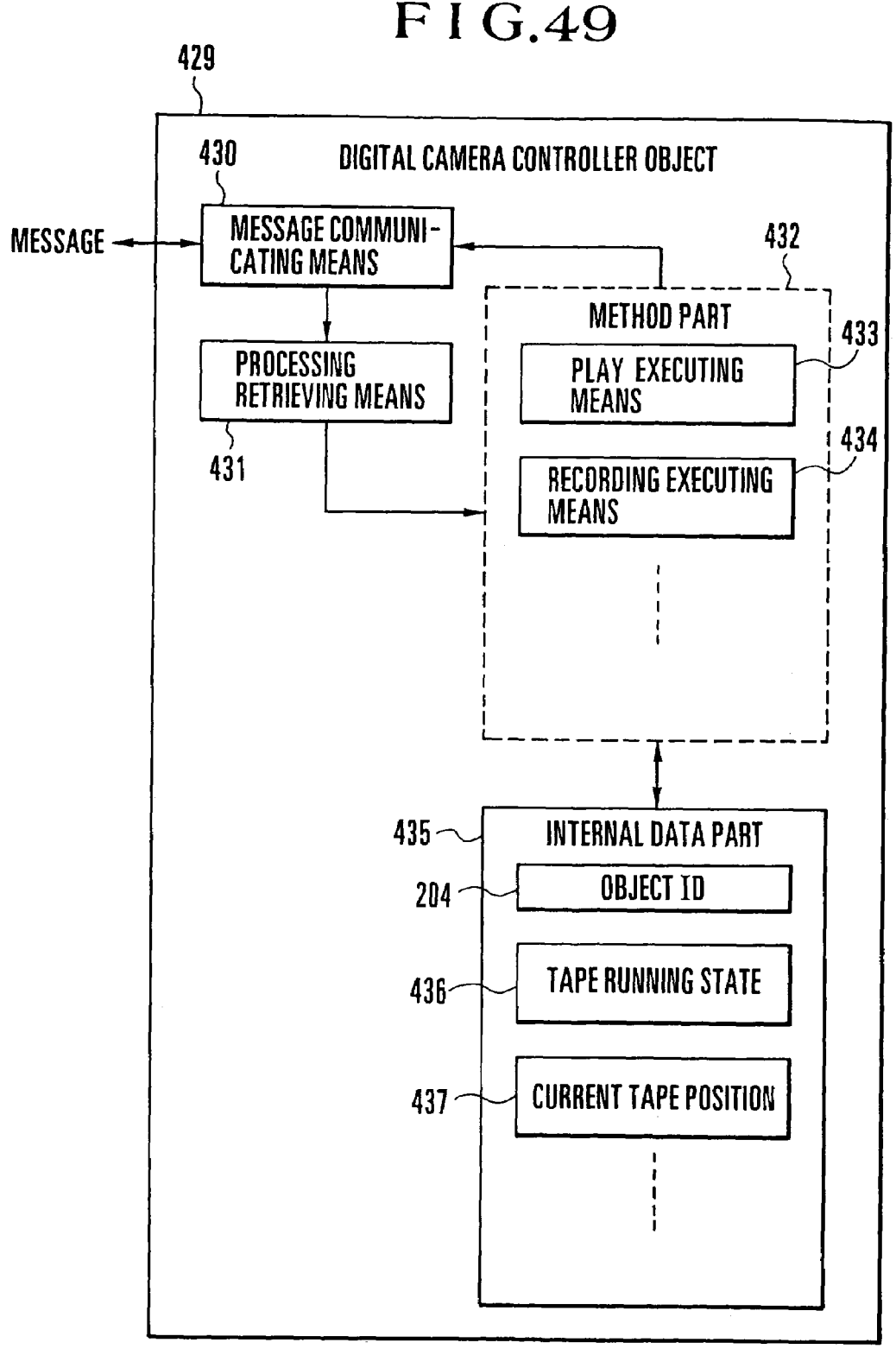
FIG. 49 is a view showing the internal structure of a digital VTR camera controller object.

First of all, when the user clicks the Play button (305 in FIG. 36(*b*)), the window server informs the control panel object (333 in FIG. 37) of the coordinates of the clicked position (the coordinates in the control panel). The control panel object which has received the coordinates refers to its own internal data part, recognizes that the Play button is displayed at the coordinates, and understands that the Play button has been clicked. The control panel object sends the digital camera device controller object 341 a message indicating that a data sending instruction (Play Message) has been given by the user. The processing retrieving means 431 in the digital camera controller object (429 in FIG. 49) activates play executing means 433 corresponding to the message in the method part 432. The play executing means 433 controls the hardware of the digital camera to make the mechanical part of the digital camera ready to perform a play operation at any time. The play executing means 433 also sends the digital camera device data output object (409 in FIG. 37) a message indicative of a request to output reproduced data. The processing retrieving means (421 in FIG. 48) in the digital camera device data output object which has received the message activates the data reading means 423 and the data transmitting means 424 in the method part 422. The activated data reading means 423 reads information from a recording medium.

Figure 42:
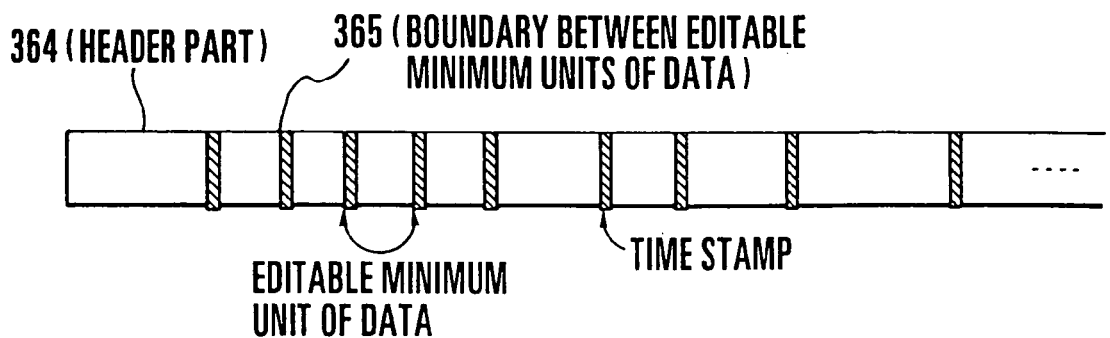
FIG. 42 is a view showing a data format of moving-image data.

The activated data transmitting means 424 first refers to the link information 428. Since the contents of the link information 428 represent a data receiver object ID=120 and a file type=Movie2 as shown at 430 in FIG. 50(*c*), the data transmitting means 424 converts the file type of the read data into the file type Movie2, and then sends the data of the file type Movie2 to the data receiver object of ID=120. In the second embodiment, the data Movie2 represents moving-image data. As shown in FIG. 42, the leading part of serial data is formed as a header part which includes the data required to reproduce a moving image, such as a file type and the numbers of vertical and horizontal pixels, while the body part of the serial data is divided into small segments by time stamps indicative of time information. The user can edit each of the small segments defined by the time stamps.

Figure 43:
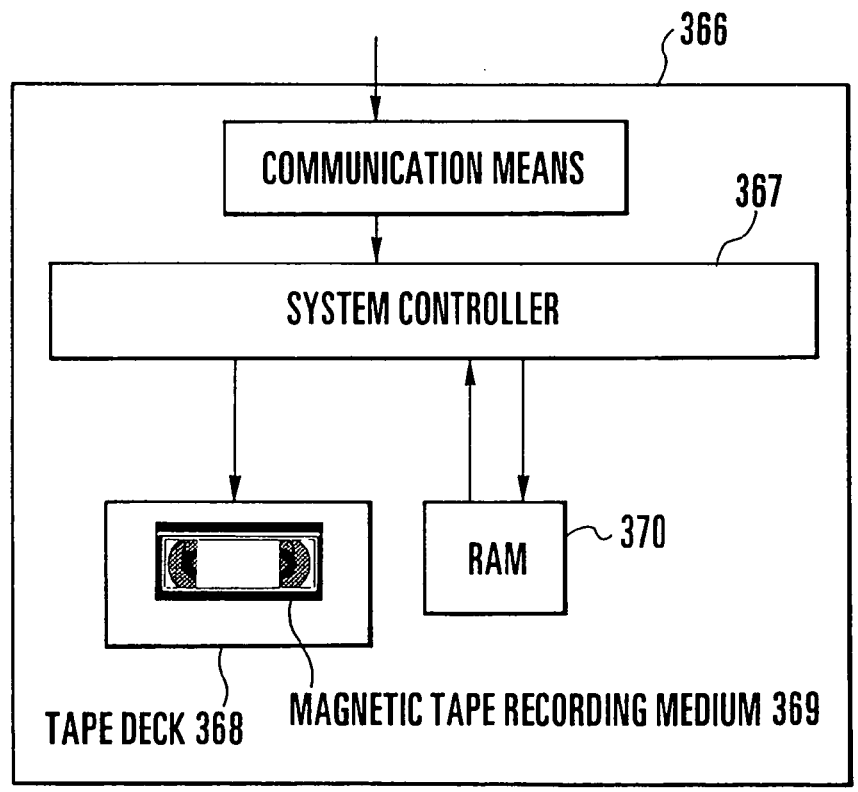
FIG. 43 is a view showing an internal construction of a digital VTR.

If the digital VTR device data input object (208 in FIG. 27) of ID=120 detects that the Movie2 data has been sent from the object of ID=110, the digital VTR device data input object refers to its own link information (1030 in FIG. 27). If the digital VTR device data input object confirms that there is a link between the data output object of ID=100 and the file type Movie2 as shown at 431 in FIG. 50(*d*), the header part (364 in FIG. 42) of the sent data is stored in a memory (370 in FIG. 43).

If the user clicks the Rec button (318 in FIG. 36(*b*)) of the digital VTR control panel at a particular time, the window server informs the control panel object (328 in FIG. 37) of the coordinates of the clicked position (the coordinates in the control panel). The control panel object which has received the coordinates refers to its own internal data part, recognizes that the Rec button is displayed at the coordinates, and understands that the Rec button has been clicked. The control panel object sends the digital VTR device controller object 340 a message indicating that a data recording instruction (Rec Message) has been given by the user. The processing retrieving means (1011 in FIG. 15) in the digital VTR controller object activates the recording executing means (1020 in FIG. 15) in the method part. The activated recording executing means (1020 in FIG. 15) controls the hardware of the digital VTR to make the mechanical part of the digital VTR ready to perform a recording operation at any time. The recording executing means also sends the digital VTR data input object (208 in FIG. 27) a message indicative of a request to record input data. The digital VTR data input object (208 in FIG. 27) which has received the request for recording of input data controls the hardware of the digital VTR to read the head information (364 in FIG. 42) saved in the RAM (370 in FIG. 43). The digital VTR data input object inserts, after the header information, data which follows a time stamp to be sent immediately after the head information, and starts recording on a magnetic recording medium 369. The thus-recorded Movie2 moving-image data has the header information required for moving-image play, so that it is possible to reproduce the moving-image data.

A third embodiment of the present invention will be described below. A multimedia controller according to the third embodiment has the feature described previously in connection with the first embodiment, and an application software (utility software) operating environment.

The multimedia controller according to the third embodiment will be described below. (In the present invention, there is no essential difference between application software and utility software, and the term "application software" is hereinafter used to represent application software and utility software.)

Figure 45:
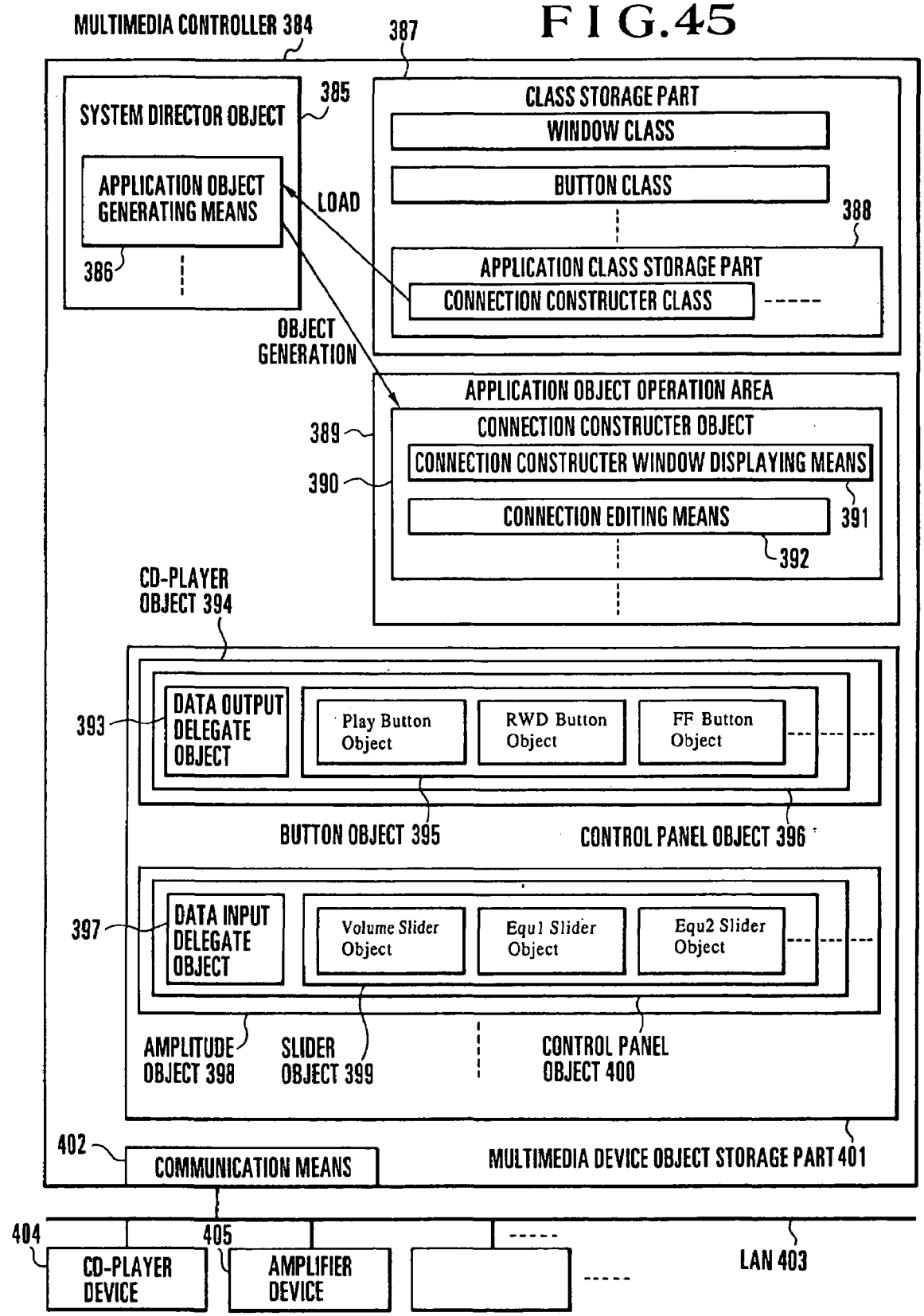
FIG. 45 is a block diagram showing the construction of an internal object of a multimedia controller according to a third embodiment of the present invention.

FIG. 45 shows the construction of internal objects of the multimedia controller according to the third embodiment of the present invention. The multimedia controller according to the third embodiment of the present invention includes means for installing application software (utility software) for the multimedia controller and an application software operating environment. (In the present invention, there is no essential difference between the application software and the utility software, and the term "application software" is hereinafter used to represent the application software and the utility software.)

In the multimedia controller according to the third embodiment, the application software is installed in an application class storage part (388 in FIG. 45) provided in the multimedia controller, from a floppy disk, communication means or the like. The content of the application software stored in the application class storage part is the description file of a class based on an object-oriented technique, and application object generating means (386 in FIG. 45) provided in the system direction object employs this class to generate an object capable of executing the application software, in an application object operation area (389 in FIG. 45). Thus, the application software becomes executable. If a user executes a manipulation using pointing means, such as a mouse, on a visible window object graphically displayed on a multimedia controller display by the application object, a window server sends to the application object a message indicating what manipulation has been executed at which coordinates on the multimedia controller display. Since the application object holds in its own internal data part information indicating what graphics are present at which coordinates on the application window, the application object can employ the information sent from the window server to recognize a click of an icon on the application window, an icon-to-icon dragging operation and the like.

A connection constructer application will be described below as one specific example of the application software for the multimedia controller.

Figure 44:
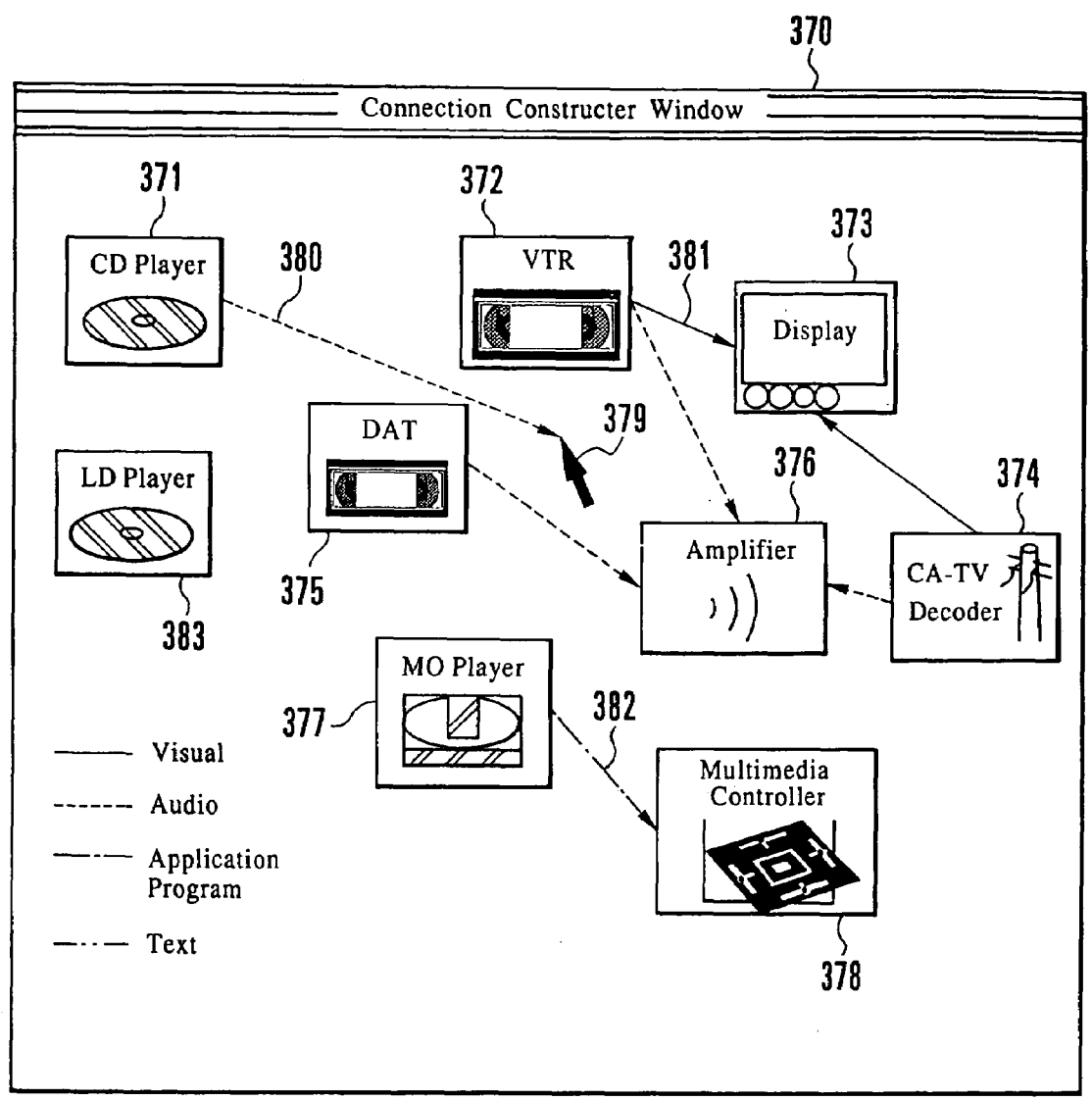
FIG. 44 is an explanatory view showing the user interface of a connection constructer window.

FIG. 44 shows the user interface of the connection constructer. As shown in FIG. 44, a connection constructer window 370 includes a cursor 379 of a mouse which is inputting means manipulated by a user, a CD player icon 371, a VTR icon 372, a display icon 373, a CA-TV decoder icon 374, a DAT deck icon 375, an amplifier icon 376 representative of an amplifier for amplifying an audio signal and causes a speaker (not shown) to generate sound, an MO player icon 377 representative of a magneto-optical player for performing recording on and play from a magneto-optical disk, a multimedia controller icon 378, and an LD player icon 383. The data sending and receiving relationships (connections) between the individual devices are indicated by arrows, and the user can easily known the data sending and receiving relationships between the individual devices owing to the arrows.

In the third embodiment, the LD player (383 in FIG. 44) has no connection. If the LD player which is in this state is made to perform a play, the reproduced video and audio data are sent to an object for providing a video display and an audio output, which object is provided in the multimedia controller which is a default link target.

The connection constructer window displayed in this manner is not only capable of displaying the aforesaid connections, but also allows the user to edit the connections on the connection constructer window. The user can form a connection between desired icons by dragging the cursor 379 therebetween. FIG. 44 shows a halfway stage in which the user is forming a connection from the CD player 371 to the amplifier 376 while dragging the mouse.

If the user clicks the icon of the connection constructer (connection constructer object) displayed on the multimedia controller display (27 in FIG. 4), the window server sends a connection constructer object (390 in FIG. 45) a message indicating that the icon has been clicked. The connection constructer object which has received the message activates connection constructer window displaying means (391 in FIG. 45) by means of processing retrieving means which is not shown in FIG. 45.

Figure 46:
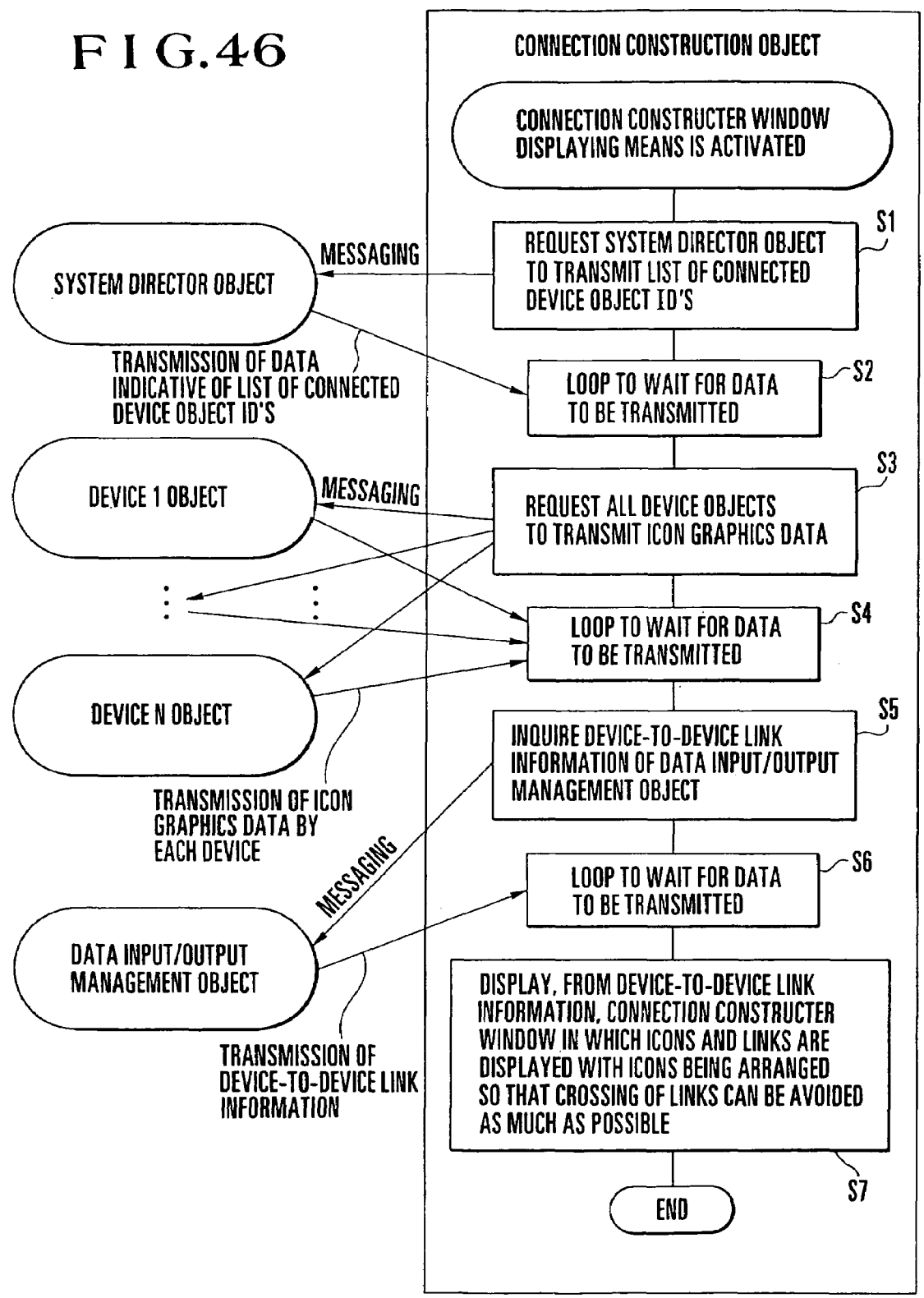
FIG. 46 is a view showing a processing flow of connection constructer window display means of the connection constructer object.

Messaging which is executed between the individual objects in the multimedia controller via the connection constructer object 390 when the user clicks the icon of the connection constructer, will be described below with reference to the flowchart of FIG. 46.

In Step S1, the connection constructer window displaying means (391 in FIG. 45) requests the system director object (205 in FIG. 11) to send a list of the object IDS of all the devices connected to the network. In Step S2, the connection constructer window displaying means waits for data corresponding to the request message to be sent from the system director object. The system director object refers to the object registration information (1078 in FIG. 11) stored in its own internal data part and retransmits a list of registered device object IDs to the connection constructer window displaying means. The connection constructer window displaying means stores the list in its internal data part, and causes the process to proceed to Step S3.

In Step S3, the connection constructer window displaying means refers to the internal data part and sends a icon graphics data sending request message to all the objects having the respective object IDs described in the connected device object ID list stored in the internal data part. In Step S4, the process waits for the data to be sent. If graphics data are sent from all the objects having the respective object IDs, the connection constructer window displaying means stores the graphics data in the internal data part, and causes the process to proceed to Step S5. In Step S5, the connection constructer window displaying means sends the data input/output managing object a message indicative of a request to send device-to-device link information which indicates that links are formed from which object ID to which object ID as well as what data attributes the respective links have. In Step S6, if the connection constructer window displaying means receives the device-to-device link information, it is determined that the connection constructer object 390 has obtained enough information to display the connection constructer window 370 of FIG. 44. In Step S7, the connection constructer window displaying means performs the processing of graphically displaying the connection constructer window 370. Such graphical display is executed on the basis of icon display positions which are calculated so that the probability that links cross each other can be made as low as possible.

In the third embodiment, the links formed between the devices are represented by straight lines connecting the icons of the respective devices, as shown in FIG. 44, so that the user can easily know the status of each connection. (The links do not need to be represented by such straight lines, and curved lines or others may also be employed for the purpose of more clearly displaying the relationship of connections.) Data attributes valid for the respective links are identified on the basis of the kinds (or colors) of lines.

In the third embodiment, as shown in FIG. 44, a link for visual data is displayed by a solid line, a link for audio data is displayed by a dashed line, a link for an application program is displayed by a chain line, and a link for text data is displayed by a chain double-dashed line.

For example, in FIG. 44, the VTR icon 372 and the display icon 373 are connected by a solid arrow 381. This indicates that if play from the VTR is executed, video data reproduced from the VTR is automatically transmitted to the display. If the user desires to enjoy the CA-TV, the user needs only to open a control panel for the CA-TV and set a desired channel. Video data from the CA-TV is automatically transmitted to the ID of the display 373, while audio data from the CA-TV is automatically transmitted to the ID of the amplifier 376.

In the third embodiment, the data supplied from the MO player is program data, and when the program data is transferred to the multimedia controller, the multimedia controller detects the description "program" contained in the data attribute described in the header part of the program data and recognizes the received data as an application program, whereby this application program is automatically activated. The above-described function can be realized in not only the multimedia controller but also other kinds of devices. For example, an operating system may also be provided in the display so that when the display receives a program, it can execute the program.

In the third embodiment, video data is embedded in the program, and an image is displayed on the display by executing the program. The advantage of this process is that since the video data is embedded in the program, users do not need to be conscious of data formats acceptable to the respective devices.

The user can edit the data sending and receiving relationships between the respective devices by forming lines between the respective device icons displayed on the aforementioned window. If a connection is formed between particular icons, connection editing means 394 transmits a linked message to the system director object. The system director object which has received the linked message executes processing in accordance with the flowchart of FIG. 39 in a manner similar to that described in connection with the first embodiment. If the data input/output managing means in the system director object determines that the link is valid, the internal data part of an object which relates to the link is updated in a manner similar to that described in connection with the first embodiment.

Figure 39:
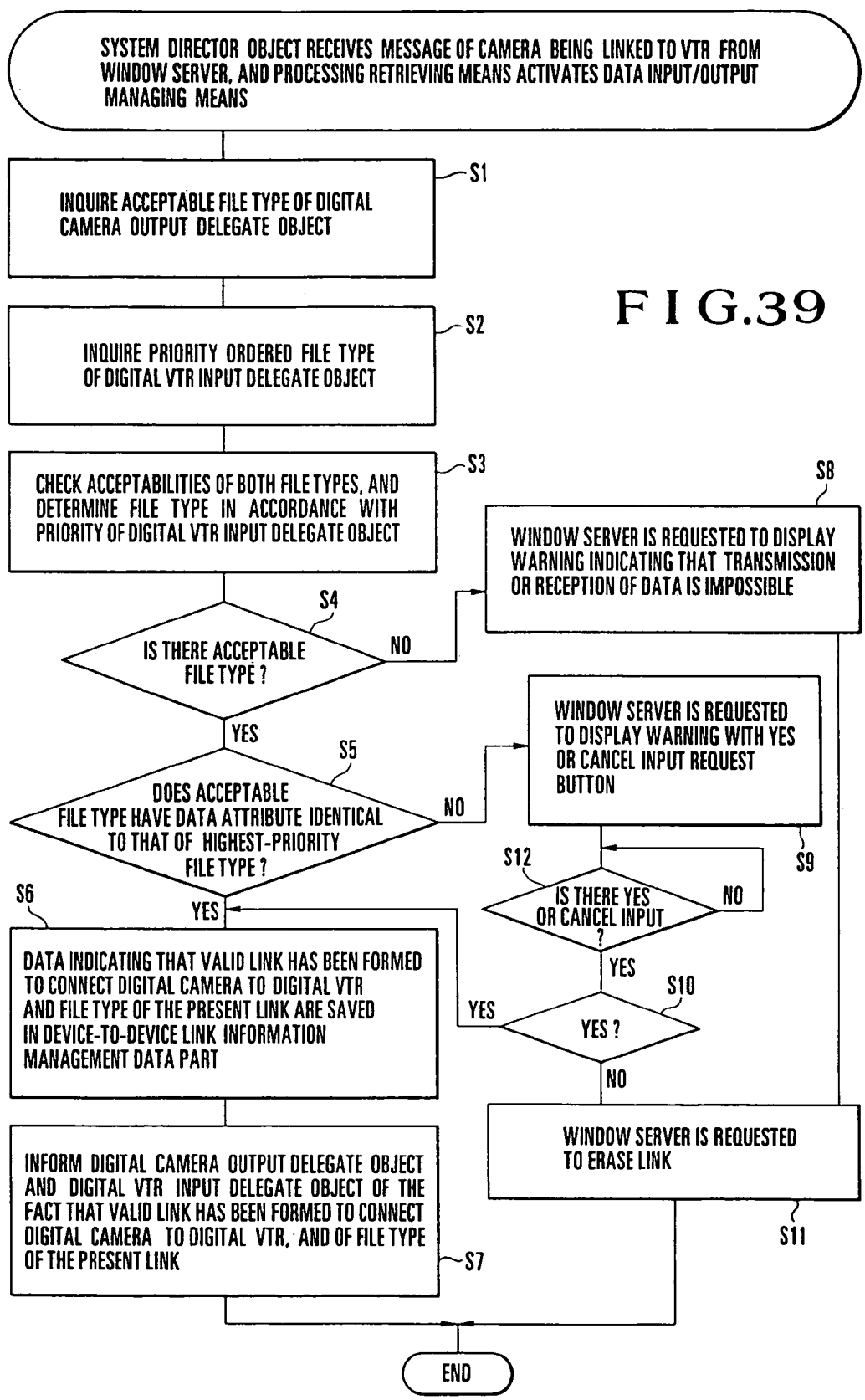
FIG. 39 is a flowchart showing a processing procedure executed by the data input/output managing means to form a link extending from a digital camera to a digital VTR.
Figure 41A:
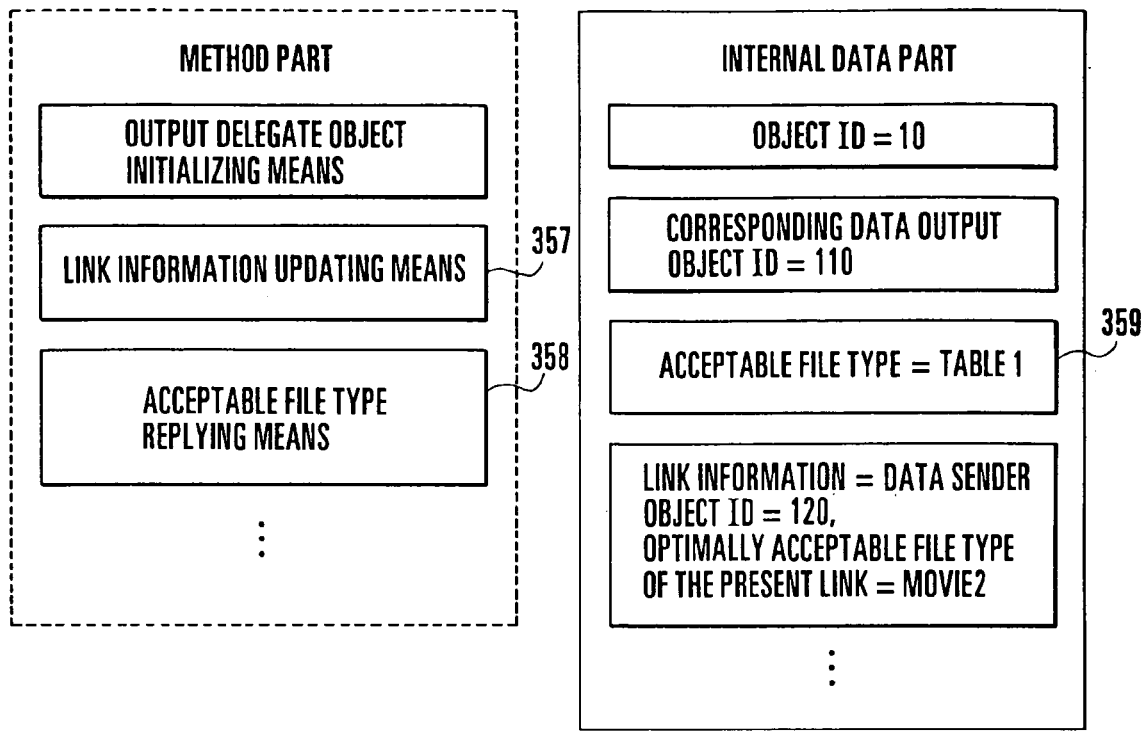
FIGS. 41(a) and 41(b) are views respectively showing a method part and an internal data part of a digital camera output delegate object as well as a method part and an internal data part of a digital VTR input delegate object.
Figure 41B:
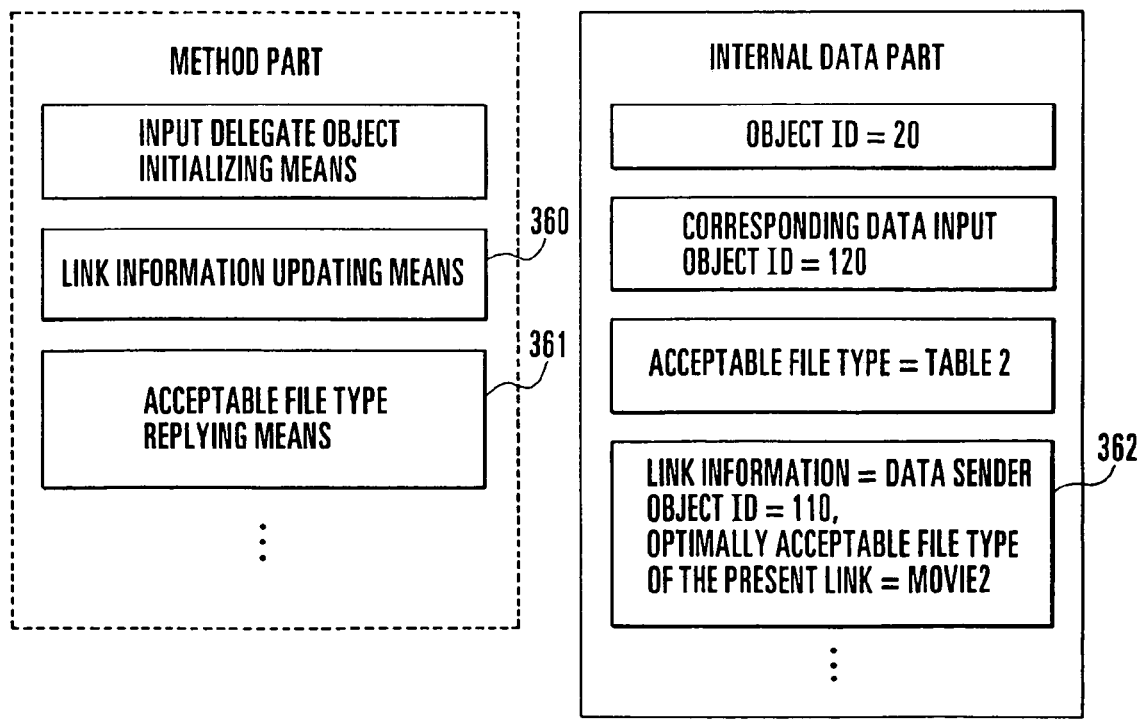

In Step S7 of FIG. 39, the connection constructer object is informed of the data attribute of the link formed by the system director object, and the connection constructer object selects and displays the kind of line of the link in accordance with the data attribute. The content of the internal data part of the object which relates to the updating of the link and the content displayed on the connection constructer window always coincide with each other.

As is apparent from the above description, in accordance with the above-described system device controlling means according to the third embodiment, to control the entire system including a controller and a plurality of multimedia devices connected thereto, it is not necessary to install and prepare, in the controller, device drivers, application software or the like for controlling the entire system. Only if a desired multimedia device is connected to a LAN, a corresponding control panel and the state of the connected multimedia device are displayed on the picture of the controller, whereby users can perform various operations on the picture, such as the operation of turning on and off the power source of the multimedia device, the operation of controlling the multimedia device itself and the operation of switching the inputting and the outputting of data therebetween. In addition, users can construct data sending and receiving relationships between the multimedia devices by means of a simple user interface. Since the controller (multimedia controller) automatically makes adjustment of the file format of data between a sending device and a receiving device, users do not need to perform a troublesome manipulation, such as adjustment of a file format.

A fourth embodiment of the present invention will be described below in detail.

The fourth embodiment relates to a multimedia device controlling system including multimedia devices and a multimedia controller for controlling the multimedia devices and, more particularly, to a system for confirming, managing and manipulating the connection status of, and the on/off state of the power source of, each of the multimedia devices to be controlled by the multimedia controller.

In recent years, various devices, such as VTRs, CDS and other AV devices, have been being digitized, and it has been desired to regard such digitized devices as so-called multimedia devices and employ information, such as images, sounds and texts in an integrated manner. Conventionally, a user has taken the responsibility of managing the connection of such multimedia devices, and to handle the information in an integrated manner, a device for managing and controlling the multimedia devices has been needed.

To achieve the above-described concept, there is a system in which an information processing device, such as a computer, and a printer or the like are connected by a network.

In this system as well, to accurately and efficiently manage and operate connected devices, an information processing device (hereinafter referred to as the "multimedia controller") for managing and controlling the connected devices needs to correctly confirm the statuses of the respective connected devices. The following confirmation techniques are employed:

(1) a technique in which identification information about the respective multimedia devices connected to the system is manually inputted to the storage device of the multimedia controller and, when the power source of the multimedia controller is turned on, the multimedia controller reads and confirms the identification information;

(2) a technique in which identification information about the respective multimedia devices connected to the system is manually inputted to the storage devices of the respective multimedia devices and, when the power source of the multimedia controller is turned on, the multimedia controller reads out and confirms the identification information through communication; and (3) a technique in which the multimedia controller checks the multimedia devices connected to the system in accordance with the manipulation of a user and assigns identification information about the respective connected multimedia devices to the storage devices of the respective multimedia devices.

However, any of the above-described conventional arts relates to the art of computer systems, and users need to have skill or knowledge about computer systems. This leads to the problem that any of the above-described conventional arts is not acceptable to common users who use VTRs, CD players or other domestic devices.

For example, in the conventional art (1), it is necessary to manually input information about the connected multimedia devices to the multimedia controller in advance, so that a manager who has inputted the information must manage predetermined information, such as information indicating what identification information has been assigned to which multimedia device. As a result, the manager needs to accurately manage the predetermined information, and it is also impossible to avoid the occurrence of malfunction due to erroneous inputting or the like. If a multimedia device is to be newly connected to the system, it is necessary to request the manager to newly assign identification information to all the connected multimedia devices and input the assigned identification information to the multimedia controller.

In the conventional art (2), although the multimedia controller assigns the identification information to the respective multimedia devices, it is still necessary to manually input the identification information to the respective multimedia devices to be connected to the system. Accordingly, it is still impossible to avoid the occurrence of malfunction due to erroneous inputting.

In either of the arts (1) or (2), if a multimedia device is newly connected to, or disconnected from, the system with the system being activated, the system is unable to recognize that fact. For this reason, it is necessary to shut down the system and then re-activate it to cause the system to correctly recognize the connected multimedia devices.

In the case of the art (3), the above-described problems are solved to a considerable extent. For example, even if a multimedia device is newly connected to, or disconnected from, the system with the system being activated, the system can recognize that fact without being shut down and re-activated. However, a user of the system must perform the operation of issuing a command to confirm the multimedia devices connected to the system to the multimedia controller. As a result, the user must be at all times conscious that a multimedia device has been connected to, or disconnected from, the system, and must perform the aforesaid command issuing operation each time a multimedia device has been connected to, or disconnected from, the system.

The above-described problems lead to the problem that none of the conventional systems is acceptable to common users having no special skill or knowledge about computer systems.

The fourth embodiment has been made to solve the above-described problems, and is intended to disclose an improved multimedia system which includes multimedia devices and a multimedia controller for unitarily managing the multimedia devices. In the multimedia system, each of the multimedia devices includes a first interface control unit which functions to exercise control over communication with the multimedia controller, and the first interface control unit includes an interface controller for controlling communication at a physical or logical low level, and a first system controller for executing communication with a device function unit of the multimedia device and control of the first interface control unit. The multimedia controller includes a second interface control unit for controlling communication with each of the multimedia devices, and the second interface control unit includes an interface controller for controlling communication at a physical or logical low level, a device connection/disconnection signal processing means for processing a device connection signal indicative of a connection of any of the multimedia devices detected by the interface controller or a device disconnection signal indicative of a disconnection of any of the multimedia devices detected by the interface controller, storage means for storing a state-of-connection management table which is to be referred to and updated in the device connection/disconnection signal processing means, and a second system controller for executing communication with the device function unit of the multimedia controller and control of the second interface unit.

According to the above-described embodiment, users can correctly grasp the state of connection between the multimedia controller and each of the multimedia devices without being particularly conscious of the connection or disconnection of any of the multimedia devices. Accordingly, even if a multimedia device is newly connected to, or disconnected from, the multimedia controller, the total efficiency of the system is not impaired.

Figure 52:
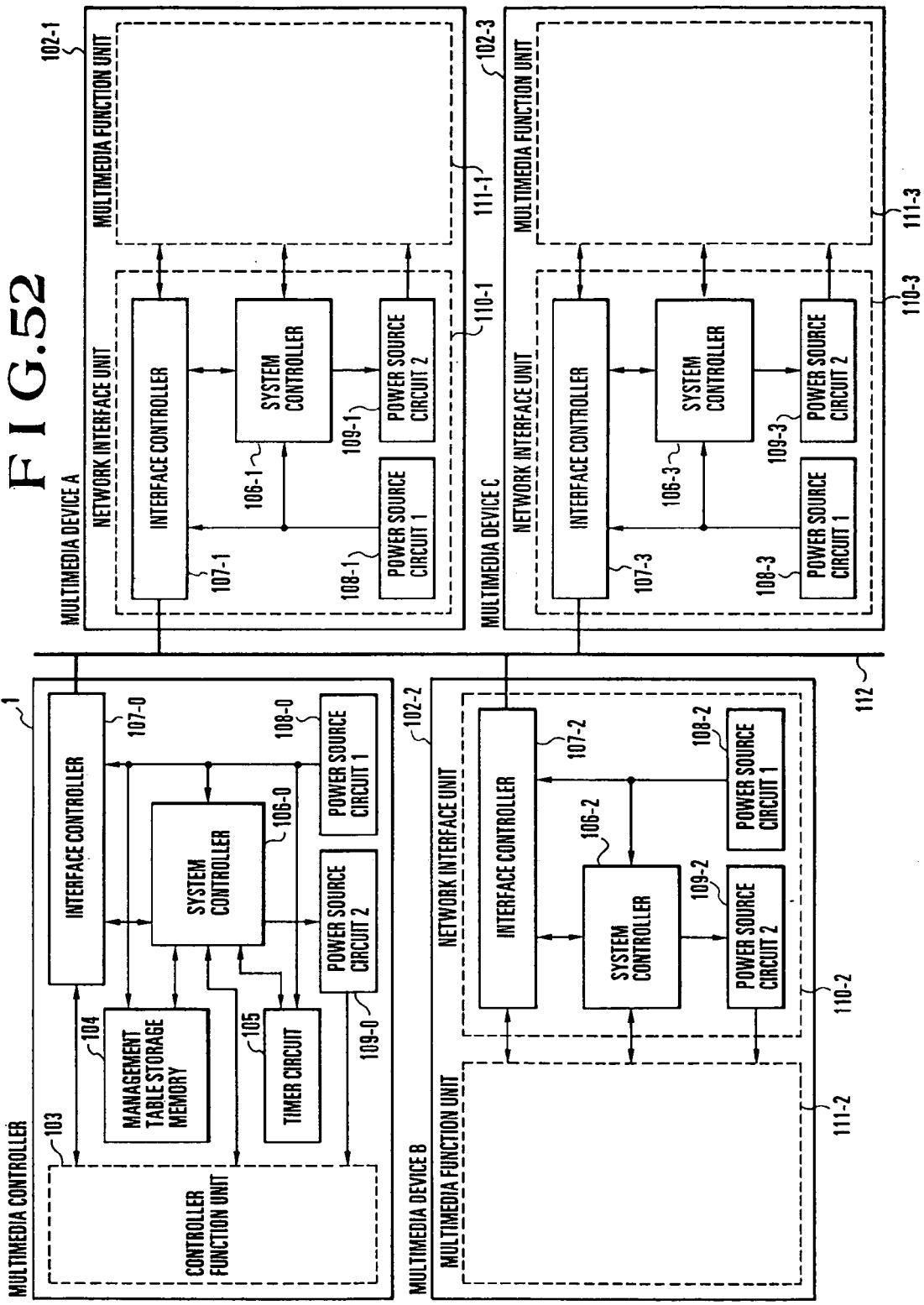
FIG. 52 is a block diagram showing the construction of a fourth embodiment of the present invention.

The fourth embodiment of the present invention will be described below with reference to a specific example in which a plurality of multimedia devices are connected to a multimedia controller so that they can be controlled by using a multimedia control system. FIG. 52 is a block diagram showing the construction of the fourth embodiment.

As can be seen from FIG. 52, the fourth embodiment of the present invention includes multimedia devices 102-1, 102-2 and 102-3 and the multimedia controller 1 for manipulating and managing the multimedia devices 102-1, 102-2 and 102-3.

Although FIG. 52 shows the three multimedia devices 102-1, 102-2 and 102-3 by way of example, it is of course possible to employ one or more multimedia devices. However, the maximum allowable number of connectable multimedia devices are determined by a total load which can be handled by the entire system.

The multimedia controller 1 includes a multimedia controller function unit 103 for realizing the function of the multimedia controller 1, an interface controller 107-0 for controlling communications at a physical or logical low level, a main power source circuit 108-0, a subsidiary power source circuit 109-0, a timer circuit 105, a memory 104 which stores a table for managing the connection statuses of the respective multimedia devices 102-1, 102-2 and 102-3, and a system controller 106-0 for controlling those constituent elements. The main power source circuit 108-0 supplies electrical power to each of the interface controller 107-0, the timer circuit 105, the system controller 106-0 and the memory 104. Such electrical power may also be supplied from a battery, or a power source line may be added to a communication line to supply the electrical power. The subsidiary power source circuit 109-0 is arranged to be turned on and off by a user manipulating the main switch of the multimedia controller 1 or in accordance with a request sent from the system controller 106-0, and the electrical power of the subsidiary power source circuit 109-0 is supplied to the multimedia controller function unit 103. The subsidiary power source circuit 109-0 uses, for example, a domestic wall socket, whereas the main power source circuit 108-0 uses another power source line.

Since electrical power can be supplied from such two different power source lines in the above-described manner, a power source for a mechanism driving system which generally has a large power consumption needs only to be turned on when required, and if such a power source is not required, it is possible to supply enough electrical power to execute only communication.

The multimedia devices 102-1 (A), 102-2 (B) and 102-3 (C) respectively include multimedia function units 111-1, 111-2 and 111-3, interface controllers 107-1, 107-2 and 107-3, main power source circuits 108-1, 108-2 and 108-3, subsidiary power source circuits 109-1, 109-2 and 109-3 and system controllers 106-1, 106-2 and 106-3. The interface controllers 107-1, 107-2 and 107-3, the main power source circuits 108-1, 108-2 and 108-3, the subsidiary power source circuits 109-1, 109-2 and 109-3 and the system controllers 106-1, 106-2 and 106-3 are respectively equivalent to the interface controller 107-0, the main power source circuit 108-0, the subsidiary power source circuit 109-0 and the system controller 106-0.

Figure 53:
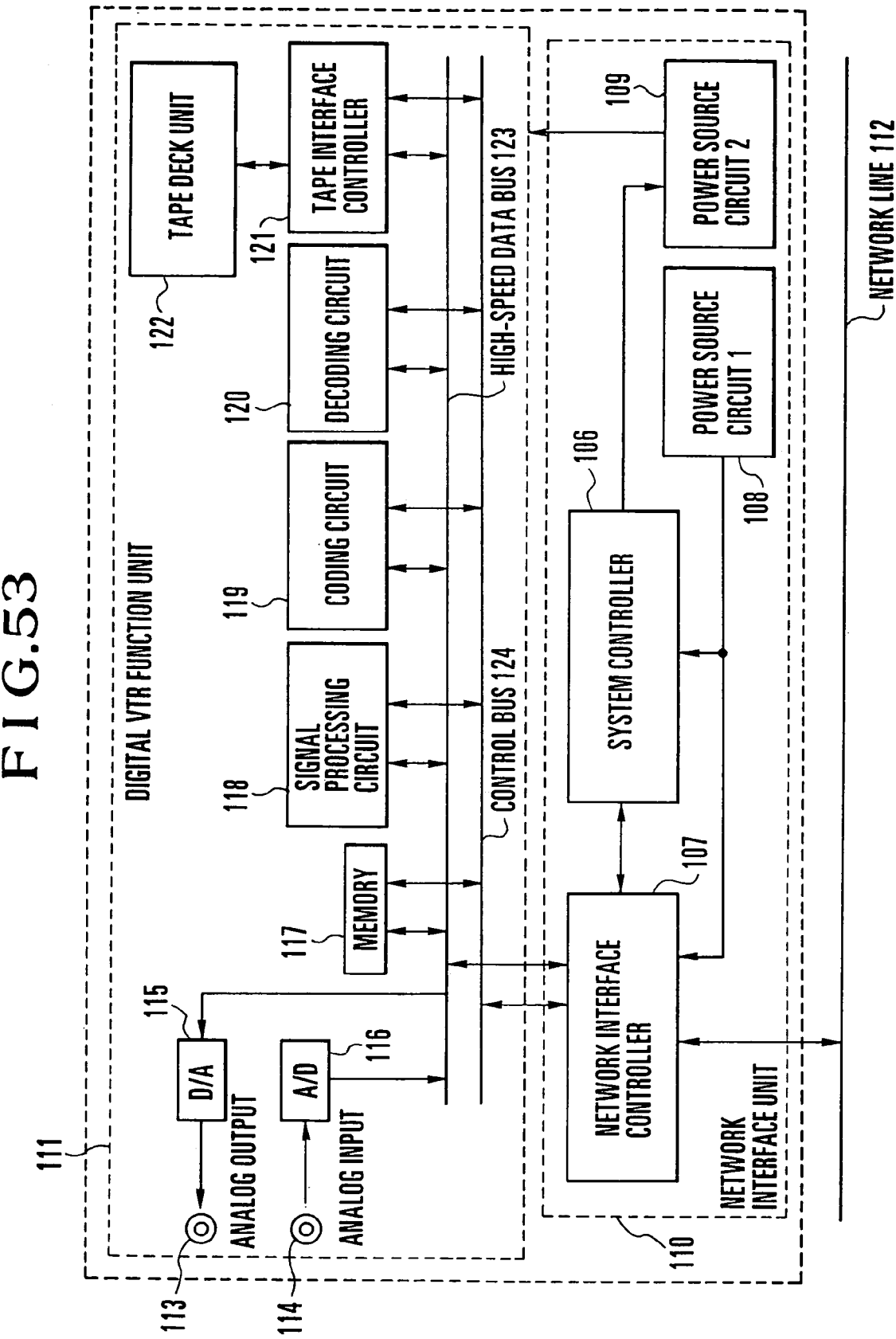
FIG. 53 is a block diagram showing the construction of a digital VTR which is a specific example of a multimedia device which will be referred to in each of fifth, sixth, seventh, eighth, ninth and tenth embodiments.

FIG. 53 is a block diagram showing the construction of a digital VTR which is a specific example of any one of the multimedia devices A, B and C. A digital VTR function unit 111 which is a specific example of any one of the multimedia function units 111-1, 111-2 and 111-3 includes an analog output terminal 113, an analog input terminal 114, a D/A conversion circuit 115, an A/D conversion circuit 116, a frame memory 117, a signal processing circuit 118, a coding circuit 119, a decoding circuit 120, a tape deck unit 122, a tape interface controller 121, a high-speed data bus 123 and a control bus 124.

The operation of the fourth embodiment of the present invention will be described below. FIG. 54 is a flowchart showing the processing of a main event loop of the multimedia controller 1. First of all, it is determined whether there is an event caused by the manipulation of the multimedia controller 1 by a user who is manipulating the multimedia controller 1 or an event sent from any of the multimedia devices through communication (S101). If there is either event, the processing of the event is executed (S107). If there is no event, it is determined whether a counter g Check Time=0 (S102). If it is determined (S102) that the counter g Check Time=0, the states of connected devices are checked (S103), and device IDs are assigned to the multimedia devices described on a created state-of-connection management table (S104). The device IDs correspond to the IP addresses used in a TCP/IP protocol, and are so-called logical addresses relative to individual multimedia devices. By assigning the devices IDs to the respective multimedia devices, the multimedia controller 1 and each of the multimedia devices can communicate with each other without being conscious of physical addresses.

If a new device is connected to the multimedia control system or a connected device is disconnected from the multimedia control system, the device IDs are automatically reassigned so that sending and receiving addresses can be unitarily managed. The multimedia controller 1 rewrites a display of the states of the connected devices while referring to the thus-created state-of-connection management table (S105), and sets the value of the counter g Check Time to a preset value (S106). FIG. 55 shows the construction of the aforesaid state-of-connection management table.

On the table shown in FIG. 55, numbers unique to the respective multimedia devices are stored in the column named "UNIQUE NUMBER", and are also used as physical addresses. The unique numbers contain attribute information, such as digital VTR or CD player, about the respective multimedia devices. If a plurality of multimedia devices having identical attribute information are connected to the multimedia control system, different names are assigned to the respective multimedia devices and are stored in the column "DEVICE NAME" on the state-of-connection management table shown in FIG. 55. For example, in the case of FIG. 55, since two digital VTRs are connected, Digital VTR1 and Digital VTR2 are stored as the respective device names. The column "OBJECT INFORMATION STORAGE ADDRESS" shown in FIG. 55 stores object information, such as pointers to areas in which display and manipulation objects for the respective multimedia devices are stored. The column "OBJECT INFORMATION STORAGE ADDRESS" will be described later in detail. The column "DEVICE ID" shown in FIG. 55 stores the aforementioned device IDs. The other columns "POWER ON/OFF" and "CONFIRMATION OF CONNECTION" will also be described later.

Figure 56:
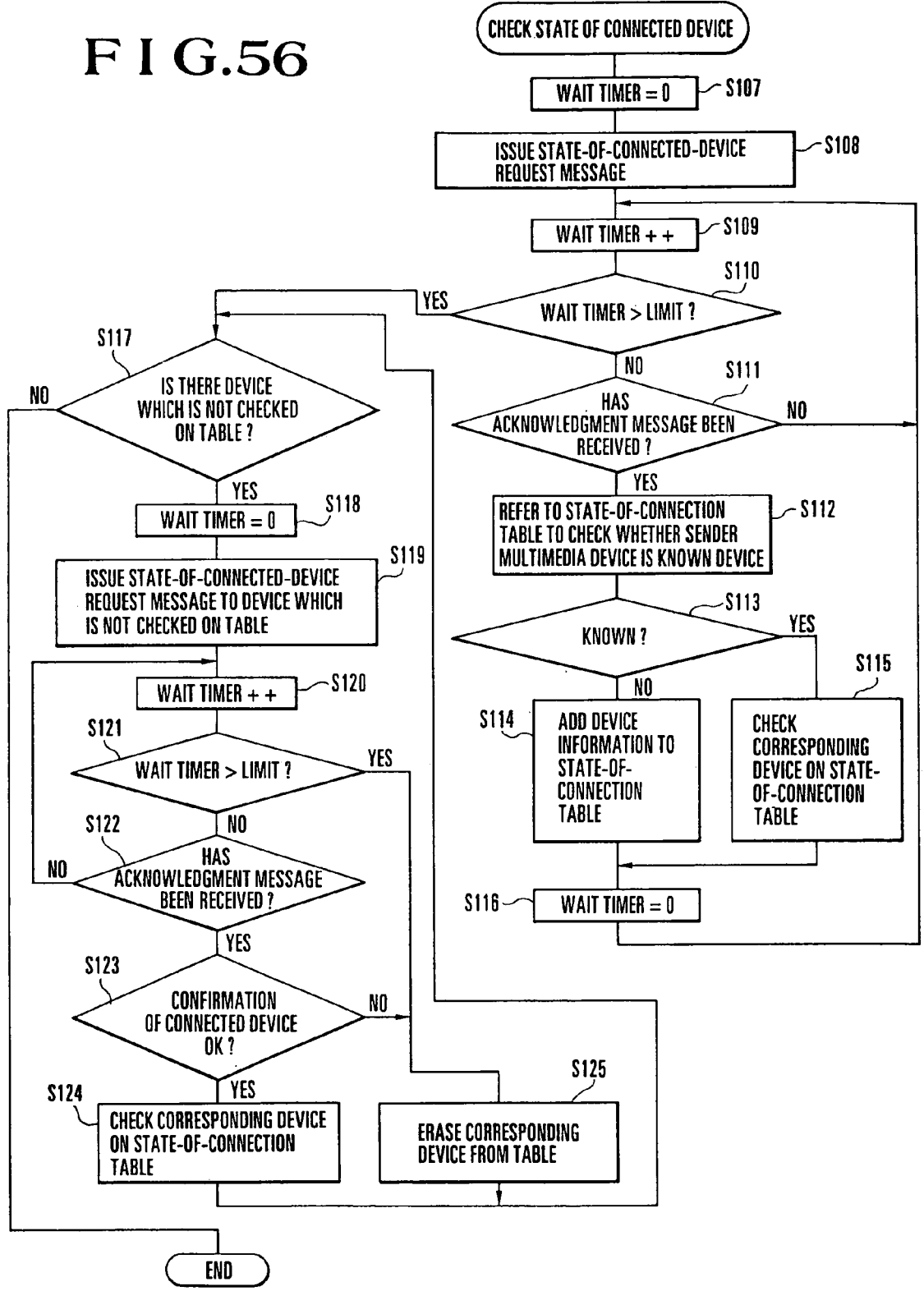
FIG. 56 is a flowchart showing the processing of checking the states of connected devices according to the fifth embodiment of the present invention.

Processing to be executed to check the states of the connected devices (S103) will be described below in detail. FIG. 56 is a flowchart of the aforementioned state-of-connected device check. First of all, a variable Wait Timer which performs a counting operation to determine whether a communication time has reached a time-out value is initialized (S107), and a state-of-connected-device request message is sent from the multimedia controller 1 to each of the multimedia devices (S108). Then, the variable Wait Timer is incremented (S109), and it is determined whether the value of the variable Wait Timer exceeds a time-out value Limit (S110). If the value of the variable Wait Timer does not exceed the time-out value Limit, it is determined whether an acknowledgment message has been received from each of the multimedia devices (S111). If no acknowledgment message has yet been received, the process returns to Step S109. If an acknowledgment message has been received, it is checked whether a multimedia device which has sent the acknowledgment message is already stored on the state-of-connection management table (S112). If this multimedia device is one of the multimedia devices stored on the state-of-connection management table, a confirmed check mark is recorded in a corresponding part of the column "CONNECTION CONFIRMATION" on the state-of-connection management table (S115). If the aforesaid multimedia device is a multimedia device which is not stored on the state-of-connection management table, the multimedia device is registered on the state-of-connection management table, and a confirmed check mark is recorded in a corresponding part of the column "CONNECTION CONFIRMATION" (S114).

Then, the variable Wait Timer is initialized (S116), and the process returns to Step S109, in which the process waits for an acknowledgment message to be sent from another of the multimedia devices. If it is determined in Step S110 that the value of the variable Wait Timer exceeds the time-out value Limit, it is determined whether the multimedia devices stored on the state-of-connection management table contain a multimedia device for which no confirmed check mark is recorded in the column "CONNECTION CONFIRMATION" (S117). If there is no such multimedia device, the process is brought to an end.

If it is determined that there is a multimedia device for which no confirmed check mark is recorded in the column "CONNECTION CONFIRMATION", the variable Wait Timer is initialized (S118) and a state-of-connected-device request message is again sent to the multimedia device for which no confirmed check mark is recorded in the column "CONNECTION CONFIRMATION" (S119). Then, the variable Wait Timer is incremented (S120), and it is determined whether the value of the variable Wait Timer exceeds the time-out value Limit (S121).

If it is determined in Step S121 that the value of the variable Wait Timer exceeds the time-out value Limit, it is determined that the multimedia device is not connected, and the multimedia device is erased from the state-of-connection management table (S125). If it is determined in Step S121 that the value of the variable Wait Timer does not exceed, it is checked whether an acknowledgment message has been received from the multimedia device (S122). If no acknowledgment message has yet been received, the process returns to Step S120, in which the process waits for an acknowledgment message to be sent from the multimedia device until it is determined in Step S121 that the value of the variable Wait Timer exceeds the time-out value Limit.

If it is determined in Step S122 that the acknowledgment message has been received, it is determined whether the multimedia device which has issued the acknowledgment message coincides with an expected multimedia device (S123). If they coincide with each other, a confirmed check mark is recorded in the column "CONNECTION CONFIRMATION" on the state-of-connection management table (S124). If they do not coincide with each other, it is determined that an abnormality has occurred, and the multimedia device is erased from the state-of-connection management table and a warning operation is executed (S125). Then, the process returns to Step S117. The above processing is repeated until confirmed check marks for all the multimedia devices are recorded in the column "CONNECTION CONFIRMATION". By executing this series of steps (S107 to S125) at regular intervals, the state-of-connection management table is updated and the multimedia devices connected to the multimedia control system can be correctly grasped.

Figure 57A:
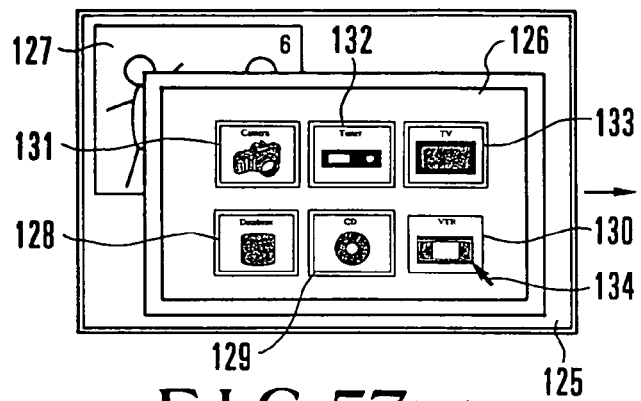
FIGS. 57(a) to 57(d) are conceptual diagrams showing means for presenting, to a user of the multimedia controller, multimedia devices which have had their connections confirmed according to the fifth embodiment of the present invention.

FIGS. 57(a) to 57(d) represent means for presenting the multimedia devices which have had their connections confirmed in the above-described manner to the user of the multimedia controller 1. FIG. 57(a) is a view showing a state in which a connected-device confirmation panel 126 is displayed on a display device 125 of the multimedia controller 1 in response to a connected-device confirmation display command executed by the user. A particular application panel 127 is also shown which had been displayed before the connected-device confirmation display command was executed by the user.

Icons 128, 129, 130, 131, 132 and 133 representative of the respective multimedia devices which have had their connections confirmed are displayed on the connected-device confirmation panel 126.

The icons of the multimedia devices whose subsidiary power sources are on are displayed in inverted or outlined form to inform the user that the power source circuits of the multimedia devices are on. In the example shown in FIG. 57(a), the icon 130 indicates that the subsidiary power source of the corresponding multimedia device (digital VTR) is off.

Figure 57B:
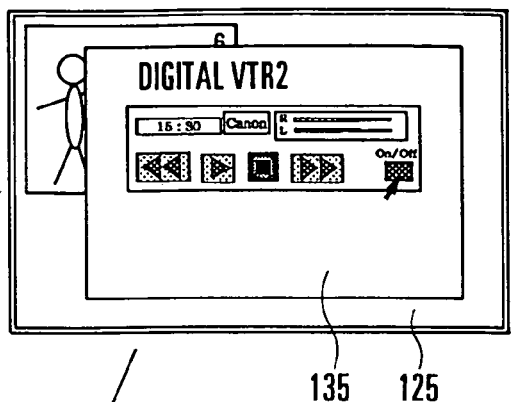
Figure 57C:
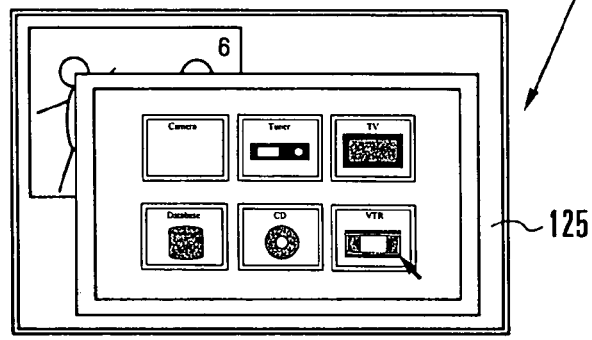

If the icon 130 of the multimedia device is clicked by a cursor 134 manipulated by a pointing device (not shown) such as a mouse, a manipulation panel 135 for the multimedia device indicated by the icon 130 is displayed as shown in FIG. 57(b). The multimedia device can be manipulated by manipulating a desired one of the switches displayed on the manipulation panel 135 by using the cursor 134. In the example shown in FIG. 57(b), a power on/off button is clicked to turn on the subsidiary power source. FIG. 57(c) shows a state in which the state shown in FIG. 57(b) is reflected on the connected-device confirmation panel 126.

Figure 58:
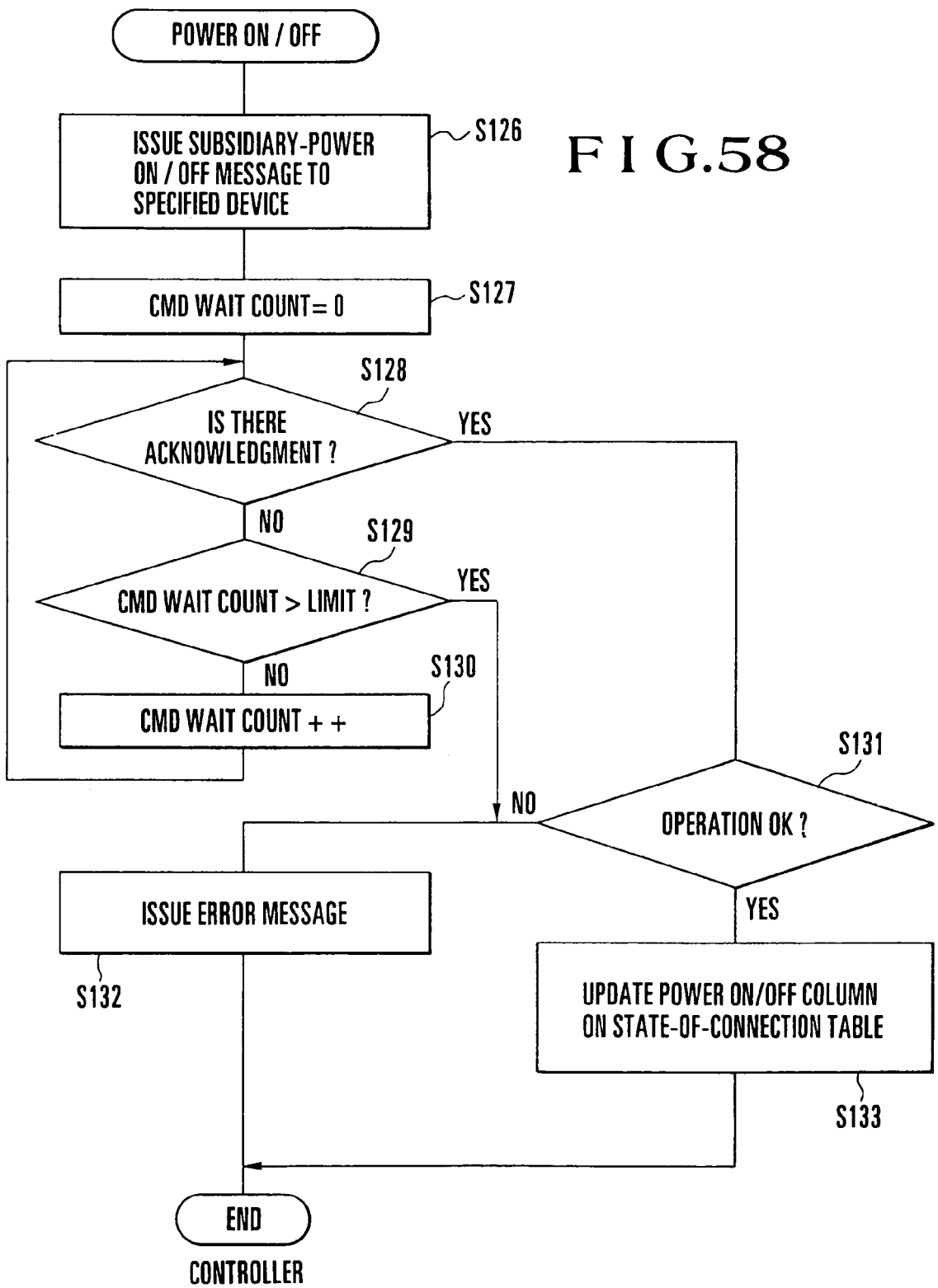
FIG. 58 is a flowchart showing the operation of the controller for a power on/off manipulation according to the fifth embodiment of the present invention.
Figure 59:
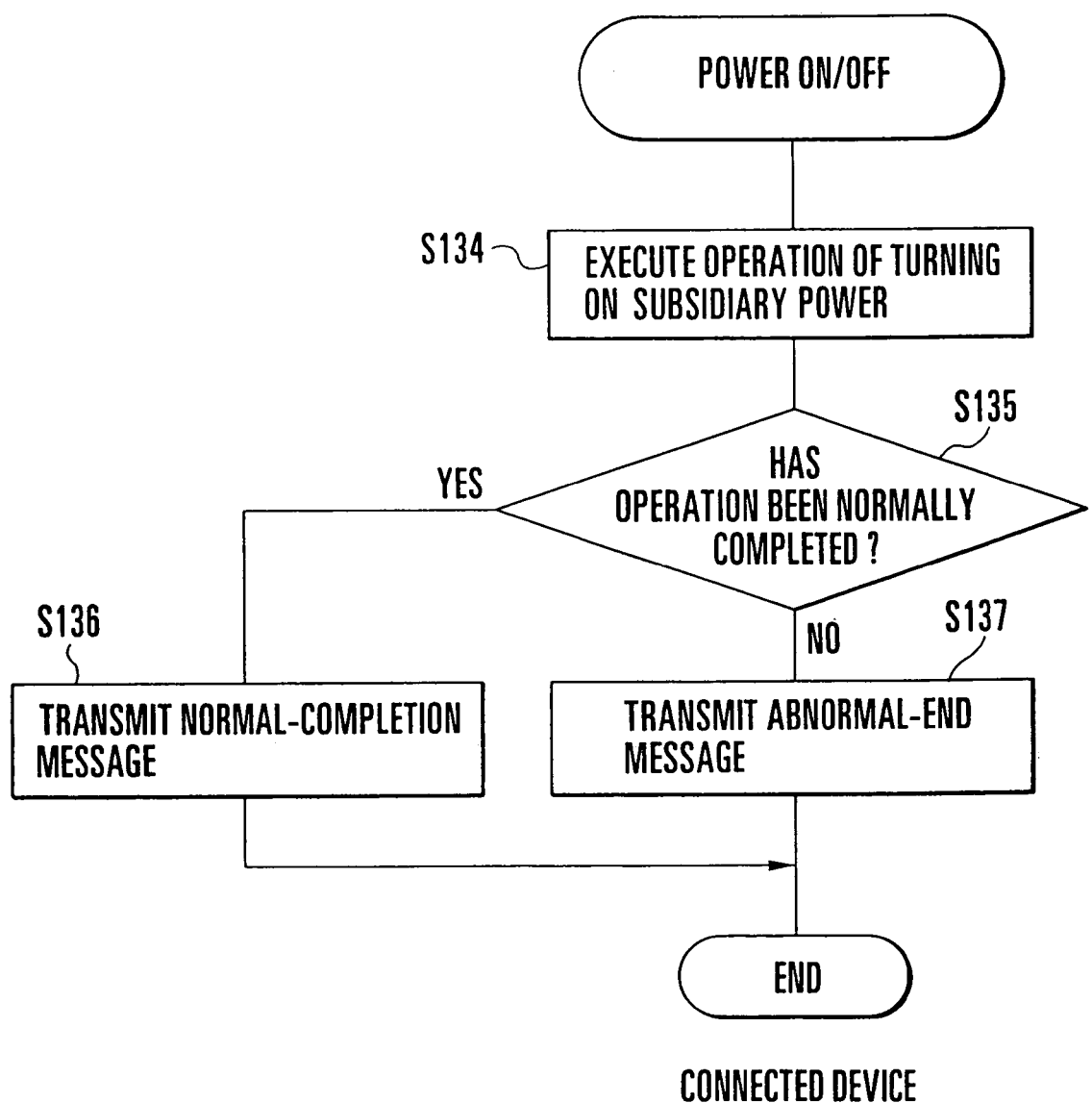
FIG. 59 is a flowchart showing the operation of a multimedia device for the power on/off manipulation according to the fifth embodiment of the present invention.

FIGS. 58 to 62 are flowcharts showing the operation of the aforementioned power on/off manipulation. FIG. 58 shows the operation of the multimedia controller, while FIG. 59 shows the operation of the multimedia device. If the user performs the manipulation of turning on a subsidiary power source, the multimedia controller sends a power-on message to a multimedia device to be manipulated (S126). A counter Cmd Wait Counter, which counts elapsed time up to a time-out value for the purpose of allowing the multimedia controller to wait for arrival of an acknowledgment message, is reset (S127), and the multimedia controller waits for an acknowledgment message. The multimedia device to be manipulated receives the power-on message and executes a power-on operation (S134), and it is determined whether the power source of the multimedia device has been normally operated (S135). If the power source has been normally operated, the multimedia device sends a normal completion message to the multimedia controller (S136). If there is an abnormality, the multimedia device sends an abnormal end message to the multimedia controller (S137). If the multimedia controller receives the acknowledgment message and determines that there is an acknowledgment (S128), then it is determined whether the power-on operation has been normally completed (S131). If the power-on operation has been normally completed, the multimedia controller records a power-on check mark in a corresponding part of the column "POWER ON/OFF" of the state-of-connection management table (S133). If there is an abnormality, the multimedia controller sends an error message to the multimedia device (S132). If it is determined in Step S128 that there is no acknowledgment, the multimedia controller determines whether the value of the counter Cmd Wait Counter exceeds the time-out value Limit. If it is determined that the value of the counter Cmd Wait Counter exceeds the time-out value Limit, the process proceeds to Step S132 mentioned above. If it is determined that the value of the counter Cmd Wait Counter does not exceed the time-out value Limit, the counter Cmd Wait Counter is incremented (S130) and the process returns to Step S128.

Figure 60:
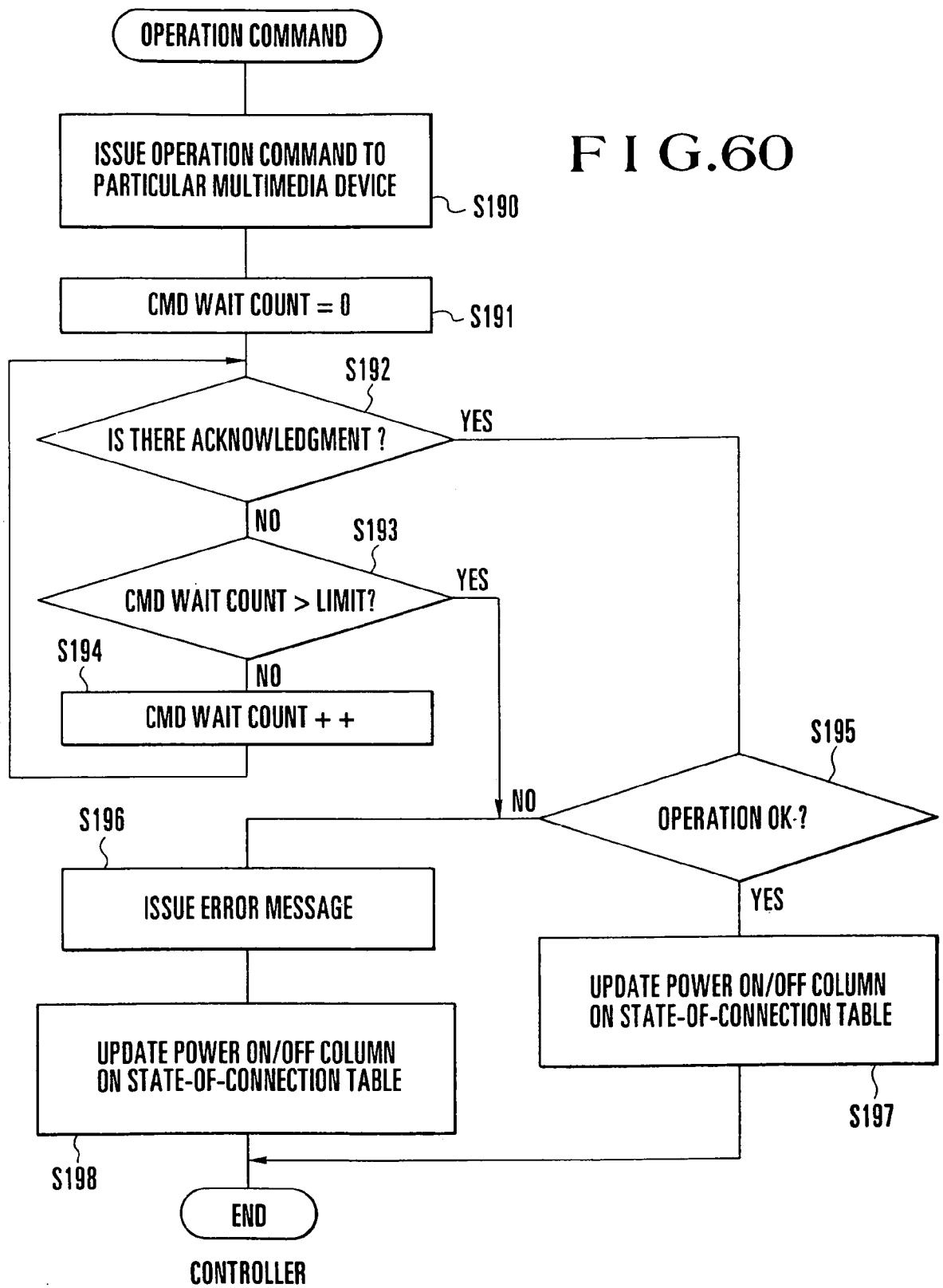
FIG. 60 is a flowchart showing the operation of the controller when an operation command is generated.
Figure 61:
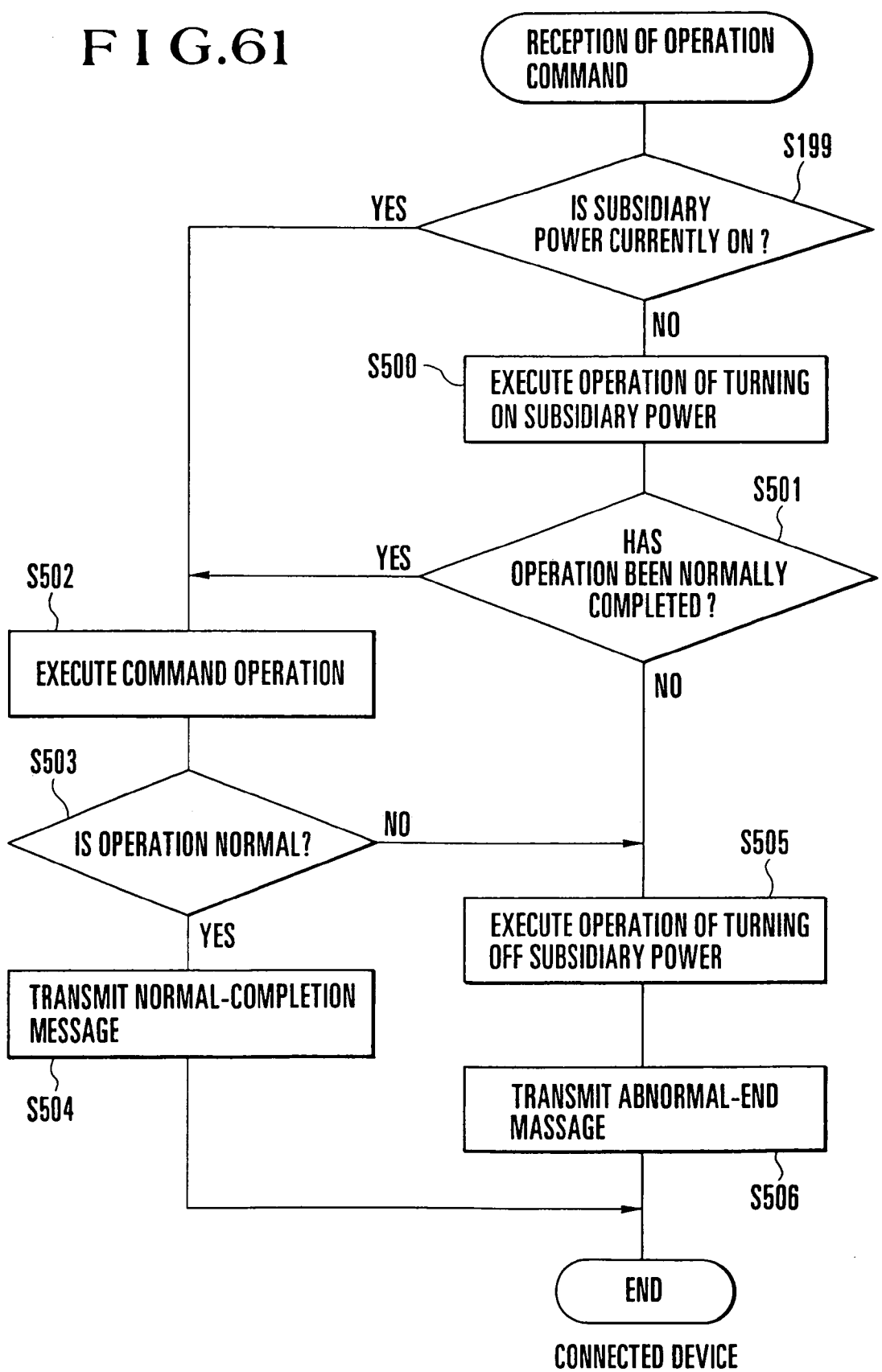
FIG. 61 is a flowchart showing the operation of each connected device when the operation command is generated.
Figure 62:
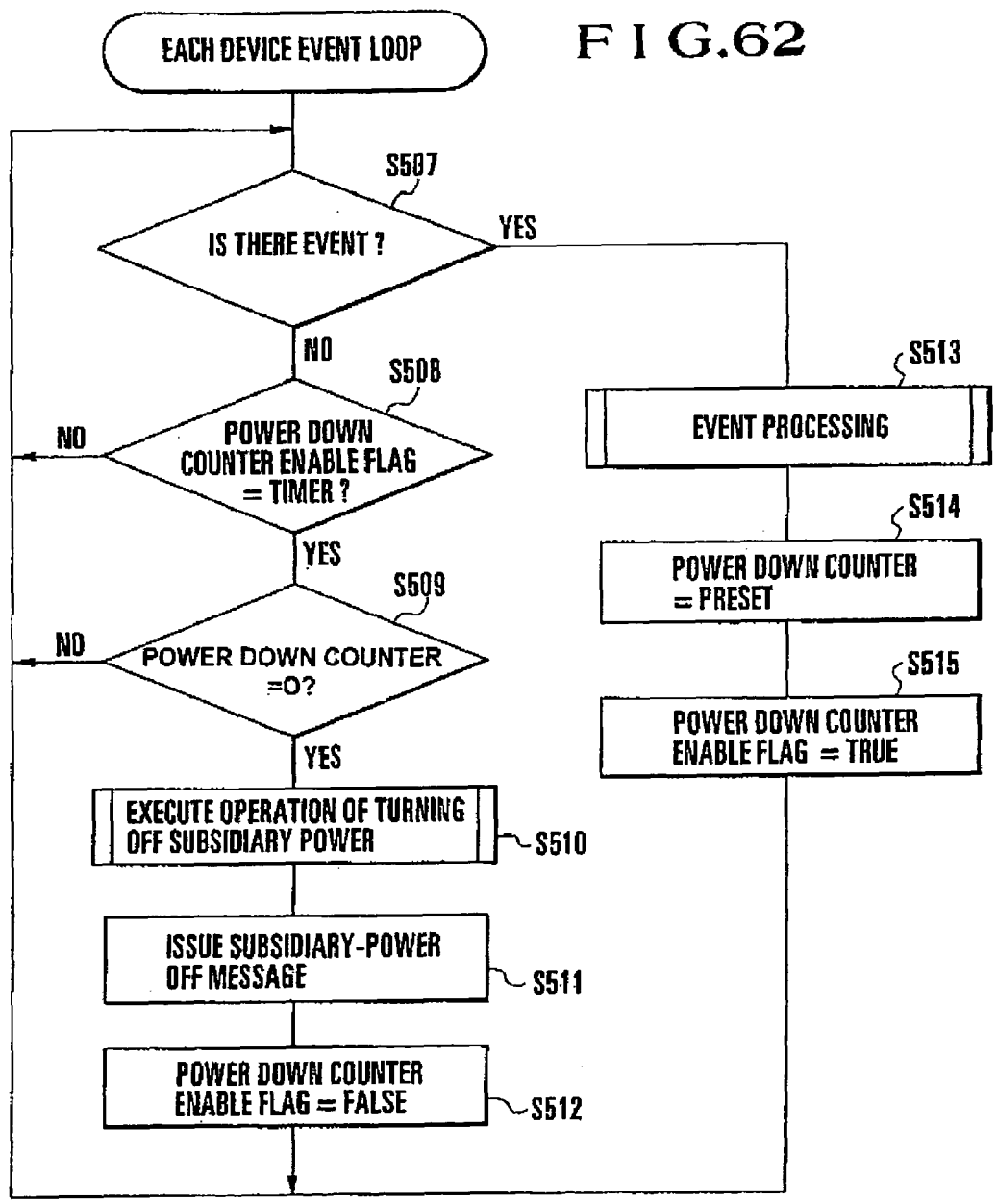
FIG. 62 is a flowchart showing the control of an event loop of each connected device which control is associated with a power on/off operation.

It is also possible to automatically execute the power on/off operation. FIGS. 60, 61 and 62 are flowcharts showing processing for automatically executing the power on/off operation. FIG. 60 shows the operation of the multimedia controller, while FIG. 61 shows the power-on operation of each of the multimedia devices. FIG. 62 shows an automatic power-off operation to be executed by each of the multimedia devices.

First of all, an operation request message is sent from the multimedia controller to a particular one of the multimedia devices (S190). The particular multimedia device receives the operation request message and determines whether its own subsidiary power source is on at that time (S199). If the subsidiary power source is off, the multimedia device executes a power-on operation (S500) and confirms whether the power source has been normally turned on (S501).

If the power source has been normally turned on, or if it is determined in Step S199 that the power source has already been turned on, the multimedia device executes the operation requested by the multimedia controller (S502) and confirms whether the operation has been normally completed (S503). If it is determined that the operation has been normally completed, the multimedia device sends a normal completion message to the multimedia controller. If an abnormality has occurred, or if it is determined in Step S501 that the power source has not been normally turned on, the multimedia device turns off the subsidiary power source (S505) and sends an abnormal end message to the multimedia controller (S506).

In the meantime, after the multimedia controller has sent the operation request message to the particular multimedia device in Step S190, the multimedia controller is placed in the state of waiting for an acknowledgment message from the particular multimedia device.

First of all, the multimedia controller clears the counter Cmd Wait Counter which counts elapsed time up to the time-out value for the purpose of allowing the multimedia controller to wait for arrival of an acknowledgment message (S191) and checks whether there is an acknowledgment (S192). If there is not an acknowledgment, the multimedia controller determines whether the value of the counter Cmd Wait Counter exceeds the time-out value Limit (S193). If it is determined that the value of the timer Cmd Wait Counter does not exceed the time-out value Limit, the counter Cmd Wait Counter is incremented (S194) and the process returns to Step S192 to wait for an acknowledgment message.

If it is determined in Step S192 that there is an acknowledgment message, it is confirmed whether the acknowledgment message is a normal completion message (S195). If the acknowledgment message is a normal completion message, the multimedia device records a power-on check mark in the column "POWER ON/OFF" of a corresponding multimedia device on the state-of-connection management table (S197).

If it is determined in Step S195 that the acknowledgment message is an abnormal end message, and if it is determined in Step S193 that the value of the counter Cmd Wait Counter exceeds the time-out value Limit, the multimedia controller sends an error message to the user (S197) and records a power-off check mark in the column "POWER ON/OFF" of a corresponding multimedia device on the state-of-connection management table (S198).

The automatic power-off operation of each of the multimedia devices is executed in the following manner. First of all, the multimedia device confirms whether an event has occurred (S507), and if an event has occurred, the multimedia device executes the processing of the event (S513). Then, the multimedia device presets a counter Power Down Counter for measuring the time which elapses until the automatic power-off operation is executed (S514), and the value of a flag Power Down Enable Flag for indicating whether the value of the counter Power Down Counter is valid is made true (S515). The counter Power Down Counter is a counter which is decremented by a software or hardware timer, and the flag Power Down Enable Flag indicates whether the value of the counter Power Down Counter is valid. Only when the value of this flag is true, the multimedia device is allowed to execute the automatic power-off operation while referring to the counter Power Down Counter.

If it is determined in Step S507 that there is no event, the multimedia device checks whether the value of the flag Power Down Enable Flag is true (S508). If it is true, the multimedia device checks the value of the counter Power Down Counter (S509). If the value is zero, the multimedia device executes the operation of turning off the subsidiary power source (S510) and sends a power-off message to the multimedia controller (S511). Then, the multimedia device makes false the value of the flag Power Down Enable Flag, and waits for the next event (S512).

If it is determined in Step S508 that the value of the flag Power Down Enable Flag is false, or if it is determined in Step S509 that the value of the counter Power Down Counter is not zero, the multimedia device waits for the next event. The multimedia controller receives the power-off message and records a power-off check mark in the column "POWER ON/OFF" of a corresponding multimedia device on the state-of-connection management table.

By automatically controlling the on/off operation of the subsidiary power source in the above-described manner, it is possible to supply electrical power to a required multimedia device at only a required time, so that power consumption can be suppressed.

Figure 57D:
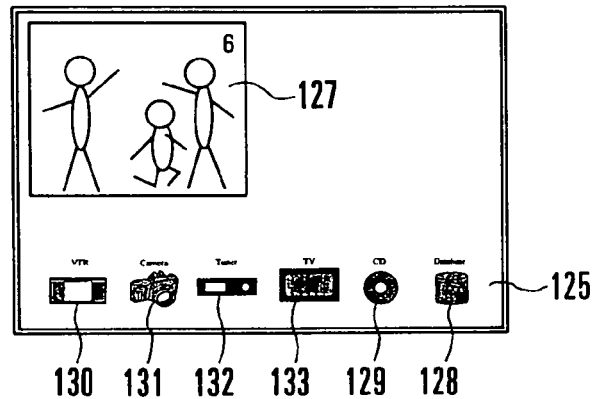

Although the user requests the connected-device confirmation panel 126 in the example shown in FIG. 57(a), it is also possible to adopt the example shown in FIG. 57(d) in which the icons of the multimedia devices which have had their connections confirmed are at all times displayed on the display device 125. In the example shown in FIG. 57(d), if a particular multimedia device is disconnected, the icon of the multimedia device is erased, so that the connected multimedia devices can be displayed in real time.

Figure 63:
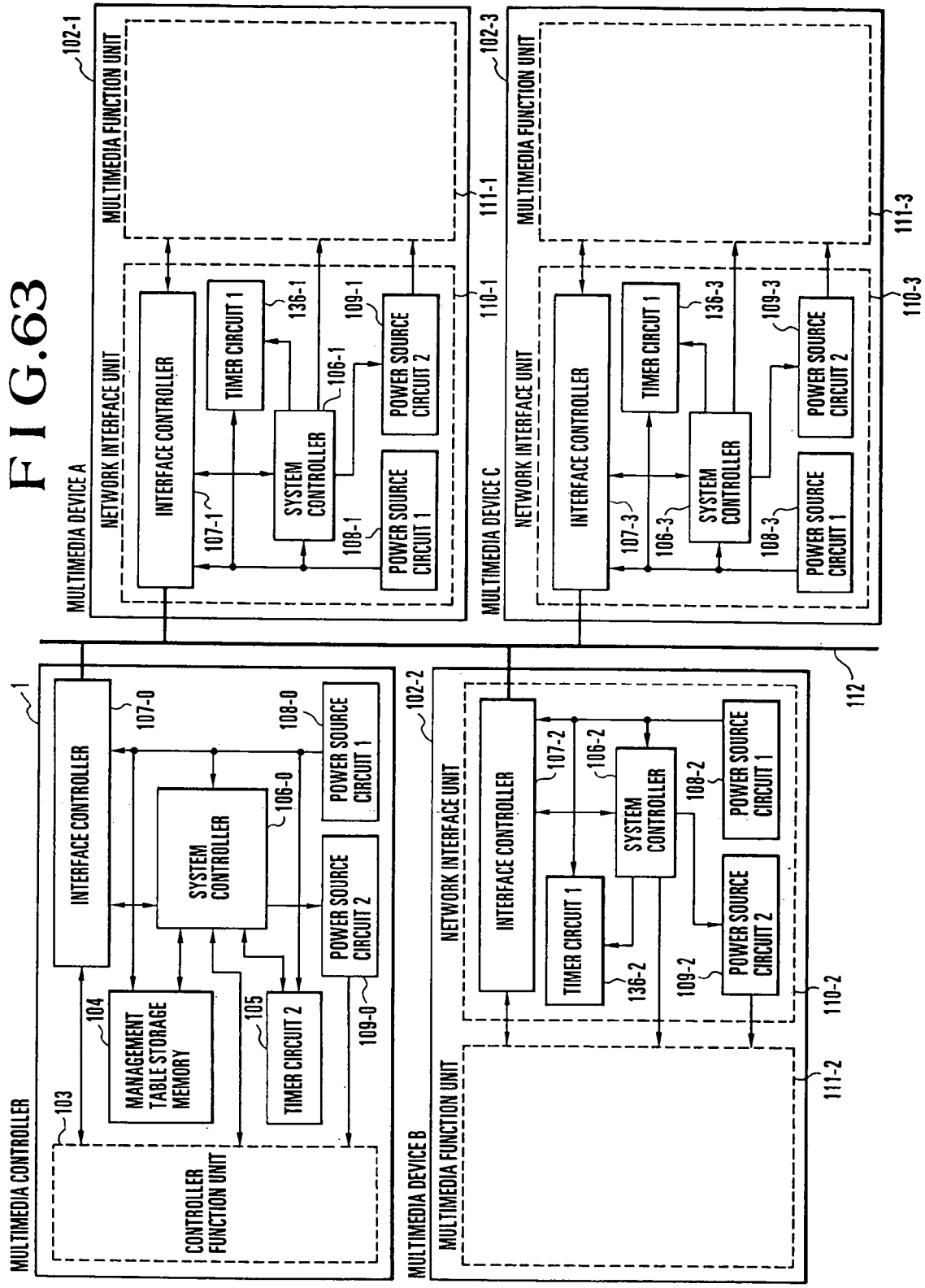
FIG. 63 is a block diagram showing the construction of the sixth embodiment of the present invention.

FIG. 63 is a block diagram showing the construction of a fifth embodiment of the present invention. As can be seen from FIG. 63, although the fifth embodiment of the present invention is basically identical in construction to the fourth embodiment of the present invention, the fifth embodiment is characterized in that the respective multimedia devices 102-1, 102-2 and 102-3 include timer circuits 1 (136-1, 136-2 and 136-3). Further, the fifth embodiment is identical to the fourth embodiment in that the multimedia controller 1 confirms the status of each connected multimedia device at regular intervals, but the fourth and fifth embodiments differ from each other in the following respect. In the fourth embodiment, the period of each of the regular intervals is managed by the timer circuit included in the multimedia controller 1, whereas, in the fifth embodiment, such period is managed by the timer circuits 1 (136-1, 136-2 and 136-3) provided in the respective multimedia devices.

The state-of-connection management table used in the fifth embodiment differs from that used in the fourth embodiment shown in FIG. 64 in that the table used in the fifth embodiment includes a column for a presence confirmation counter. The presence confirmation counter is provided for each multimedia device registered on the table, and the presence confirmation counter performs its counting operation in accordance with a timer circuit 2 included in the multimedia controller 1. In the fifth embodiment of the present invention, each multimedia device demonstrates its own presence by sending a state-of-device-connection information message to the multimedia controller 1, and when the multimedia controller 1 receives the state-of-device-connection information message, the multimedia controller 1 resets the presence confirmation counter.

As described above, each of the presence confirmation counters always performs its counting operation in accordance with the timer circuit 2. If a particular multimedia device does not send out the state-of-device-connection information message, the presence confirmation counter is incremented up to a particular threshold and at the time when the value of the presence confirmation counter exceeds the particular threshold, it is determined that the particular multimedia device is not connected or is in an abnormal state.

Figure 65:
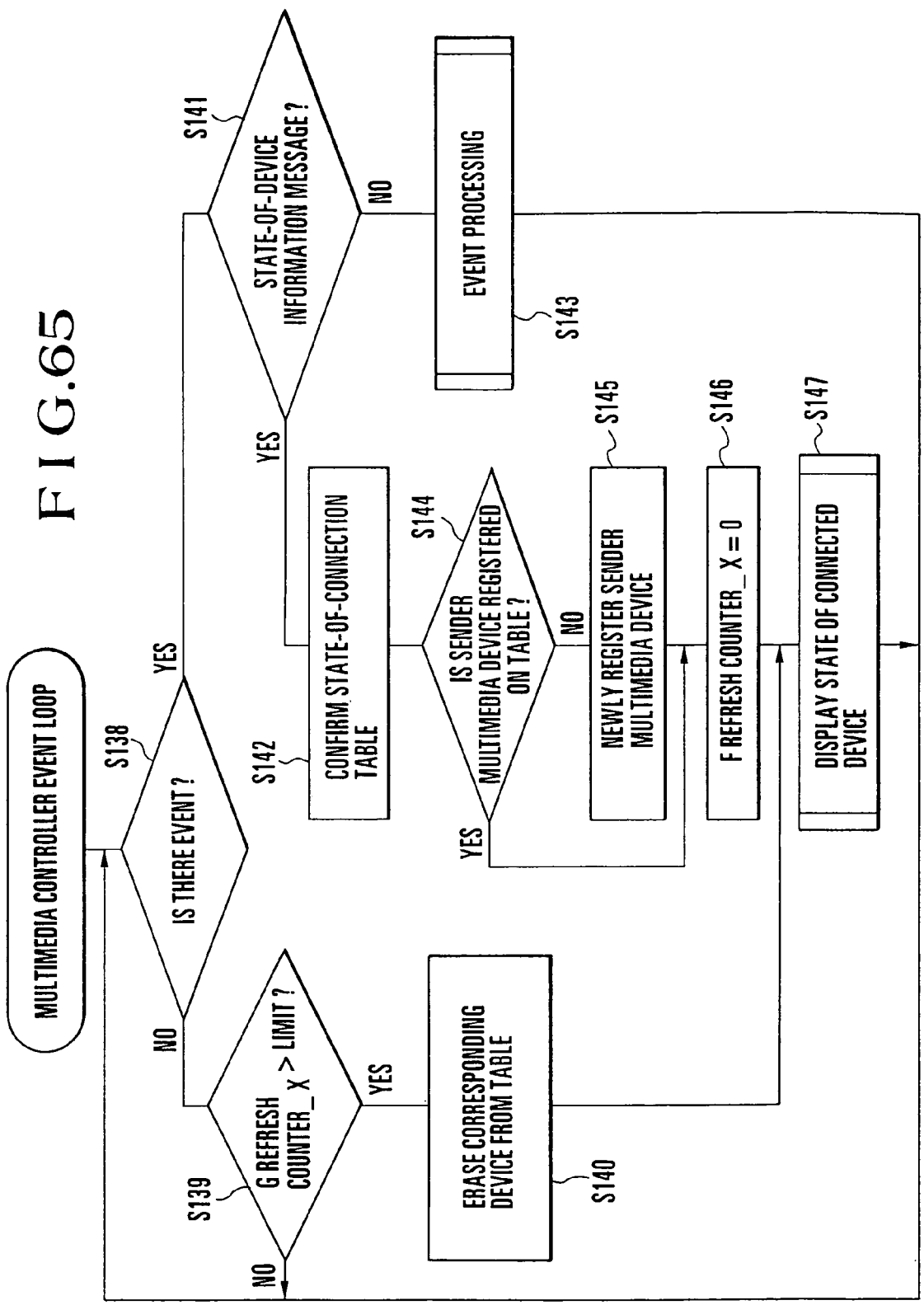
FIG. 65 is a flowchart showing an event loop of a multimedia controller according to the sixth embodiment of the present invention.

FIG. 65 is a flowchart showing the processing of an event loop of the multimedia controller 1, while FIG. 66 is a flowchart showing an event loop of each of the multimedia devices. A connection confirmation operation of the fifth embodiment of the present invention will be described below with reference to FIGS. 65 and 66.

First of all, each of the multimedia devices determines whether there is an event caused by the manipulation of the manipulation panel of each of the multimedia devices by a user or an event sent from the multimedia controller through communication (S148). If there is either event, each of the multimedia devices executes processing according to the event (S149). If there is no event, each of the multimedia devices determines whether a counter f Refresh Counter=0 (S150). The counter f Refresh Counter is a counter which manages the period during which each of the multimedia devices sends its state-of-device-connection information message to the multimedia controller, and performs its counting operation in accordance with each of the timer circuits 136-1, 136-2 and 136-3. If it is determined in Step S150 that the counter f Refresh Counter=0, each of the multimedia devices sends the state-of-device-connection information message to the multimedia controller (S151), and resets the counter f Refresh Counter. Then, the process returns to Step S148, and waits for the next event.

In the meantime, the multimedia controller determines whether there is an event caused by the manipulation of the manipulation panel of the multimedia controller by the user or an event sent from each of the multimedia devices through communication (S138). If there is either event, the multimedia controller determines whether the event is the state-of-device-connection information message sent from any of the multimedia devices (S141). If there is another event, the multimedia controller executes processing according to the event (S143). If it is determined that the aforesaid event is the state-of-device-connection information message, the multimedia controller checks whether the multimedia device which has sent the message is already stored on a state-of-connection management table (S142). If the multimedia device is not stored on the state-of-connection management table, the multimedia controller newly stores the multimedia device on the state-of-connection management table (S145), and clears to zero a counter g Refresh Counter_X of the corresponding multimedia device. If it is determined in Step S142 that the multimedia device is already stored on the state-of-connection management table, the multimedia controller clears to zero the presence confirmation counter g Refresh Counter_X of the multimedia device.

The multimedia controller provides display of connected devices on the basis of the thus-updated state-of-connection management table (S147), and the process returns to Step S138 to wait for the next event. If it is determined in Step S138 that there is no event, the multimedia controller confirms the values of the presence confirmation counter g Refresh Counter_X of each of the multimedia devices (S139). If the counter g Refresh Counter_X of a particular one of the multimedia devices exceeds the threshold Limit, the multimedia controller erases the multimedia device from the state-of-connection management table (S140) and provides display of connected devices on the basis of the updated state-of-connection management table (S147).

Regarding operations associated with a power on/off operation and the icon displays of the multimedia devices which have had their connections confirmed, it is possible to realize means and effects similar to those described previously in connection with the fourth embodiment of the present invention.

A sixth embodiment of the present invention will be described below.

Figure 67:
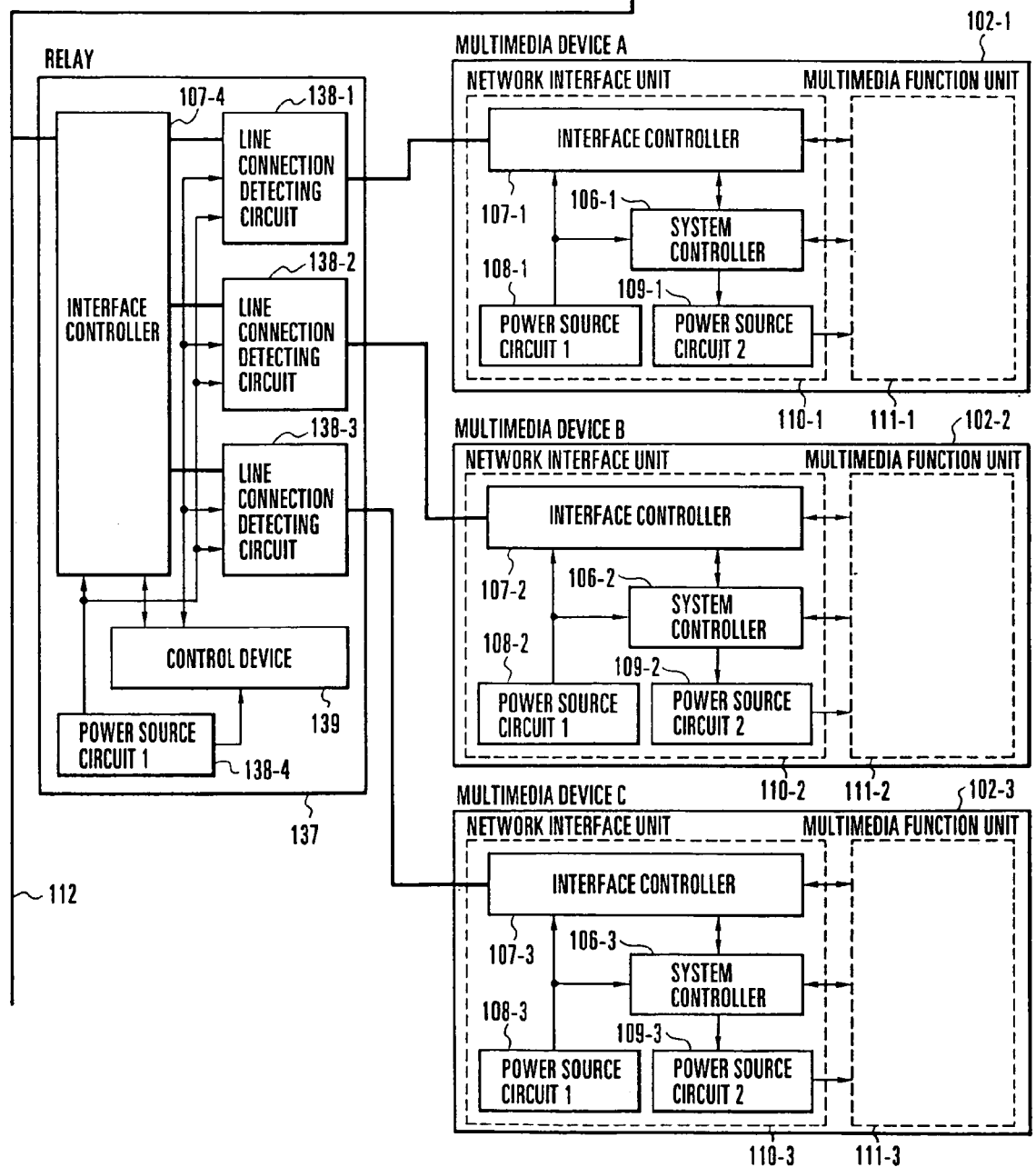
FIG. 67 is a block diagram showing the construction of the seventh embodiment of the present invention.

FIG. 67 is a block diagram showing the construction of the sixth embodiment of the present invention. As can be seen from FIG. 67, the sixth embodiment of the present invention is basically identical in construction to the fourth embodiment of the present invention, but the timer circuit 105 provided in the multimedia controller 1 according to the fourth embodiment is not employed and a relay 137 is provided in the physical connection between the multimedia controller and each of the multimedia devices. The relay 137 includes a network line connection terminal to which to connect at least one multimedia device, line connection detecting circuits (138-1, 138-2 and 138-3) which correspond to individual line connection terminals on a one-to-one basis, an interface controller 107-4 which is similar to that of the multimedia controller or each of the multimedia devices, a power source circuit 108-4, and a control device 139 for controlling the above-noted elements. Each of the line connection detecting circuits 138-1, 138-2 and 138-3 observes the state of a line, for example the traffic volume of a communication, to detect whether a communicable device is connected to a corresponding communication line.

The sixth embodiment of the present invention differs from either of the fourth and fifth embodiments in that the states of the respective multimedia devices connected to the system are not checked at particular periodic intervals. The sixth embodiment is characterized in that when a multimedia device is newly connected to the system or when a connected multimedia device is disconnected from the system, a message to that effect is transmitted to the multimedia controller from the relay to which the multimedia devices are connected, so that the multimedia controller can recognize the multimedia devices connected to the system. The state-of-connection management table used in the sixth embodiment of the present invention is similar to the table of FIG. 55 described previously in connection with the fourth embodiment of the present invention.

Figure 70:
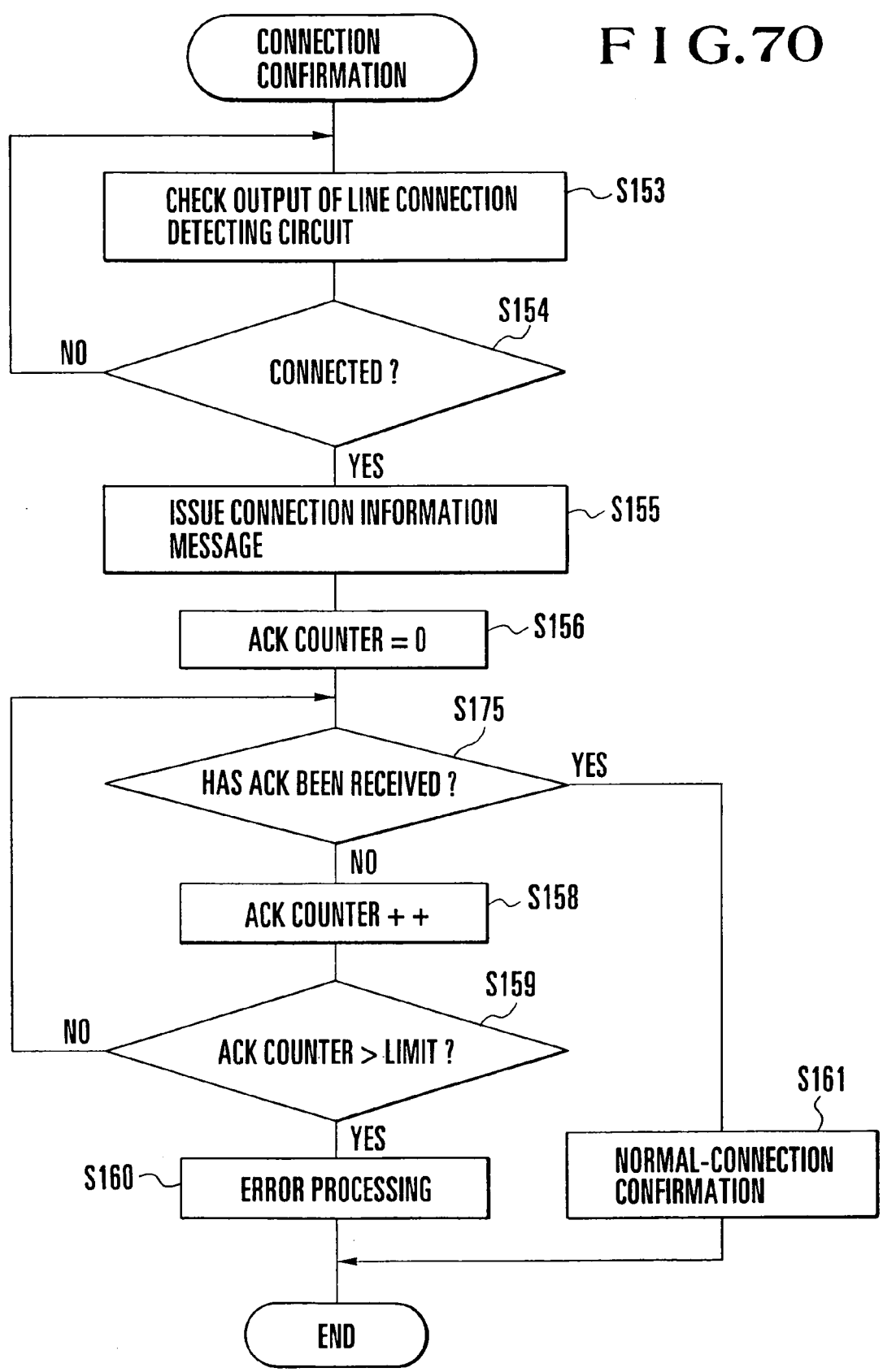
FIG. 70 is a flowchart of processing to be executed when a connection is confirmed in the flowchart of FIG. 69.
Figure 71:
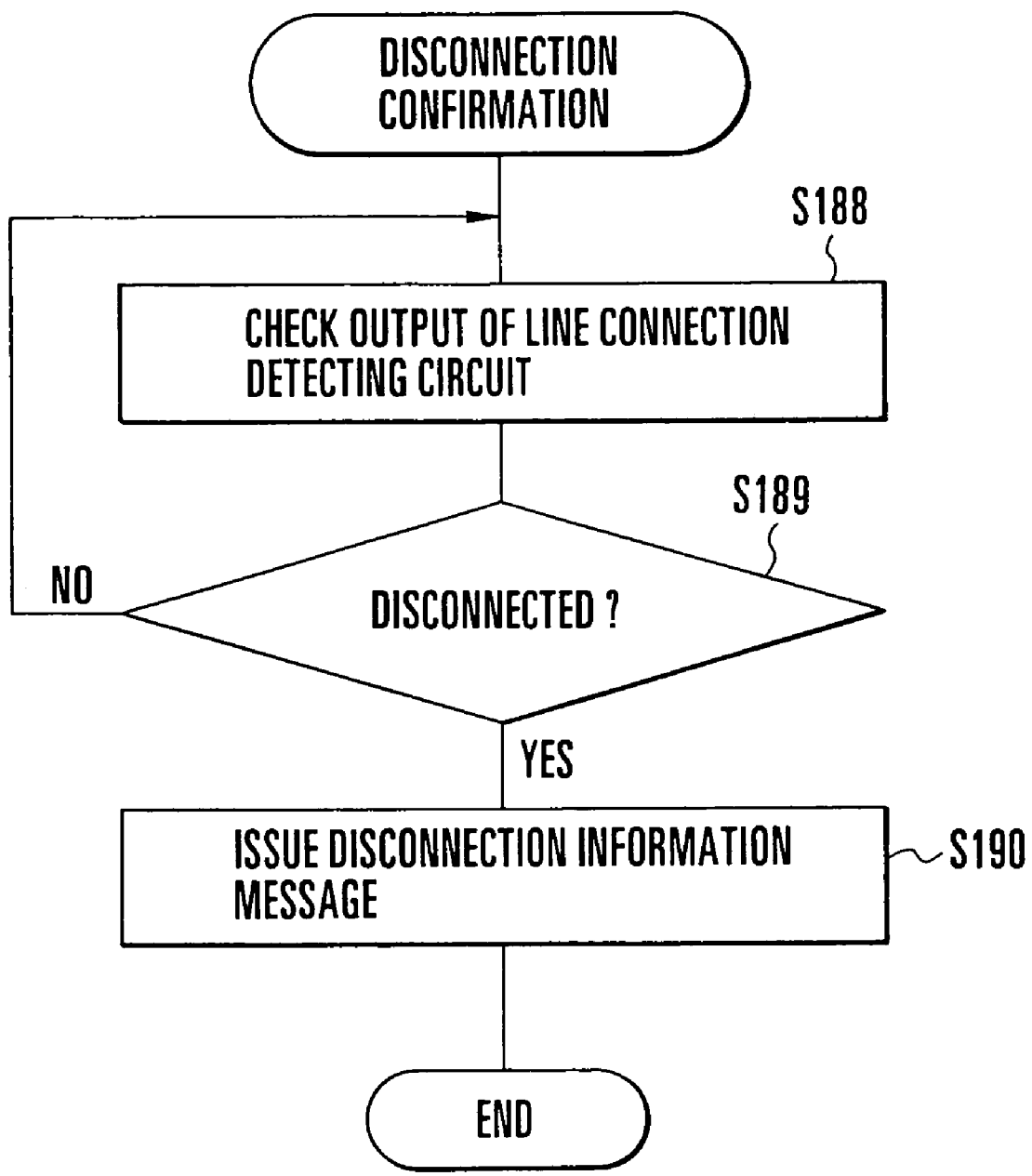
FIG. 71 is a flowchart of processing to be executed when a disconnection is confirmed in the flowchart of FIG. 69.

The operation of the sixth embodiment of the present invention will be described below. FIG. 69 is a flowchart showing the processing of an event loop of the multimedia controller 1, FIG. 70 is a flowchart showing the processing in which the relay sends a multimedia-device connection confirmation message to the multimedia controller, and FIG. 71 is a flowchart showing the processing in which the relay sends a multimedia device disconnection message to the multimedia controller.

The operation of the relay will be described below with reference to the flowchart of FIG. 70. The relay checks the outputs of the respective line connection detecting circuits 138-1, 138-2 and 138-3, the number of which corresponds to the number of ports of the relay on a one-to-one basis (S153), and detects whether the multimedia devices have been connected to the respective ports (S154). If it is determined that the multimedia devices have been connected, the relay transmits to the multimedia controller a message indicating that they have been connected (S155), and clears a counter Ack Counter for performing a counting operation to wait for an acknowledgment to be transmitted from the multimedia controller (S156). Then, it is determined that an acknowledgment Ack has been transmitted from the multimedia controller (S157), and if no acknowledgment has yet been transmitted, the relay increments the counter Ack Counter (S158) and determines whether the value of the counter Ack Counter does not exceed the time-out value Limit (S159). If it is determined that the value of the counter Ack Counter does not exceed the time-out value Limit, the process returns to Step S157, in which the relay waits for an acknowledgment from the multimedia controller. If it is determined in Step S159 that the value of the counter Ack Counter exceeds the time-out value Limit, the relay informs the user of the occurrence of an error (S160). If it is confirmed in Step S157 that an acknowledgment from the multimedia controller has normally been received, the relay performs normal-connection confirmation processing (S161) and completes the connection confirmation processing.

The operation of the relay when a particular multimedia device is disconnected from the relay will be described below with reference to FIG. 71.

The relay checks the outputs of the line connection detecting circuits, the number of which corresponds to the number of ports on a one-to-one basis (S188), and detects whether any of the multimedia devices connected to the respective ports has been disconnected (S189). If it is determined that a particular multimedia device has been disconnected, the relay transmits a message indicative of the disconnection to the multimedia controller (S190), in which the relay brings the processing to an end.

The processing of the multimedia controller will be described below with reference to FIG. 69. First of all, it is determined whether there is an event sent from the user or through communication (S162). If there is an event, it is determined whether the event is the aforesaid device disconnection message (S163). If it is determined that the event is the device disconnection message, the multimedia controller clears a counter Retry Counter (S169) and clears the counter Ack Counter (S170). A message identical to the state-of-device-connection information message used in the fourth embodiment is transmitted to the multimedia device which appears to have been disconnected (S171). The counter Ack Counter serves as a timer for measuring the time-out period during which an acknowledgment of the state-of-device-connection information message is sent from the corresponding multimedia device to the multimedia controller. The counter Retry Counter serves as a counter for counting the number of times of retries to be executed if an acknowledgment is not transmitted within the time-out period. The multimedia controller waits for an acknowledgment of the state-of-device-connection information message (S172). If the acknowledgment has been received, the multimedia controller determines that the corresponding multimedia device is still connected, and waits for the next event. If the acknowledgment has not been received, the multimedia controller increments the counter Ack Counter (S173) and determines whether the value of the counter Ack Counter exceeds the time-out period (S174). If the value of the counter Ack Counter does not exceed the time-out period, the process returns to Step S172 to wait for an acknowledgment. If the value of the counter Ack Counter exceeds the time-out period, the multimedia controller increments the counter Retry Counter (S175) and determines whether the value of the counter Retry Counter does not exceed the predetermined number of times of retries (S176). If it is determined that the value of the counter Retry Counter does not exceed the predetermined number of times of retries, the process returns to the processing of Step S170, in which the multimedia controller again issues a state-of-device-connection information message.

If the value of the counter Retry Counter exceeds the predetermined number of times of retries, it is determined that no acknowledgment has been transmitted from the corresponding multimedia device, i.e., the multimedia device has been disconnected. The multimedia controller erases information about the multimedia device from the state-of-connection management table (S177), thereby updating the state-of-connection management table.

If it is determined in Step S163 that the event is not the device disconnection message, it is determined whether the event is the device connection message (S164). If it is determined that the event is the device connection message, it is confirmed as to whether the corresponding multimedia device is a device already stored on the state-of-connection management table (S165). If the multimedia device is an already stored device, the multimedia controller does not rewrite the state-of-connection management table. If it is determined that the multimedia device is a multimedia device which has not yet been stored on the state-of-connection management table, the multimedia controller newly registers the multimedia device on the state-of-connection management table, thereby updating the state-of-connection management table.

The multimedia controller reassign the device IDs by using the state-of-connection management table updated in the above-described manner (S178), and displays the states of the respective connected devices as the corresponding multimedia-device icons (S179).

Regarding operations associated with a power on/off operation and the icon displays of the multimedia devices which have had their connections confirmed, it is possible to realize means and effects similar to those described previously in connection with the fourth embodiment of the present invention.

Figure 68:
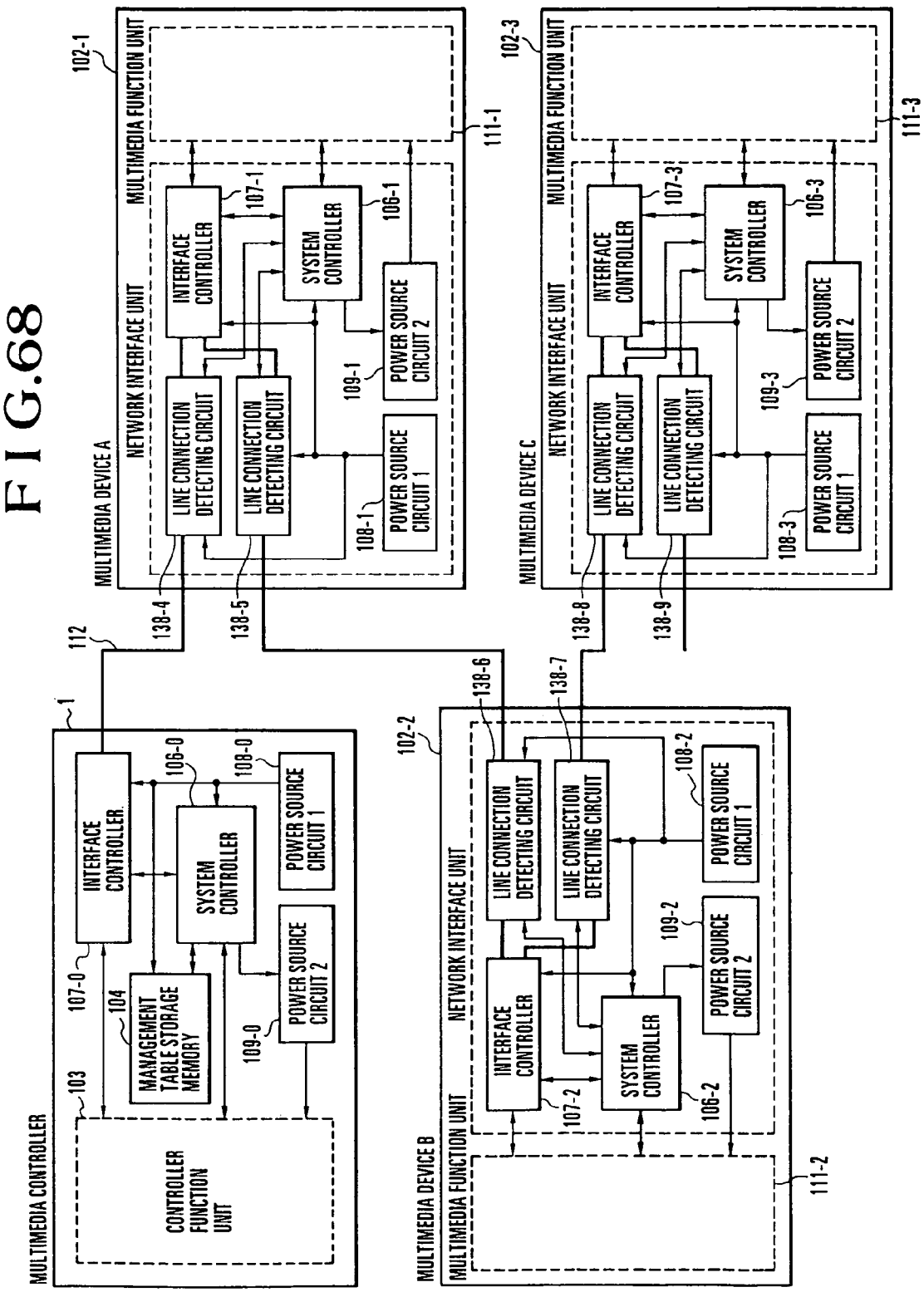
FIG. 68 is a block diagram showing the construction of the eighth embodiment of the present invention.

A seventh embodiment of the present invention will be described below. FIG. 68 is a block diagram showing the construction of the seventh embodiment of the present invention. As can be seen from FIG. 68, the sixth embodiment of the present invention is basically identical to the fourth embodiment of the present invention, but the timer circuit 105 provided in the multimedia controller 1 according to the fourth embodiment is not employed. Each of the multimedia devices includes at least two line connection terminals and line connection detecting circuits (183-4, 183-5), (183-6, 183-7) and (183-8, 183-9) which correspond to the respective line connection terminals on a one-to-one basis. Each of the multimedia devices is chain-connected to the line connection detecting circuits as shown in FIG. 68, i.e., the relay used in the sixth embodiment shown in FIG. 67 is contained in each of the multimedia devices. The operation of the seventh embodiment will be described below.

Referring to FIG. 68, for example, if the multimedia device C is newly connected to the multimedia device B, the multimedia device B serves the function of the relay described above in connection with the sixth embodiment of the present invention. When the line connection detecting circuit 183-7 of the multimedia device B detects that the multimedia device C has been connected to the multimedia device B, the line connection detecting circuit 183-7 transmits a device connection message to the multimedia controller 1.

If the multimedia device C is disconnected from the multimedia device B, the multimedia device B similarly serves the function of the relay described above in connection with the sixth embodiment of the present invention. When the line connection detecting circuit 183-7 of the multimedia device B detects that the multimedia device C has been disconnected from the multimedia device B, the line connection detecting circuit 183-7 transmits a device disconnection message to the multimedia controller 1.

Similarly to the case of the sixth embodiment of the present invention, the flow shown in FIG. 70 is used for processing to be executed during the transmission of the device connection message by the multimedia device B, the flow shown in FIG. 71 is used for processing to be executed during the transmission of the device disconnection message by the multimedia device B, and the flow shown in FIG. 69 is used for processing to be executed by the multimedia controller 1.

Figure 74:
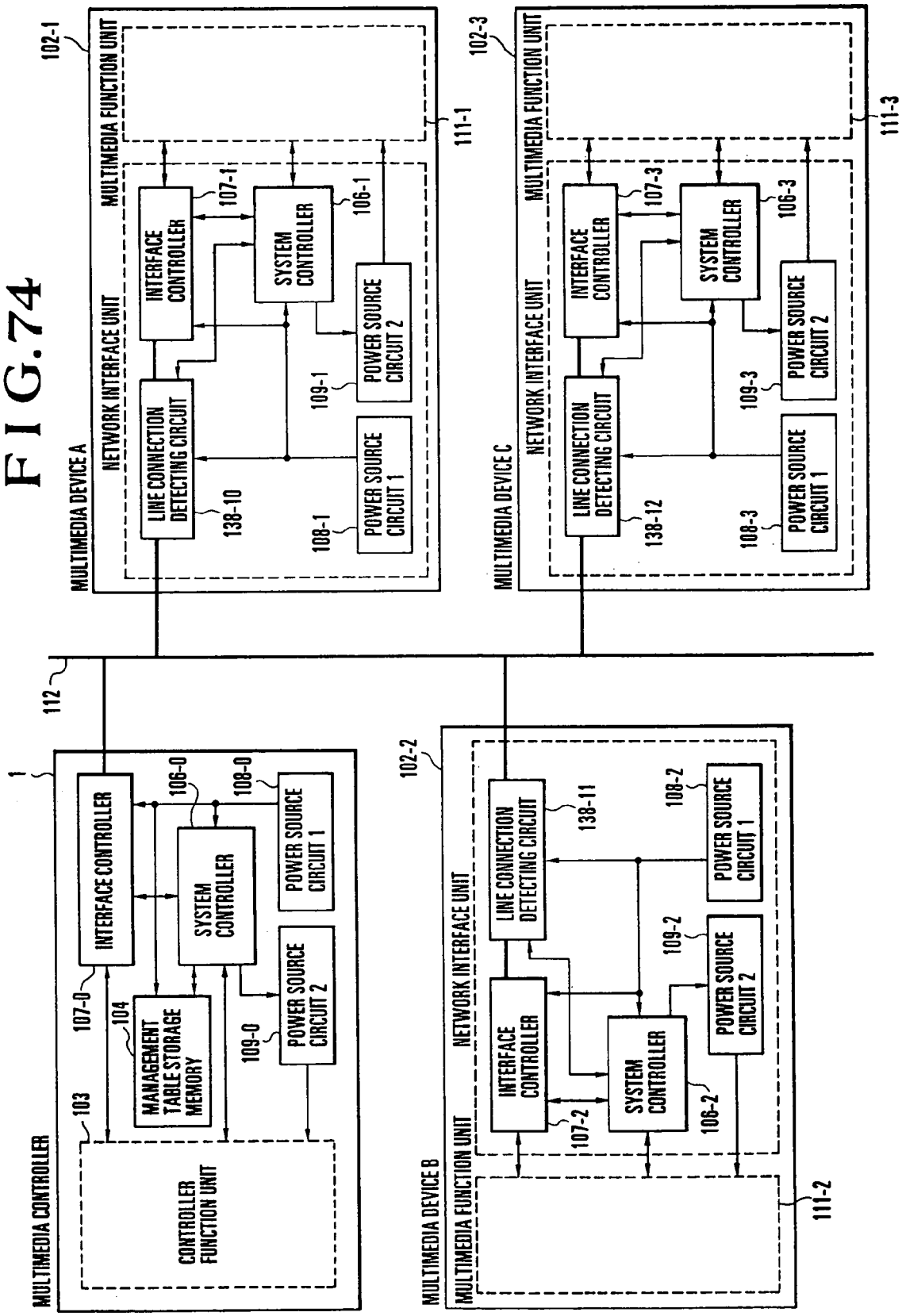
FIG. 74 is a block diagram showing the construction of the ninth embodiment of the present invention.
Figure 75:
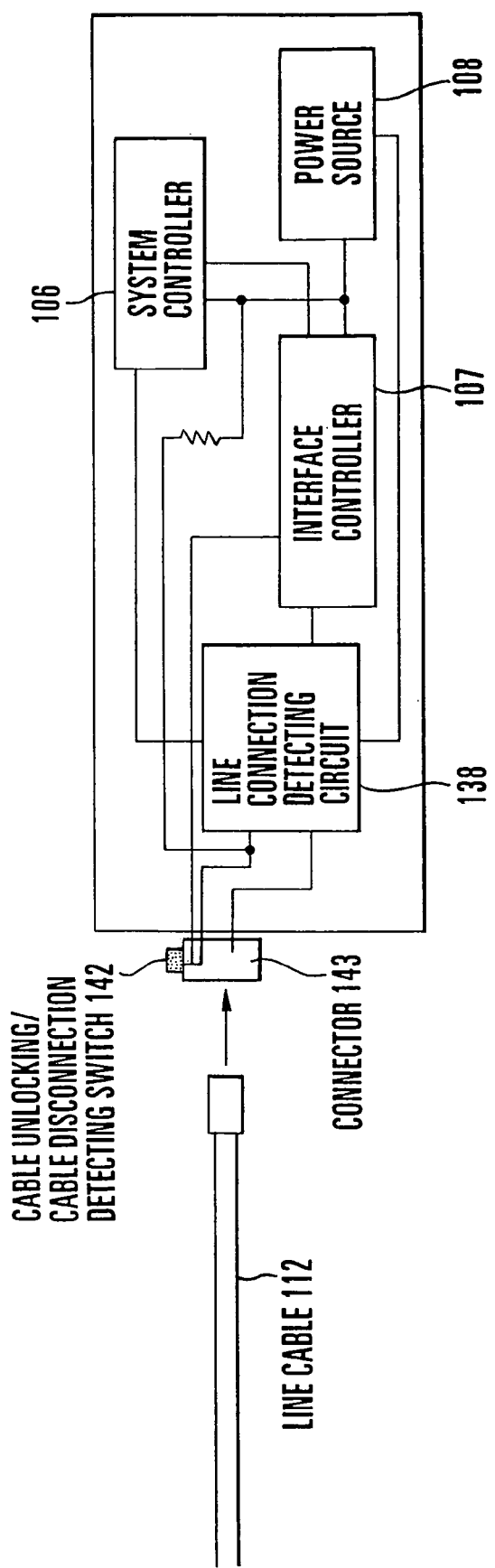
FIG. 75 is a conceptual diagram showing the external appearance of a cable connector according to the ninth embodiment of the present invention.

An eighth embodiment of the present invention will be described below. The construction of the eighth embodiment is shown in FIG. 74. As can be seen from FIG. 74, the eighth embodiment of the present invention is basically identical in construction to the fourth embodiment, but the timer circuit 105 provided in the multimedia controller 1 according to the fourth embodiment is not used. The eighth embodiment is characterized in that the respective multimedia devices include line connection detecting circuits 138-10, 138-11 and 138-12 as well as cable connectors which serve as cable unlocking/cable disconnection detecting switches. The line connection detecting circuits 138-10, 138-11 and 138-12 are similar to those described previously in connection with each of the sixth and seventh embodiments of the present invention. One of the cable connectors which serve as cable unlocking/cable disconnection detecting switches is shown in FIG. 75. As shown in FIG. 75, when a line cable 112 is connected to a connector 143, the line cable 112 is locked by a lock mechanism so that accidental removal of the line cable 112 can be prevented. To remove the line cable 112, a cable unlocking/cable disconnection detecting switch 142 is pressed to release a cable lock. At this time, before the line cable 112 is removed, a cable disconnection detection signal is transmitted to a corresponding one of the line connection detecting circuits 138-10, 138-11 and 138-12 so that the line cable 112 is about to be removed.

The line connection detecting circuit which has received the cable disconnection detection signal transmits a device disconnection message to the multimedia device 1 similarly to the case of each of the sixth and seventh embodiments of the present invention. If another line cable is inserted to add a new multimedia device to the system, a corresponding line connection detecting circuit detects the connection of the line cable to transmit a device connection message to the multimedia controller 1.

Referring to FIG. 74, for example, if the multimedia device C is newly connected to the multimedia device B, a line connection detecting circuit 183-12 of the multimedia device C detects that the multimedia device C has been connected to the communication line 112, and the line connection detecting circuit 183-12 transmits a device connection message to the multimedia controller 1.

In FIG. 74, if the multimedia device C is to be disconnected from the multimedia device B, the line cable 112 is removed by pressing the cable unlocking/cable disconnection detecting switch of the multimedia device C and releasing the cable lock. Accordingly, before the line cable 112 is removed, a cable disconnection detection signal is transmitted to the line connection detecting circuit 138-12. The line connection detecting circuit 138-12 transmits a device disconnection message to the multimedia controller 1.

In the above-described manner, the connected devices are confirmed to create the state-of-connection management table, thereby managing each of the multimedia devices.

Similarly to the case of each of the sixth, seventh and eighth embodiments of the present invention, the flow shown in FIG. 71 is used for the processing of transmitting the device disconnection message, the flow shown in FIG. 70 is used for the processing of transmitting the device connection message, and the operation of the multimedia device 1 is shown in the flowchart of FIG. 69.

Figure 72:
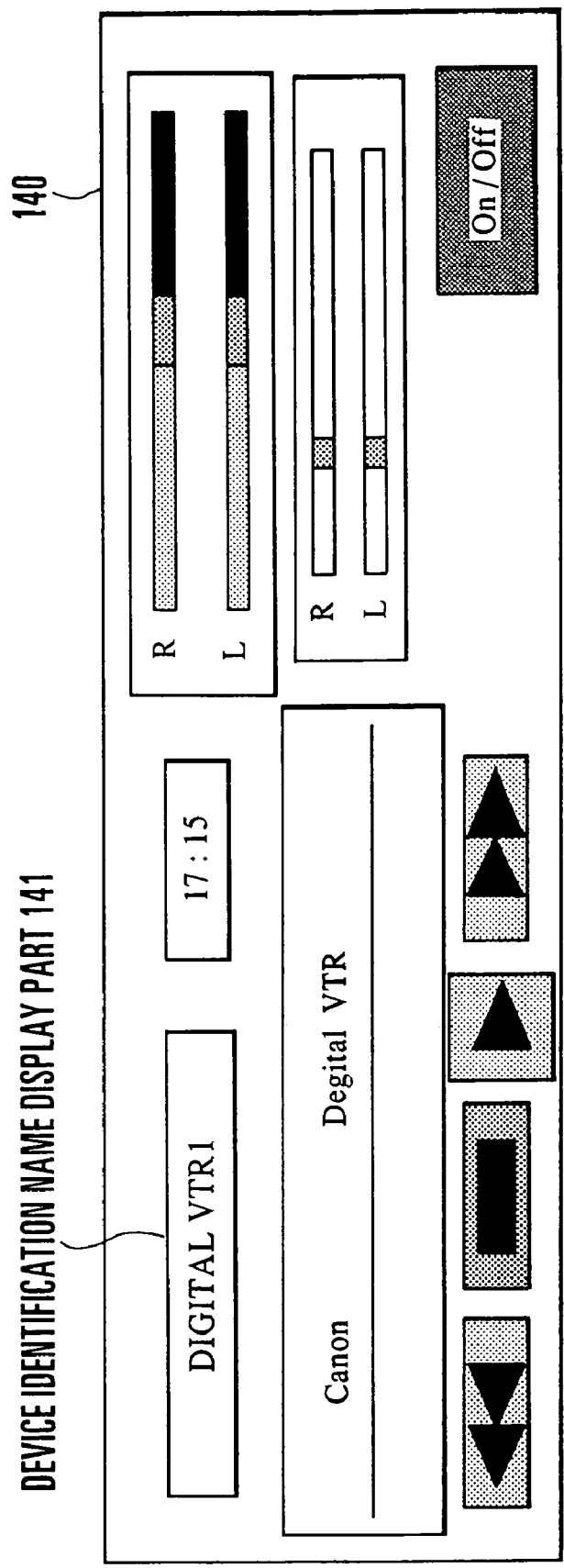
FIG. 72 is a conceptual diagram showing the external appearance of a multimedia device according to the tenth embodiment of the present invention.

A ninth embodiment of the present invention will be described below. The ninth embodiment of the present invention is characterized in that each multimedia device includes an identification name display part 141 as shown in FIG. 72. In accordance with the ninth embodiment, the aforesaid state-of-connection management table for managing individual multimedia devices connected to the system is created by any of the techniques according to the fourth, fifth, sixth, seventh and eighth embodiments of the present invention, and, as described previously in connection with the fourth embodiment, at the time when a newly connected or disconnected device is recognized, unique identification names which correspond to the respective multimedia devices on a one-to-one basis are assigned to them. Further, in accordance with the ninth embodiment, the unique identification names are transmitted to the respective multimedia devices and displayed on the identification name display parts provided on the respective multimedia devices.

The operation of the ninth embodiment of the present invention will be described below with reference to the construction of FIG. 52 described previously in connection with the fourth embodiment of the present invention.

FIG. 73 is a flowchart showing the processing of a main event loop of the multimedia controller 1. First of all, it is determined whether there is an event caused by the manipulation of the multimedia controller 1 by a user who is manipulating the multimedia controller 1 or an event sent from any of the multimedia devices through communication (S180). If there is either event, the processing of the event is executed (S182). If there is no event, it is determined whether the counter g Check Time=0 (S181). The counter g Check Time is a counter which manages the period during which the multimedia controller executes a series of state-of-connected device checking operations, and performs a counting operation in accordance with the timer circuit 105. If it is determined (S181) that the counter g Check Time=0, the states of connected devices are checked (S183), and device IDs are assigned to the multimedia devices described on a created state-of-connection management table (S184).

The multimedia controller rewrites a display of the states of the connected devices while referring to the thus-created state-of-connection management table (S185), and sets the value of the counter g Check Time to a preset value (S186). The multimedia controller also transmits the identification names stored in the column "DEVICE NAME" on the state-of-connection management table shown in FIG. 55 to the respective multimedia devices (S187). For example, in the case of FIG. 55, since two digital VTRs are connected and Digital VTR1 and Digital VTR2 are stored in the column "DEVICE NAME", the device names are transmitted to the respective digital VTRs and displayed on the identification name display parts thereof.

Although the above description has been made with reference to the construction of the fourth embodiment, the ninth embodiment is applicable to any of the fifth, sixth, seventh and eighth embodiments of the present invention.

As is apparent from the above description, with the arrangement according to any of the above-described embodiments, a user can correctly grasp the multimedia devices connected to the system without being particularly conscious of them. Also, if a multimedia device is newly connected to or disconnected from the system, the user does not need to perform a troublesome operation and can perform a device recognizing operation with the system being activated.

Also, since it is possible to unitarily perform the management and manipulation of the power source of each of the multimedia devices, it is possible to efficiently turn on and off the power source, whereby it is possible to efficiently operate the system.

Further, since the identification names identified by the multimedia controller are displayed on the identification name display parts of the respective multimedia devices, the user can easily visually determine a multimedia device desired to be used. Accordingly, it is possible to construct a system for multimedia devices which can be easily accepted by even common users having no special knowledge or skill about computer systems.

What is claimed is:

1. A control device for controlling a network device connected to a network, the control device comprising:
   a communication interface adapted to receive description information of the network device from the network device via the network; and
   a controller adapted to automatically generate an object for the network device using the description information after the description information is received from the network device,
   wherein the object is adapted to generate a control panel for controlling the network device.

2. A control device according to claim 1, wherein the control panel includes graphical elements corresponding to functions of the network device.

3. A control device according to claim 1, wherein the communication interface is adapted to receive the description information from the network device after the network device is connected to the network.

4. A control device according to claim 1, wherein the object is adapted to start a process that displays an icon representing the network device before the control panel is displayed.

5. A control device according to claim 4, wherein the object is adapted to start a process that displays the control panel if a user selects the icon.

6. A control device according to claim 1, wherein the object is adapted to start a process that transmits a message relating to a graphical element on the control panel to the network device if the user operates the graphical element.

7. A control device according to claim 1, wherein the control device is adapted to represent the network device as an object by a predetermined object-oriented technique.

8. A control device according to claim 1, wherein the network device is one of a CD player, a digital video recorder, a digital camera, a digital television, a facsimile, a copying machine and a printer.

9. A control device according to claim 1, wherein the control device is one of a personal computer, a word processor and a work station.

10. A method being performed in a control device that controls a network device connected to a network, comprising the steps of:
    receiving a description information of the network device from the network device via the network; and
    automatically generating an object for the network device using the description information after the description information is received from the network device,
    wherein the object is adapted to generate a control panel for controlling the network device.

11. A method according to claim 10, wherein the control panel includes graphical elements corresponding to functions of the network device.

12. A method according to claim 10, wherein the receiving step receives the description information from the network device after the network device is connected to the network.

13. A method according to claim 10, wherein the object is adapted to start a process that displays an icon representing the network device before the control panel is displayed.

14. A method according to claim 13, wherein the object is adapted to start a process that displays the control panel if a user selects the icon.

15. A method according to claim 13, wherein the object is adapted to start a process that transmits a message relating to a graphical element on the control panel to the network device if the user operates the graphical element.

16. A method according to claim 10, wherein the control device is adapted to represent the network device as an object by a predetermined object-oriented technique.

17. A method according to claim 10, wherein the network device is one of a CD player, a digital video recorder, a digital camera, a digital television, a facsimile, a copying machine and a printer.

18. A method according to claim 10, wherein the control device is one of a personal computer, a word processor and a work station.

19. A control device for controlling a network device connected to a network, the control device comprising:
    a communication interface adapted to receive description information of the network device from the network device via the network; and
    a controller adapted to automatically generate an object for the network device using the description information after the description information is received from the network device,
    wherein the object is adapted to generate a control panel for controlling the network device,
    the object is adapted to start a first process that displays the control panel if a user selects an icon representing the network device, and
    the object is adapted to start a second process that transmits a message relating to a graphical element on the control panel to the network device if the user operates the graphical element.

20. A control device according to claim 19, wherein the control panel includes graphical elements corresponding to functions of the network device.

21. A control device according to claim 19, wherein the object is adapted to start a third process that displays the icon before the control panel is displayed.

22. A control device according to claim 19, wherein the control device is adapted to represent the network device as an object by a predetermined object-oriented technique.

23. A control device according to claim 19, wherein the control device is one of a personal computer, a word processor and a work station.

24. A method being performed in a control device that controls a network device connected to a network, the method comprising the steps of:
    receiving description information of the network device from the network device via the network;
    automatically generating an object for the network device using the description information after the description information is received from the network device,
    wherein the object is adapted to generate a control panel for controlling the network device, the object is adapted to start a first process that displays the control panel if a user selects an icon representing the network device; and the object is adapted to start a second process that transmits a message relating to a graphical element on the control panel to the network device if the user operates the graphical element.

25. A method according to claim 24, wherein the control panel includes graphical elements corresponding to functions of the network device.

26. A method according to claim 24, wherein the object is adapted to start a third process that displays the icon before the control panel is displayed.

27. A method according to claim 24, wherein the control device is adapted to represent the network device as an object by a predetermined object-oriented technique.

28. A method according to claim 24, wherein the method is applicable to one of a personal computer, a word processor and a work station.

* * * * *

UNITED STATES PATENT AND TRADEMARK OFFICE
CERTIFICATE OF CORRECTION

PATENT NO. : 7,020,881 B2 Page 1 of 1
APPLICATION NO. : 09/240134
DATED : March 28, 2006
INVENTOR(S) : Fumiaki Takahashi et al.

It is certified that error appears in the above-identified patent and that said Letters Patent is hereby corrected as shown below:

Column 2, line 45, delete "transmit a" and insert --transmits a--

Column 10, line 45, delete "241, m-th data" and insert --241, . . . m-th data--

Column 14, line 54, delete "which-belongs" and insert --which belongs--

Signed and Sealed this

Fifth Day of December, 2006

JON W. DUDAS
*Director of the United States Patent and Trademark Office*

UNITED STATES PATENT AND TRADEMARK OFFICE
CERTIFICATE OF CORRECTION

PATENT NO.         : 7,020,881 B2
APPLICATION NO.    : 09/240134
DATED              : March 28, 2006
INVENTOR(S)        : Fumiaki Takahashi et al.

Page 1 of 1

It is certified that error appears in the above-identified patent and that said Letters Patent is hereby corrected as shown below:

Column 49, line 61, delete "receiving a description information" and insert --receiving description information--

Column 50, line 14, delete "A method according to claim 13" and insert --A method according to claim 10--

Signed and Sealed this
Thirteenth Day of March, 2012

David J. Kappos
*Director of the United States Patent and Trademark Office*